(12) United States Patent
Laugharn, Jr. et al.

(10) Patent No.: US 7,981,368 B2
(45) Date of Patent: *Jul. 19, 2011

(54) METHOD AND APPARATUS FOR ACOUSTICALLY CONTROLLING LIQUID SOLUTIONS IN MICROFLUIDIC DEVICES

(75) Inventors: James A. Laugharn, Jr., Winchester, MA (US); Brevard S. Garrison, Reading, MA (US)

(73) Assignee: Covaris, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/693,121

(22) Filed: Jan. 25, 2010

(65) Prior Publication Data

US 2010/0124142 A1 May 20, 2010

Related U.S. Application Data

(60) Division of application No. 11/167,934, filed on Jun. 27, 2005, now Pat. No. 7,686,500, which is a continuation of application No. 09/812,723, filed on Mar. 20, 2001, now Pat. No. 6,948,843.

(60) Provisional application No. 60/246,838, filed on Nov. 8, 2000, provisional application No. 60/198,923, filed on Apr. 21, 2000, provisional application No. 60/191,297, filed on Mar. 21, 2000.

(51) Int. Cl.
B01J 19/00 (2006.01)
B01F 11/02 (2006.01)

(52) U.S. Cl. ........ 422/128; 366/108; 366/116; 366/127; 366/142

(58) Field of Classification Search ............... 422/20, 422/99, 102, 39, 128, 127, 130; 366/127, 366/145, 108, 116, 142, 348
See application file for complete search history.

(56) References Cited

U.S. PATENT DOCUMENTS

| 1,734,975 | A | 11/1929 | Loomis et al. |
|---|---|---|---|
| 2,447,061 | A | 8/1948 | Franklin |
| 2,565,159 | A | 8/1951 | Williams |
| 2,578,505 | A | 12/1951 | Carlin |
| 2,585,103 | A | 2/1952 | Fitzgerald |

(Continued)

FOREIGN PATENT DOCUMENTS

DE 738286 11/1940

(Continued)

OTHER PUBLICATIONS

"Early experience with high-intensity focused ultrasound for the treatment of benign prostatic hypertrophy", Sullivan et al, British Journal of Uriology, vol. 79 pp. 172-176, dated 1997.

(Continued)

Primary Examiner — Tony G Soohoo
(74) Attorney, Agent, or Firm — Wolf, Greenfield & Sacks, P.C.

(57) ABSTRACT

Acoustic energy is used to control motion in a fluid. According to one embodiment, the invention directs acoustic energy at selected naturally occurring nucleation features to control motion in the fluid. In another embodiment, the invention provides focussed or unfocussed acoustic energy to selectively placed nucleation features to control fluid motion. According to one embodiment, the invention includes an acoustic source, a controller for controlling operation of the acoustic source, and one or more nucleation features located proximate to or in the fluid to be controlled.

22 Claims, 16 Drawing Sheets

U.S. PATENT DOCUMENTS

| | | | |
|---|---|---|---|
| 2,632,634 A | 3/1953 | Williams | |
| 2,738,172 A | 3/1956 | Spiess, Jr. et al. | |
| 2,855,526 A | 10/1958 | Jones | |
| 2,864,592 A | 12/1958 | Camp | |
| 2,916,265 A | 12/1959 | Towne | |
| 2,950,725 A | 8/1960 | Jacke et al. | |
| 3,066,686 A | 12/1962 | O'Neill | |
| 3,194,640 A | 7/1965 | Nesh | |
| 3,292,910 A | 12/1966 | Martner | |
| 3,396,286 A | 8/1968 | Anderson et al. | |
| 3,481,186 A | 12/1969 | Plofsk et al. | |
| 3,604,270 A | 9/1971 | Falk | |
| 3,614,069 A | 10/1971 | Murry | |
| 3,743,523 A | 7/1973 | Bodine | |
| 3,807,704 A | 4/1974 | Janzen et al. | |
| 3,837,805 A | 9/1974 | Boucher | |
| 3,876,890 A | 4/1975 | Brown et al. | |
| 3,919,558 A | 11/1975 | Brouillette et al. | |
| 4,028,933 A | 6/1977 | Lemons et al. | |
| 4,307,964 A | 12/1981 | Dudgeon et al. | |
| RE31,779 E | 12/1984 | Alliger | |
| 4,488,816 A | 12/1984 | Vota | |
| 4,541,281 A | 9/1985 | Chubachi et al. | |
| 4,571,087 A | 2/1986 | Ranney | |
| 4,644,808 A | 2/1987 | Lecoffre | |
| 4,764,905 A | 8/1988 | Granz et al. | |
| 4,834,124 A | 5/1989 | Honda | |
| 4,862,060 A | 8/1989 | Scott et al. | |
| 4,879,011 A | 11/1989 | Schram | |
| 4,889,122 A | 12/1989 | Watmough et al. | |
| 4,926,871 A | 5/1990 | Ganguly et al. | |
| 4,983,189 A | 1/1991 | Peterson et al. | |
| 5,026,167 A | 6/1991 | Berliner, III | |
| 5,037,481 A | 8/1991 | Bran | |
| 5,176,446 A * | 1/1993 | Chiba et al. | 366/114 |
| 5,368,054 A | 11/1994 | Koretsky et al. | |
| 5,395,592 A | 3/1995 | Bolleman et al. | |
| 5,409,594 A | 4/1995 | Al-Jiboory et al. | |
| 5,484,573 A | 1/1996 | Berger et al. | |
| 5,523,058 A | 6/1996 | Umemura et al. | |
| 5,601,526 A | 2/1997 | Chapelon et al. | |
| 5,623,095 A | 4/1997 | Beller | |
| 5,631,425 A | 5/1997 | Wang et al. | |
| 5,639,423 A | 6/1997 | Northrup et al. | |
| 5,681,396 A | 10/1997 | Madanshetty | |
| 5,688,406 A | 11/1997 | Dickinson et al. | |
| 5,736,100 A | 4/1998 | Miyake et al. | |
| 5,759,162 A | 6/1998 | Oppelt et al. | |
| 5,779,985 A | 7/1998 | Suchoieiki | |
| 5,803,099 A | 9/1998 | Sakuta et al. | |
| 5,831,166 A | 11/1998 | Kozuka et al. | |
| 5,834,648 A | 11/1998 | Wang et al. | |
| 5,890,802 A | 4/1999 | Evensen et al. | |
| 5,962,338 A | 10/1999 | Sucholeiki | |
| 5,993,671 A | 11/1999 | Peltzer | |
| 6,003,388 A | 12/1999 | Oeftering | |
| 6,010,316 A | 1/2000 | Haller et al. | |
| 6,039,309 A | 3/2000 | Kuklinski | |
| 6,042,556 A | 3/2000 | Beach et al. | |
| 6,086,821 A | 7/2000 | Lee | |
| 6,100,084 A | 8/2000 | Miles et al. | |
| 6,210,128 B1 | 4/2001 | Rife et al. | |
| 6,224,778 B1 | 5/2001 | Peltzer | |
| 6,244,738 B1 | 6/2001 | Yasuda et al. | |
| 6,277,332 B1 | 8/2001 | Sucholeiki | |
| 6,284,113 B1 | 9/2001 | Bjornson et al. | |
| 6,291,180 B1 | 9/2001 | Chu | |
| 6,361,747 B1 | 3/2002 | Dion et al. | |
| 6,413,783 B1 | 7/2002 | Wohlstadter et al. | |
| 6,440,725 B1 | 8/2002 | Pourahmadi et al. | |
| 6,515,030 B1 | 2/2003 | Bechtel et al. | |
| 6,699,711 B1 | 3/2004 | Hahn et al. | |
| 6,719,449 B1 | 4/2004 | Laugharn, Jr. et al. | |
| 6,737,021 B2 | 5/2004 | Watari et al. | |
| 6,948,843 B2 * | 9/2005 | Laugharn et al. | 366/127 |
| 7,211,927 B2 | 5/2007 | Puskas | |
| 7,329,039 B2 * | 2/2008 | Laugharn et al. | 366/114 |
| 7,687,026 B2 * | 3/2010 | Laugharn et al. | 422/3 |
| 7,687,039 B2 * | 3/2010 | Laugharn et al. | 422/128 |
| 2003/0165482 A1 | 9/2003 | Rolland et al. | |
| 2004/0054286 A1 | 3/2004 | Audain et al. | |
| 2004/0076545 A1 | 4/2004 | Watari et al. | |
| 2004/0264293 A1 | 12/2004 | Laugharn et al. | |
| 2005/0142664 A1 | 6/2005 | Loney | |
| 2005/0150830 A1 | 7/2005 | Laugharn et al. | |
| 2005/0235740 A1 | 10/2005 | Desie et al. | |
| 2006/0029525 A1 | 2/2006 | Laugharn et al. | |
| 2006/0158956 A1 | 7/2006 | Laugharn et al. | |
| 2007/0053795 A1 | 3/2007 | Laugharn et al. | |
| 2008/0031094 A1 | 2/2008 | Laugharn et al. | |
| 2008/0050289 A1 | 2/2008 | Laugharn et al. | |
| 2008/0056960 A1 | 3/2008 | Laugharn et al. | |

FOREIGN PATENT DOCUMENTS

| | | |
|---|---|---|
| DE | 2557668 | 6/1977 |
| DE | 19534955 | 3/1996 |
| DE | 19617924 | 11/1997 |
| DE | 19756874 A1 | 6/1999 |
| DE | 19820466 | 11/1999 |
| DE | 10325307 | 7/2004 |
| EP | 0643982 A1 | 3/1995 |
| EP | 0709136 | 1/1996 |
| EP | 0707892 | 4/1996 |
| EP | 1128185 | 8/2001 |
| EP | 1344562 | 9/2003 |
| GB | 1015962 | 1/1966 |
| GB | 1536693 | 12/1978 |
| WO | WO 9502456 | 1/1995 |
| WO | WO 9858417 | 12/1998 |
| WO | WO 0025125 | 5/2000 |
| WO | WO 2006033307 | 3/2006 |
| WO | WO 2007016605 | 2/2007 |

OTHER PUBLICATIONS

"A prototype of a 500kHz ultrasonic Matricidal Device: Beam Scanner, Application to in-vivo heel bone quantitative characterization", Defontaine et al, 1999 IEEE Ultrasonics Symposium, pp. 1585-1588, dated 1999.

"A new method for the generation and use of focused ultrasound in experimental biology", as submitted on Jul. 6, 1942, Lynn et al., The Journal of General Physiology, vol. 26, The Rockefeller University Press, pp. 179-193, copyright 1942.

European Search Report and Office Action from European Application No. EP 07 02 2472 dated Jan. 15, 2009.

International Search Report and Written Opinion from International Patent Application PCT/US2004/040133 dated Apr. 20, 2005.

Steven V. Ley and Caroline M.R. Low, Ultrasound in Synthesis, Springer-Verlag 1989, pp. 18-28.

"Some applications of Ultrasonics", Brockelsby, J. Sci. Instrum., vol. 40, pp. 153-156, dated 1963.

\* cited by examiner

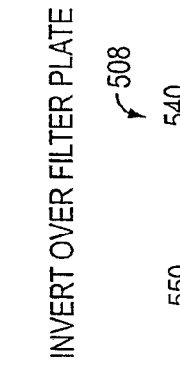
FIG. 5A
FIG. 4A
FIG. 4B
FIG. 4C
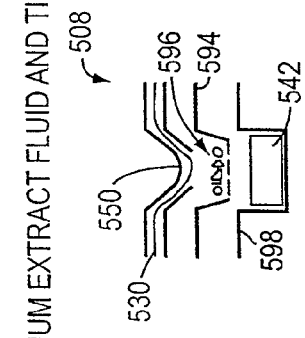
FIG. 6A
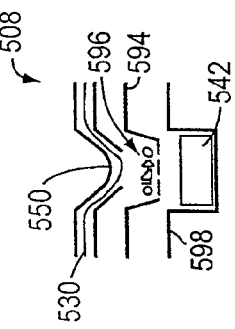
FIG. 6B
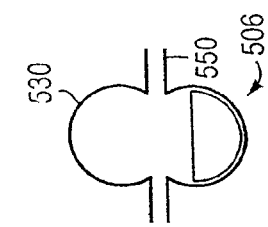
FIG. 5B
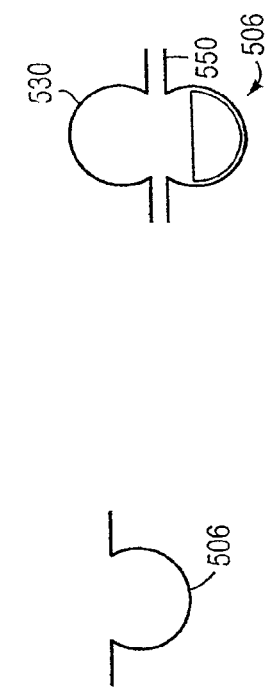
FIG. 5C

US 7,981,368 B2

METHOD AND APPARATUS FOR ACOUSTICALLY CONTROLLING LIQUID SOLUTIONS IN MICROFLUIDIC DEVICES

REFERENCE TO RELATED APPLICATIONS

This application is a divisional of application Ser. No. 11/167,934, now U.S. Pat. No. 7,686,500, entitled "Method and Apparatus for Acoustically Controlling Liquid Solutions in Microfluidic Devices" filed on Jun. 27, 2005. U.S. Pat. No. 7,686,500 is a continuation of application Ser. No. 09/812,723, now U.S. Pat. No. 6,948,843, entitled "Method and Apparatus for Acoustically Controlling Liquid Solutions in Microfluidic Devices" filed on Mar. 20, 2001. This application, U.S. Pat. No. 7,686,500 and U.S. Pat. No. 6,948,843 each claim the benefit of and priority to U.S. Provisional Patent Applications 60/246,838, entitled "Method and Apparatus for Microstream Mixing of Liquid Solutions in Micro Fluidic Devices" filed on Nov. 8, 2000; 60/198,923, entitled "Method and Apparatus for Microstream Mixing of Fluidic Liquid Solutions" filed on Apr. 21, 2000, and 60/191,297, entitled "Method and Apparatus for Microstream Mixing of Fluidic Liquid Solutions" filed on Mar. 21, 2000; and International Patent Application PCT/US99/25274, entitled "Apparatus and Methods for Controlling Sonic Treatment" filed on Oct. 28, 1999, which itself claims priority to U.S. Provisional Patent Applications 60/105,933, entitled "Cryotripsy: Disruption of Frozen Samples by Sound Waves" filed on Oct. 28, 1998; 60/110,460, entitled "Permeabilization of Biological Samples by Sound" filed on Dec. 1, 1998; 60/119,500, entitled "Apparatus and Methods for Disrupting a Biological Sample" filed on Feb. 10, 1999; 60/143,440, entitled. "Apparatus and Methods for Sterilization by Controlled Sonic Waves" filed on Jul. 13, 1999; and 60/148,279, entitled "Apparatus and Methods for Ultrasonic Stirring and Heating" filed on Aug. 11, 1999, the disclosures of all of which are hereby incorporated by reference.

FIELD OF THE INVENTION

The invention generally relates to non-contact mixing. More particularly, in one embodiment, the invention is directed to a device and related methods for non-contact mixing and fluid control.

BACKGROUND OF THE INVENTION

Microfluidic devices, including "biochip" arrays, "laboratories on a chip", ultraminiaturized instruments, and the like, have become widely used in research, development, and testing (including diagnostics). Examples include the study of biological-based processes, such as functional genomics ("DNA microarrays"), proteomics, and the like. Often the underlying principle of these reaction devices is an initial binding event between material on a substrate with the device and material in a solution that exposed to the substrate. Binding events are often diffusion limited and can be enhanced by mixing. Pre- and post-processing such as washing and elution steps can also benefit from mixing in the device. Procedures not necessarily requiring binding, such as electrophoresis and some types of chromatography, are also being implemented on very small devices, often using integrated circuit technology from microelectronics processing. These and other process areas that have been or may be implemented in microfluidic device formats and which may benefit from mixing or enhanced fluid flow include extraction, resuspension, solvation, emulsification, separation, and detection.

It is difficult to actively mix or control fluid flow in small, microfluidic devices: These devices typically have internal dimensions less than about 50 millimeters and flow velocities typically less than about 10 millimeters per second. For these devices, the Reynolds Numbers encountered are typically less than about one (1), so that flow is smooth and non-turbulent. Viscous laminar flow effects dominate and there are no significant inertial effects. Under these conditions, flow streamlines are parallel. In this domain, mass transfer or exchange across the streamlines typically occurs by diffusion. The detrimental effects of having a diffusion-based system on commercial products are numerous, such as but not limited to a constraint on reducing assay times and difficulty in actively controlling intra-assay precision and accuracy.

It is known that acoustic energy, particularly ultrasonic energy, may be used to effect mixing by multiple processes, including temperature, cavitation, and acoustic streaming. For example, acoustic-based mixing has been shown to improve antibody detection and reduce incubation times. However, in the prior art, ultrasonic mixing is performed with a nonfocused transducer operating in the 20,000 to 40,000 Hz range. The transducer contacts the sample fluid directly, which severely limits practical applications, particularly with microfluidic devices. Moreover, when cavitation bubbles formed in older devices collapse, the bubble nucleation, growth and collapse is not directed, nor controlled device.

SUMMARY OF THE INVENTION

To solve the above discussed deficiencies in prior art approaches, in one embodiment, the invention provides a new apparatus that improves processes related to microfluidic devices and similar structures, including biochips, lab-on-a-chip devices, and multi-well plate formats. In a further embodiment, the invention also provides for treatment of other internal spaces of microfabricated devices having cavitation promoting features or textures.

In one aspect, the apparatus of the invention controls fluid flow by providing nucleation features at particular locations to lower a cavitation threshold. In another aspect, the apparatus of the invention controls an acoustic field to reduce the cavitation threshold at pre-existing cavitation features. The invention may control the acoustic field, for example, through focussing, blocking, and/or reflecting techniques.

According to one embodiment, the invention provides an apparatus and related methods for its use in mixing and fluid movement control. In one aspect, the apparatus includes an acoustic energy source, such as an ultrasound transducer; a controller for providing a waveform type and amplitude controlling signal to the transducer; and one or more nucleation promoting features. The nucleation features may be, for example, mechanical, electrical or chemical in nature. The apparatus may incorporate feedback control mechanisms for adjusting characteristics of the acoustic field generated by the acoustic source.

In one embodiment, the volume of fluid mixed or controlled is between about 1 pico liter (pl) to about 3 ml. In another embodiment, the volume of fluid is between about 10 nanoliters (nl) to about 100 nl In some embodiments, the acoustic source/transducer, the controller and the nucleation promoting features are fabricated integrally with a microdevice containing a fluid to be mixed or caused to flow. In other embodiments one or both of the acoustic source and the controller are fabricated separately from and located remotely to the microdevice. In embodiments where the acoustic source is external to or separate from the microdevice, the acoustic source couples to the microdevice, for example, by way of a liquid, gel solid, vapor or gas. In alternate embodiments, the acoustic source may be in contact with the fluid to be controlled. In other embodiments, a portion of a microdevice, such as a wall or other structure, is the couplant that couples acoustic energy from an acoustic source to the fluid to be controlled.

The acoustic energy source may be any suitable source, such as a piezoelectric acoustic source. The source may or may not be focussed. Source frequencies in the range of about 10 kilohertz (kHz) to about 100 megahertz (MHz) are preferred in the practice of the invention, because at these frequencies, the acoustic field may be usefully focussed or otherwise shaped and controlled. For a focussed transducer, the resulting focal zone in the microdevice can be small. The size of the focal zone varies approximately inverse to the frequency. By way of example, at about 3 MHz, focal zones of about 1 mm in diameter and about 4 mm long can be obtained. By way of further example, at about 10 MHz, the diameter can be less than about 0.3 mm and the length about 2 mm. Non-focussed transducers operating at these frequencies may have useful natural focussing. For example, a non-focussed transducer 25 mm in diameter operating at 1 MHz will produce an acoustic beam having a natural focal zone about 7 mm in diameter at its narrowest point. These sizes may be large relative to the regions of interest in microfabricated devices. Preferably, the ultrasonic energy delivered is sufficiently intense to at least form a cavitation bubble in a target zone. In a preferred embodiment, the ultrasonic energy delivered is sufficiently intense to oscillate the bubble in the target zone. At still higher energies the delivered ultrasonic energy can result in formation and streaming of bubble(s) in the target zone; this is preferred for some types of microfluidic devices.

In one embodiment, a piezoelectric acoustic transducer is integrally formed in a microfabricated device In a further integrated embodiment, an array of piezoelectric acoustic drivers are co-fabricated with an array of active sites adapted, for example, for detection or reaction. An example of a suitable piezoelectric acoustic source is provided in the fabrication of atomic force microscopes and similar devices.

In some embodiments, the acoustic source is movable with respect to the target microdevice components. In other embodiments, the target microdevice is moveable with respect to the acoustic source. In another embodiment, the invention provides an individual pathway from the acoustic source to each element of an array in the microdevice containing the fluid to be controlled. According to one embodiment, this is accomplished by providing an acoustic waveguide to conduct acoustic energy to each element of the array of the microdevice.

Also, as noted, a sound conducting material, such as water, vapor, gas, gel, or solid material, can be placed between the acoustic source and the microdevice. For example, a water bath may be employed to conduct acoustic energy from the acoustic source of the mixing apparatus to a microdevice containing the liquid to be mixed.

In one embodiment, nucleation sites are positioned at specific locations. The ultrasonic energy is directed to a region containing nucleation sites. In one embodiment, the nucleation sites are features or textures that act to promote the formation of bubbles and gas cavities within a fluid. The features may be point features such as pits, crevices, defects or linear features such as scratches, grooves or ridges, or arrays of point features or linear features. The features may also be embodied in variations in hydrophobicity, wetability, surface energy and/or a distribution of impurities or contaminants on or in a surface of the microdevice. Multiple features may be employed in regular arrays or randomly in a region to create cavitation inducing textures within a microdevice. The features are disposed at locations on or within a fluid device such that desired mixing or flow patterns are achieved in the presence of an appropriate acoustic field. The nucleation sites may also be disposed in the liquid to be controlled. Such nucleation sites can be, for example, a particle, bead, microsphere of resin.

Localized variations in material properties, such as acoustic impedance, hydrophobicity, wetability, or surface energy may be employed as nucleation sites to create cavitation inducing loci on a surface of the microdevice and may be beneficially combined with the above discussed nucleation sites. A distribution of impurities in or on a surface of the microdevice may also be employed as nucleation-promoting features. Also, electrodes can be employed to facilitate nucleation at particular sites.

In a further embodiment, the invention directs acoustic energy to commonly occurring irregularities, which may be created in the construction of fabricated fluid devices, such as rough cut edges, to nucleate bubbles at predictable, reliable locations.

In one aspect of the invention, cavitation effects may be used to induce rotational or convective flow within a fluid in a microdevice chamber, causing local mixing. In another aspect of the invention, cavitation effects may be used to induce bubble formation and decay within a defined portion of a fluid conduit, thereby inducing a localized valve effect. In another aspect of the invention, bubbles or cavities are generated and released from a nucleation locus or loci such that they stream in response to acoustic field gradients for the purpose of causing fluid flow within a chamber or conduit.

The above effects may be applied to a variety of fluids, particularly biochemical fluids, molecules and reactions. The localized acoustic energy may be used for a variety of purposes. Among these are mixing fluids, moving fluids, improving reaction rates, accelerating molecular interactions, conditioning reaction sites, denaturing molecules, and if required, providing local heating.

BRIEF DESCRIPTION OF THE DRAWINGS

For a fuller understanding of the nature and objects of the invention, reference should be made to the following detailed description and the accompanying drawings, in which the drawings are not necessarily to scale, and in which:

FIG. 4A is a schematic illustration of a vertical-sided treatment vessel;

FIG. 4B is a schematic illustration of a conical treatment vessel;

FIG. 4C is a schematic illustration of a curved treatment vessel;

FIGS. 5A-5C are schematic illustrations of several embodiments of a treatment vessel with a combination of an upper and lower member and samples in the vessels prior to treatment;

FIG. 6A is a schematic illustration of a treatment vessel positioned over a collection container prior to transferring the contents of the vessel to the container;

FIG. 6B is a schematic illustration of a treatment vessel positioned over a collection container after transferring some of the contents of the vessel to the container;

DESCRIPTION OF AN ILLUSTRATIVE EMBODIMENT

Figure 1:
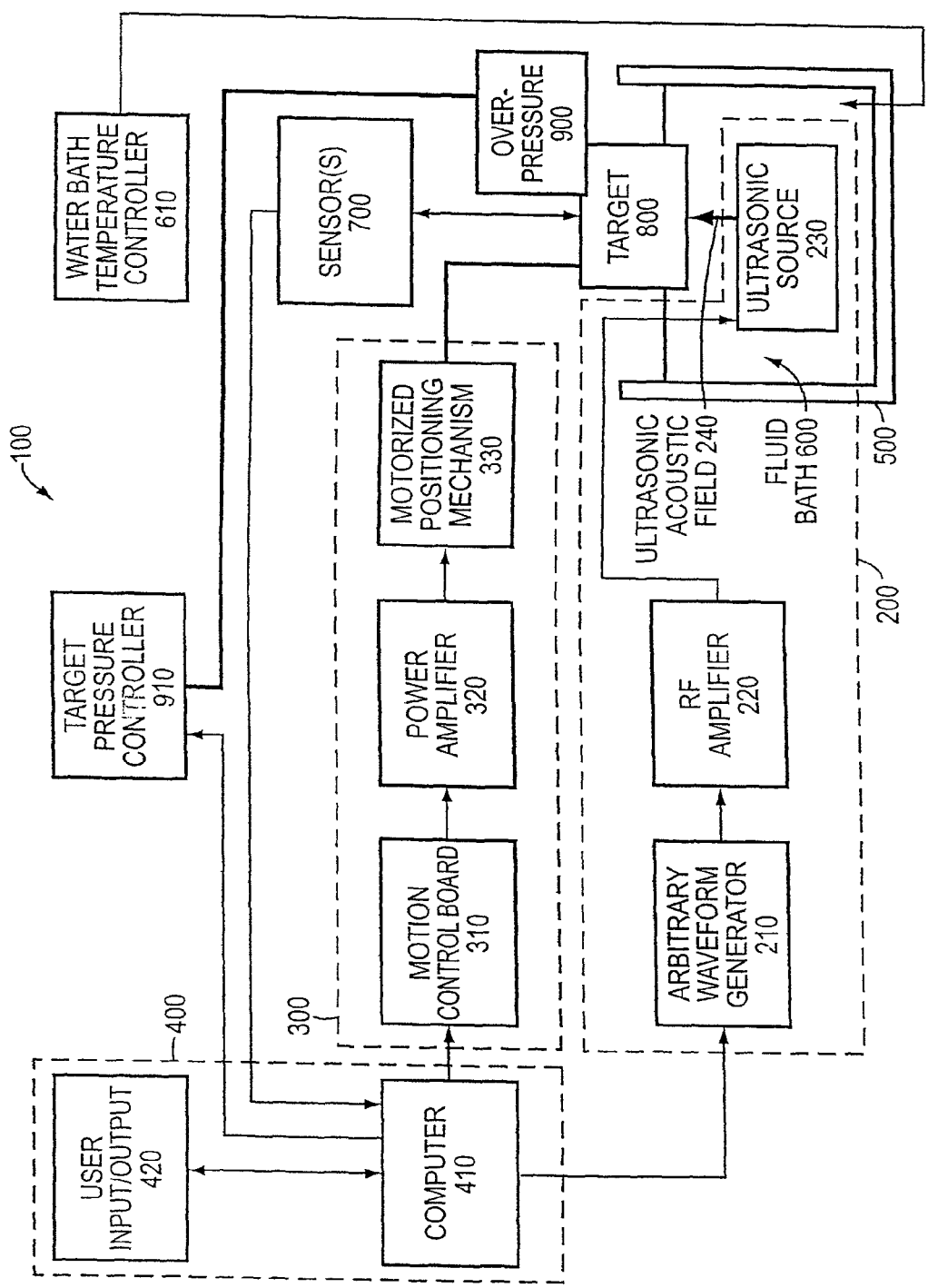
FIG. 1 is a schematic illustration of one embodiment of the apparatus according to the invention.

"Acoustic energy" as used herein is intended to encompass such terms as sonic energy, acoustic waves, acoustic pulses, ultrasonic energy, ultrasonic waves, ultrasound, shock waves, sound energy, sound waves, sonic pulses, pulses, waves, or any other grammatical form of these terms, as well as any other type of energy that has similar characteristics to acoustic energy. "Focal zone" or "focal point" as used herein means an area where acoustic energy converges and/or impinges on a target, although that area of convergence is not necessarily a single focused point. As used herein, the terms "microplate," "microtiter plate," "microwell plate," and other grammatical forms of these terms can mean a plate that includes one or more wells into which samples may be deposited. As used herein, "nonlinear acoustics" can mean lack of proportionality between input and output. For example, in our application, as the amplitude applied to the transducer increases, the sinusoidal output loses proportionality such that eventually the peak positive pressure in the acoustic field increases at a higher rate than the peak negative pressure. Also, water becomes nonlinear at high intensities, and in a converging acoustic field, the waves become more disturbed as the intensity increases toward the focal point. Nonlinear acoustic properties of tissue can be useful in diagnostic and therapeutic applications. As used herein, "acoustic streaming" means generation of fluid flow by acoustic waves. The effect can be non-linear. Bulk fluid flow of a liquid in the direction of the sound field can be created as a result of momentum absorbed from the acoustic field. As used herein, "acoustic microstreaming" means time-independent circulation that occurs only in a small region of the fluid around a source or obstacle for example, an acoustically driven bubble in a sound field. As used herein, "acoustic absorption" refers to a characteristic of a material relating to the material's ability to convert acoustic energy into thermal energy. As used herein, "acoustic impedance" Means a ratio of sound pressure on a surface to sound flux through the surface, the ratio having a reactance and a resistance component. As used herein, "acoustic lens" means a system or device for spreading or converging sounds waves. As used herein, "acoustic scattering" means irregular and multi-directional reflection and diffraction of sound waves produced by multiple reflecting surfaces, the dimensions of which are small compared to the wavelength, or by certain discontinuities in the medium through which the wave is propagated. As used herein, "cavitation" means the nucleation, expansion and decay or collapse of a vacuum space (cavity) or gas/vapor space (bubble) in a fluid as a result of an acoustic pressure field. As used herein, "bubble" means a gas body or cavity in a fluid or at a fluid/solid interface having in its interior a vacuum, or a gas or mixture of gasses. As used herein, "couplant" means any single material or plurality of materials in an acoustic path for coupling acoustic energy from a source location to another location. A couplant can be a portion of a microdevice, such as a wall of a microdevice, used to couple acoustic energy from an acoustic source to an internal chamber of the microdevice. As used herein, "non-contact" refers to an acoustic source not being in mechanical contact with a fluid to be controlled. As used herein, "active site" means location of a receptor or sensor of any kind, such as, nucleic acid, nucleic acid probe, protein, antibody, small molecule, tissue sample and nonbiological material. As used herein, "couplant" means a material that conducts acoustic energy from a source to another location.

I. Apparatus and Methods for Ultrasonic Treatment

In certain embodiments, the apparatus includes a source of sonic energy, a sensor for monitoring the energy or its effect, and a feedback mechanism coupled with the source of sonic energy to regulate the energy (for example, voltage, frequency, pattern) for transmitting ultrasonic energy to a target. Devices for transmission may include detection and feedback circuits to control one or more of losses of energy at boundaries and in transit via reflection, dispersion, diffraction, absorption, dephasing and detuning. For example, these devices can control energy according to known loss patterns, such as beam splitting. Sensors can detect the effects of ultrasonic energy on targets, for example, by measuring electromagnetic emissions, typically in the visible, IR, and UV ranges, optionally as a function of wavelength. These effects include energy dispersion, scattering, absorption, and/or fluorescence emission. Other measurable variables include electrostatic properties such as conductivity, impedance, inductance, and/of the magnetic equivalents of these properties. Measurable parameters also include observation of physical uniformity, pattern analysis, and temporal progression uniformity across an assembly of treatment vessels, such as a microtiter plate.

As shown in FIG. 1, one or more sensors coupled to a feedback control results in more focused, specific, or controlled treatment than that possible using current methods typical in the art. The feedback methodology can include fixed electronic elements, a processor, a computer, and/or a program on a computer. The electronic elements, processor, computer, and/or computer program can in turn control any of a variety of adjustable properties to selectively expose a sample to sonic energy in a given treatment. These properties can include modulation of the ultrasonic beam in response to a detected effect. Modifiable ultrasonic wave variables can include intensity, duty cycle, pulse pattern, and spatial location. Typical input parameters that can trigger an output can include change in level of signal, attainment of critical level, plateauing of effect, and/or rate of change. Typical output actions can include sonic input to sample, such as frequency, intensity, duty cycle; stopping sample movement or sonic energy; and/or moving beam within a sample or to the next sample.

More particularly, FIG. 1 depicts an electronically controlled ultrasonic processing apparatus 100 that includes an ultrasound treatment system and associated electronics 200, a positioning system 300 for the sample target 800 being treated, and a control system 400 which controls, generates, and modulates the ultrasound signal and controls the positioning system 300 in a predetermined manner that may or may not include a feedback mechanism. The source of sonic energy 230 and the target 800 being treated for example, a sample, multiple samples, or other device are arranged in a fluid bath 600, such as water, such that the source of sonic energy 230 is oriented towards the target 800. The target 800 may be positioned proximate the surface of the fluid bath 600, above the source of sonic energy 230, all being contained within a sample processing vessel 500. Any of a multitude of sensors 700 for measuring processing parameters can be arranged in or proximate to the fluid bath 600. A temperature control unit 610 may be used to control the temperature of the fluid in the fluid bath 610. An overpressure system 900 can control, for example, cavitation, by maintaining a positive pressure on the target 800 and may be adjusted, in a predetermined manner that may or may not include feedback processing, by a target pressure controller 910 that is connected to the control system 400.

An ultrasound acoustic field 240 can be generated by the sonic energy source 230, for example, a focused piezoelectric ultrasound transducer, into the fluid bath 600. According to one embodiment, the sonic energy source 230 can be a 70 mm diameter spherically focused transducer having a focal length of 63 mm, which generates an ellipsoidal focal zone approximately 2 mm in diameter and 6 mm in axial length when operated at a frequency of about 1 MHz. The sonic energy source 230 is positioned so that the focal zone is proximate the surface of the fluid bath 600. The sonic energy source 230 can be driven by an alternating voltage electrical signal generated electronically by the control system 400.

The positioning system 300 can include at least one motorized linear stage 330 that allows the target to be positioned according to a Cartesian coordinate system. The positioning system 300 may position and move the target 800 relative to the source 230 in three dimensions (x, y, z) and may optionally move either or both of the target 800 and the sonic energy source 230. The positioning system 300 can move target 800 during and as part of the treatment process and between processes, as when multiple samples or devices within the target 800 are to be processed in an automated or high-throughput format. The positioning system 300 may position or move the target 800 in a plane transverse to the focal axis of the sonic energy source 230 (x- and y-axes). The positioning system 300 can position and move the target 800 along the focal axis of the sonic energy source 230 and lift or lower the target 800 from or into the fluid bath 600 (z-axis). The positioning system 300 can also position the sonic energy source 230 and any or all of the sensors 700 in the fluid bath 600 along the focal axis of the sonic energy source 230, if the sensors 700 are not affixed in the water bath 600, as well as lift, lower, or otherwise move the sonic energy source 230. The positioning system 300 also can be used to move other devices and equipment such as detection devices and heat exchange devices from or into the fluid bath 600 (z-axis). The linear stages of the positioning mechanism 330 can be actuated by stepper motors (not shown), which are driven and controlled by electrical signals generated by the control system 400, or other apparatus known to those skilled in the art.

The control system 400 can include a computer 410 and a user input/output device or devices 420 such as a keyboard, display, printer, etc. The control system is linked with the ultrasound treatment system 200 to drive the sonic energy source 230, with the positioning system 300 to drive the stepper motors described above, with one or more sensors 700 to detect and measure process conditions and parameters, and with one or more controllers; such as the target pressure controller 910, to alter conditions to which the target 800 is exposed. A fluid bath controller 610 can also be linked with the control system 400 to regulate temperature of the fluid bath 600. The user interface 420 allows an operator to design and specify a process to be performed upon a sample. In this regard, the ultrasound treatment system 200 can include an arbitrary waveform generator 210 that drives an RF amplifier 220, such that the sonic energy source 230 receives an input. The output signal of the RF amplifier 220 may be conditioned by an impedance matching network and input to the sonic energy source 230. The computer 410 also drives and controls the positioning system 300 through, for example, a commercially available motion control board 310 and stepper motor power amplifier device 320.

The control system 400 can generate a variety of useful alternating voltage waveforms to drive the sonic energy source 230. For instance, a high power "treatment" interval consisting of about 5 to 1,000 sine waves, for example, at 1.1 MHz, may be followed by a low power "convection mixing" interval consisting of about 1,000 to 1,000,000 sine waves, for example, at the same frequency. "Dead times" or quiescent intervals of about 100 microseconds to 100 milliseconds, for example, may be programmed to occur between the treatment and convection mixing intervals. A combined waveform consisting of concatenated treatment intervals, convection mixing intervals, and dead time intervals may be defined by the operator or selected from a stored set of preprogrammed waveforms. The selected waveform may be repeated a specified number of times to achieve the desired treatment result. Measurable or discernible process attributes such as sample temperature, water bath temperature, intensity of acoustic cavitation, or visible evidence of mixing in the sample processing vessel 500, may be monitored by the control system 400 and employed in feedback loop to modify automatically the treatment waveform during the treatment process. This modification of the treatment waveform may be a proportional change to one or more of the waveform parameters or a substitution of one preprogrammed waveform for another. For instance, if the sample temperature deviates excessively during treatment from a set-point temperature due to absorbed acoustic energy, the control system 400 may proportionally shorten the treatment interval and lengthen the convection mixing interval in response to the error between the actual and target sample temperatures. Or, alternatively, the control system 400 may substitute one predetermined waveform for another. The control system 400 may be programmed to terminate a process when one or more of the sensors 700 signal that the desired process result has been attained.

The control system 400 controls and drives the positioning system 300 with the motion control board 310, power amplifier device 320, and motorized stage 330, such that the target 800 can be positioned or moved during treatment relative to the source 230 to selectively expose the target 800 to sonic energy, described more fully below.

Various aspects of the embodiment of FIG. 1 and of components of the embodiment shown in FIG. 1, as well as other embodiments with the same, similar, and/or different components, are more fully described below.

A. Transducer

In certain embodiments, the sonic energy source 230, for example, an ultrasound transducer or other transducer, produces acoustic waves in the "ultrasonic" frequency range. Ultrasonic waves start at frequencies above those that are audible, typically about 20,000 Hz or 20 kHz, and continue into the region of megahertz (MHz) waves. The speed of sound in water is about 1000 meters per second, and hence the wavelength of a 1000 Hz wave in water is about a meter, typically too long for specific focusing on individual areas less than one centimeter in diameter, although usable in nonfocused field situations. At 20 kHz the wavelength is about 5 cm, which is effective in relatively small treatment vessels. Depending on the sample and vessel volume, preferred frequencies may be higher, for example, about 100 kHz, about 1 MHz, or about 10 MHz, with wavelengths, respectively, of approximately 1.0, 0.1, and 0.01 cm. In contrast, for conventional sonication, including sonic welding, frequencies are typically approximately in the tens of kHz, and for imaging, frequencies are more typically about 1 MHz and up to about 20 MHz. In lithotripsy, repetition rates of pulses are fairly slow, being measured in the hertz range, but the sharpness of the pulses generated give an effective pulse wavelength, or in this case, pulse rise time, with frequency content up to about 100 to about 300 MHz, or 0.1-0.3 gigahertz (GHz).

The frequency used in certain embodiments of the invention also will be influenced by the energy absorption characteristics of the sample or of the treatment vessel, for a particular frequency. To the extent that a particular frequency is better absorbed or preferentially absorbed by the sample, it may be preferred. The energy can be delivered in the form of short pulses or as a continuous field for a defined length of time. The pulses can be bundled or regularly spaced.

A generally vertically oriented focused ultrasound beam may be generated in several ways. For example, a single-element piezoelectric transducer, such as those supplied by Sonic Concepts, Woodinville, Wash., that can be a 1.1 MHz focused single-element transducer, can have a spherical transmitting surface that is oriented such that the focal axis is vertical. Another embodiment uses a flat unfocused transducer and an acoustic lens to focus the beam. Still another embodiment uses a multi-element transducer such as an annular array in conjunction with focusing electronics to create the focused beam. The annular array potentially can reduce acoustic sidelobes near the focal point by means of electronic apodizing, that is by reducing the acoustic energy intensity, either electronically or mechanically, at the periphery of the transducer. This result can be achieved mechanically by partially blocking the sound around the edges of a transducer or by reducing the power to the outside elements of a multi-element transducer. This reduces sidelobes near the energy focus, and can be useful to reduce heating of the vessel. Alternatively, an array of small transducers can be synchronized to create a converging beam. Still another embodiment combines an unfocused transducer with a focusing acoustic mirror to create the focused beam. This embodiment can be advantageous at lower frequencies when the wavelengths are large relative to the size of the transducer. The axis of the transducer of this embodiment can be horizontal and a shaped acoustic mirror used to reflect the acoustic energy vertically and focus the energy into a converging beam.

In certain embodiments, the focal zone can be small relative to the dimensions of the treatment vessel to avoid heating of the treatment vessel. In one embodiment, the focal zone has a radius of approximately 1 mm and the treatment vessel has a radius of at least about 5 mm. Heating of the treatment vessel can be reduced by minimizing acoustic sidelobes near the focal zone. Sidelobes are regions of high acoustic intensity around the focal point formed by constructive interference of consecutive wavefronts. The sidelobes can be reduced by apodizing the transducer either electronically, by operating the outer elements of a multi-element transducer at a lower power, or mechanically, by partially blocking the acoustic waves around the periphery of a single element transducer. Sidelobes may also be reduced by using short bursts, for example in the range of about 3 to about 5 cycles in the treatment protocol.

The transducer can be formed of a piezoelectric material, such as a piezoelectric ceramic. The ceramic may be fabricated as a "dome", which tends to focus the energy. One application of such materials is in sound reproduction; however, as used herein, the frequency is generally much higher and the piezoelectric material would be typically overdriven, that is driven by a voltage beyond the linear region of mechanical response to voltage change, to sharpen the pulses. Typically, these domes have a longer focal length than that found in lithotriptic systems, for example, about 20 cm versus about 10 cm focal length. Ceramic domes can be damped to prevent ringing. The response is linear if not overdriven. The high-energy focus of one of these domes is typically cigar-shaped. At 1 MHz, the focal zone is about 6 cm long and about 2 cm in diameter for a 20 cm dome, or about 15 mm long and about 3 mm wide for a 10 cm dome. The peak positive pressure obtained from such systems is about 1 MPa (mega Pascal) to about 10 MPa pressure, or about 150 PSI (pounds per square inch) to about 1500 PSI, depending on the driving voltage.

The wavelength, or characteristic rise time multiplied by sound velocity for a shock wave, is in the same general size range as a cell, for example about 10 to about 40 micron. This effective wavelength can be varied by selection of the pulse time and amplitude, by the degree of focusing maintained through the interfaces between the source and the material to be treated, and the like.

In certain embodiments, the focused ultrasound beam is oriented vertically in a water tank so that the sample may be placed at or near the free surface. The ultrasound beam creates shock waves at the focal point. In an embodiment to treat industry standard microplates which hold a plurality of samples in an array, a focal zone, defined as having an acoustic intensity within about 6 dB of the peak acoustic intensity, is formed around the geometric focal point. This focal zone has a diameter of approximately 2 mm and an axial length of about 6 mm.

Ceramic domes are adaptable for in vitro applications because of their small size. Also, systems utilizing ceramic domes can be produced at reasonable cost. They also facilitate scanning the sonic beam focus over a volume of liquid, by using microactuators which move a retaining platform to which the sample treatment vessel is attached.

Another source of focused pressure waves is an electromagnetic transducer and a parabolic concentrator, as is used in lithotripsy. The excitation tends to be more energetic, with similar or larger focal regions. Strong focal peak negative pressures of about −16 MPa have been observed. Peak negative pressures of this magnitude provide a source of cavitation bubbles in water, which can be desirable in an extraction process.

The examples described below use a commercial ultrasonic driver using a piezoelectric ceramic, which is stimulated by application of fluctuating voltages across its thickness to vibrate and so to produce acoustic waves. These may be of any of a range of frequencies, depending on the size and composition of the driver. Such drivers are used in lithotripsy, for example, as well as in acoustic speakers and in ultrasound diagnostic equipment, although without the control systems as described herein.

These commercially-available drivers have a single focus. Therefore, to treat, for example, to stir, an entire microplate with such a device, it is typically necessary to sequentially position or step each well at the focus of the driver. Because stirring time is brief, the stepping of a 96 well plate can be accomplished in approximately two minutes or less with simple automatic controls, as described below. It is contemplated that this time can be shortened.

It also is possible to make multi-focal drivers by making piezoelectric devices with more complex shapes. Modulators of the acoustic field attached to an existing piezoelectric driver can also produce multiple foci. These devices can be important for obtaining rapid throughput of microplates in a high density format, such as the 1534-well format.

B. Drive Electronics and Waveform Control.

One treatment protocol can include variable acoustic waveforms combined with sample motion and positioning to achieve a desired effect. The acoustic waveform of the transducer has many effects, including: acoustic microstreaming in and near cells due to cavitation, that is flow induced by, for example, collapse of cavitation bubbles; shock waves due to nonlinear characteristics of the fluid bath; shock waves due to cavitation bubbles; thermal effects, which lead to heating of the sample, heating of the sample vessel, and/or convective heat transfer due to acoustic streaming; flow effects, causing deflection of sample material from the focal zone due to shear and acoustic pressure, as well as mixing due to acoustic streaming, that is flow induced by acoustic pressure; and chemical effects.

The treatment protocol can be optimized to maximize energy transfer while minimizing thermal effects. The treatment protocol also can effectively mix the contents of the treatment vessel, in the case of a particulate sample suspended in a liquid. Energy transfer into the sample can be controlled by adjusting the parameters of the acoustic wave such as frequency, amplitude, and cycles per burst. Temperature rise in the sample can be controlled by limiting the duty cycle of the treatment and by optimizing heat transfer between the treatment vessel and the water bath. Heat transfer can be enhanced by making the treatment vessel with thin walls, of a relatively highly thermally conductive material, and/or by promoting forced convection by acoustic streaming in the treatment vessel and in the fluid bath in the proximity of the treatment vessel. Monitoring and control of temperature is discussed in more detail below.

For example, for a cellular disruption and extraction treatment, an example of an effective energy waveform is a high amplitude sine wave of about 1000 cycles followed by a dead time of about 9000 cycles, which is about a 10% duty cycle, at a frequency of about 1.1 MHz. The sine wave electrical input to the transducer typically results in a sine wave acoustic output from the transducer. As the focused sine waves converge at the focal point, they can become a series of shock waves due to the nonlinear acoustic properties of the water or other fluid in the bath. This protocol treats the material in the focal zone effectively during the "on" time. As the material is treated, it typically is expelled from the focal zone by acoustic shear and streaming. New material circulates into the focal zone during the "off" time. This protocol can be effective, for example, for extracting the cellular contents of ground or particulate leaf tissue, while causing minimal temperature rise in the treatment vessel.

Figure 2:
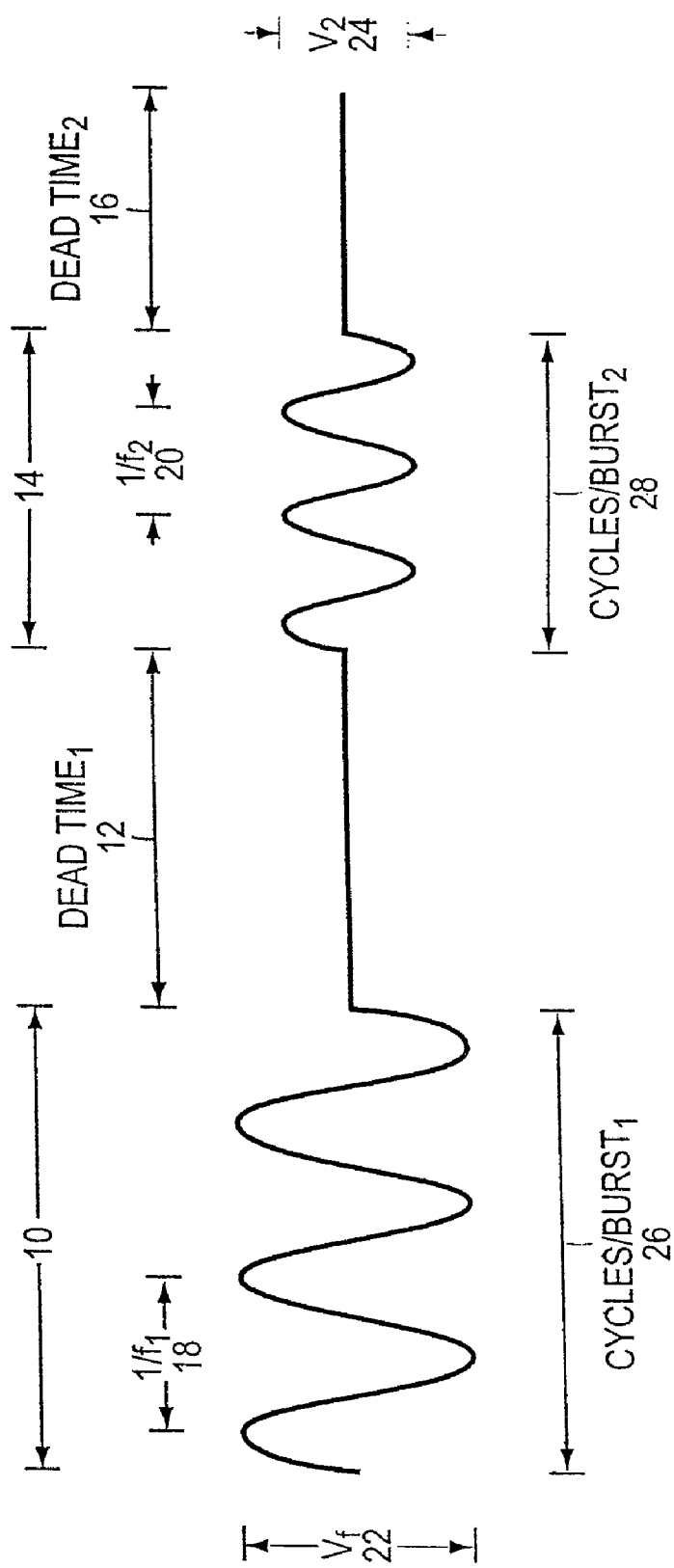
FIG. 2 is a schematic illustration of one example of sonic energy control showing sine waves at a variable amplitude and frequency.

Further advantage in disruption and other processes may be gained by creating a high power "treat" interval 10 alternating with a low power "mix" interval 14, as shown schematically in FIG. 2. More particularly, in this example, the "treat" interval 10 utilizes a sine wave that has a treatment frequency 18, a treatment cycles-per-burst count 26, and a treatment peak-to-peak amplitude 22. The "mix" interval 14 has a mix frequency 20, a mix cycles-per-burst count 28 and a lower mix peak-to-peak amplitude 24. Following each of the intervals 10, 14 is a dead time 12, 16. Of course, these relationships are merely one example of many, where one interval in considered to be high power and one interval is considered to be low power, and these variables and others can be altered to produce more or less energetic situations. Additionally, the treat function or interval and the mix function or interval could emit from different or multiple transducers in the same apparatus, optionally emitting at different frequencies.

High power/low power interval treatments can allow multiple operations to be performed, such as altering permeability of components, such as cells, within the sample followed by subsequent mixing of the sample. The treat interval can maximize cavitation and bioeffects, while the mix interval can maximize mixing within the treatment vessel and/or generate minimal heat. Adding a longer, high power "super-mix" interval occasionally to stir up particles that are trapped around the periphery of the treatment vessel can provide further benefits. This "super-mix" interval generates additional heat, so it is programmed to treat infrequently during the process, for example, every few seconds. Additionally, dead times between the mix and treat intervals, during which time substantially no energy is emitted from the sonic energy source, can allow fresh material to circulate into the energy focal zone of the target.

As discussed below, moving the sample vessel during treatment relative to the source, so that the focal zone moves within the treatment vessel, can further enhance the process. For example, target motion through the focal zone can resuspend material in the sample that may have clumped or become trapped around the periphery of the treatment vessel. A similar improvement can be achieved by traversing or "dithering" the treatment vessel relative to the focal zone, described more fully below with respect to FIG. 3. Dithering can become increasingly advantageous as the sample treatment vessel becomes significantly larger than the focal zone.

The waveform of focused sound waves can be a single shock wave pulse, a series of individual shock wave pulses, a series of shock wave bursts of several cycles each, or a continuous waveform. Incident waveforms can be focused directly by either a single element, such as a focused ceramic piezoelectric ultrasonic transducer, or by an array of elements with their paths converging to a focus. Alternatively, multiple foci can be produced to provide ultrasonic treatment to multiple treatment zones, vessels, or wells.

Reflected waveforms can be focused with a parabolic reflector, such as is used in an "electromagnetic" or spark-gap type shock-wave generator. Incident and reflected waveforms can be directed and focused with an ellipsoidal reflector such as is used in an electrohydraulic generator. Waveforms also can be channeled.

The waveform of the sound wave typically is selected for the particular material being treated. For example, to enhance cavitation, it can be desirable to increase the peak negative pressure following the peak positive pressure. For other applications, it can be desirable to reduce cavitation but maintain the peak positive pressure. This result can be achieved by performing the process in a pressurized chamber at a slight pressure above ambient. For example, if the waveform generated has a peak negative pressure of about −5 MPa, then the entire chamber may be pressurized to about 10 MPa to eliminate cavitation from occurring during the process. Liquid to be treated can be pressurized on a batch or a continuous basis.

A variety of methods of generating waves can be used. In lithotripsy, for example, "sharp" shock waves of high intensity and short duration are generated. Shock waves may be generated by any method that is applicable to a small scale. Such methods include spark discharges across a known gap; laser pulses impinging on an absorptive or reflective surface; piezoelectric pulses; electromagnetic shock waves; electrohydraulic shock waves created by electrical discharges in a liquid medium; and chemical explosives. In the case of explosives, microexplosives in wells in a semiconductor-type chip can be fabricated in which the wells are individually addressable. Also, a magnetostrictive material can be exposed to a magnetic field, and it can expand and/or contract such that the material expansion/contraction creates sonic energy.

Continuous sinusoidal sound waves can be generated by any process that is appropriate for focusing on a small scale. For example, ceramic piezoelectric elements may be constructed into dome shapes to focus the sound wave into a point source. In addition, two or more shock waves may be combined from the same source, such as piezoelectric elements arranged in mosaic form, or from different sources, such as an electromagnetic source used in combination with a piezoelectric source, to provide a focused shock wave.

Typically, the shock wave is characterized by a rapid shock front with a positive peak pressure in the range of about 15 MPa, and a negative peak pressure in the range of about negative 5 MPa. This waveform is of about a few microseconds duration, such as about 5 microseconds. If the negative peak is greater than about 1 MPa, cavitation bubbles may form. Cavitation bubble formation also is dependent upon the surrounding medium. For example, glycerol is a cavitation inhibitive medium, whereas liquid water is a cavitation promotive medium. The collapse of cavitation bubbles forms "microjets" and turbulence that impinge on the surrounding material.

The waves are applied to the samples either directly, as for example, piezoelectric pulses, or via an intervening medium. This medium can be water or other fluid. An intervening medium also can be a solid, such as a material which is intrinsically solid or a frozen solution. Waves also can be applied through a container, such as a bottle, bag, box, jar, or vial.

For maximum control, and particularly for well-by-well mixing, a focused acoustic pulse is useful. When a pulse is emitted from a curved source with an elliptical profile, then the emitted acoustic waves or pulses focus in a small region of maximum intensity. The location of the focus can be calculated or determined readily by experiment. The diameter of the focal zone can be of the same general size as or smaller than the diameter of the treatment vessel. Then, mixing energy can be provided to each well for a repeatable amount of time, providing uniform mixing of each sample.

C. X-Y-Z Cartesian Positioning System.

In certain embodiments, the sample is not only moved into position relative to the transducer initially, but positioned during treatment to insure uniform treatment of the sample, where the sample is kept well suspended during treatment. As used herein, x and y axes define a plane that is substantially horizontal relative to ground and/or a base of an apparatus of the invention, while the z axis lies in a plane that is substantially vertical relative to the ground and/or the base of an apparatus and perpendicular to the x-y plane.

One positioning scheme is termed "dithering," which entails slightly varying the position of the sample relative to the source which can occur by moving the sample through the focal zone in several ways. For example, but without limitation, the sample can be moved in a circle, or oval, or other arcuate path with a certain radius 30 and moved a certain distance 34 in certain increments or steps 32, as depicted schematically in FIG. 3. These movements can vary between treatment cycles or during a particular treatment cycle and have several effects. First, dithering the sample position sweeps the focal zone through the volume of the sample treatment vessel or device, treating material that is not initially in the focal zone. In addition, varying the location of the acoustic focus within the vessel tends to make treatment, and the resulting heating, more uniform within each sample.

Certain embodiments include drive electronics and devices for positioning of the sample(s). In one embodiment, the positioning sequence, optionally including dithering, and the treatment pulse train are pre-programmed, for example in a computer, and are executed automatically. The driver electronics and positioners can be linked through the control system to sensors so that there is "real time" feedback of sensor data to the control system during treatment in order to adjust the device(s) for positioning the sample and prevent localized heating or cavitation. The drive electronics can include a waveform generator matching network, an RF switch or relay, and a radio frequency (RF) amplifier, for safety shutdown.

The positioning system can include a three axis Cartesian positioning and motion control system to position the sample treatment vessel or an array of sample treatment vessels relative to the ultrasound transducer. The "x" and "y" axes of the Cartesian positioning system allow each sample in an array of samples, such as an industry standard microplate, to be brought into the focal zone for treatment. Alternative configurations may employ a combination of linear and rotary motion control elements to achieve the same capabilities as the three axis Cartesian system. Alternative positioning systems may be constructed of self-contained motor-driven linear or rotary motion elements mounted to each other and to a base plate to achieve two- or three-dimensional motion.

As used in the examples, stepper motors, such as those available from Eastern Air Devices, located in Dover, N.H., drive linear motion elements through lead screws to position the sample. The stepper motors are driven and controlled by means of LabVIEW software controlling a ValueMotion stepper motor control board available from National Instruments, located in Austin, Tex. The output signals from the control board are amplified by a nuDrive multi-axis power amplifier interface, also available from National Instruments, to drive the stepper motors.

The computer controlled positioning system can be programmed to sequentially move any defined array of multiple samples into alignment with the focal zone of the ultrasound transducer. If temperature rise during treatment is an issue, the samples in a multi-sample array can be partially treated and allowed to cool as the positioning system processes the other samples. This can be repeated until all the samples have been treated fully.

Figure 3:
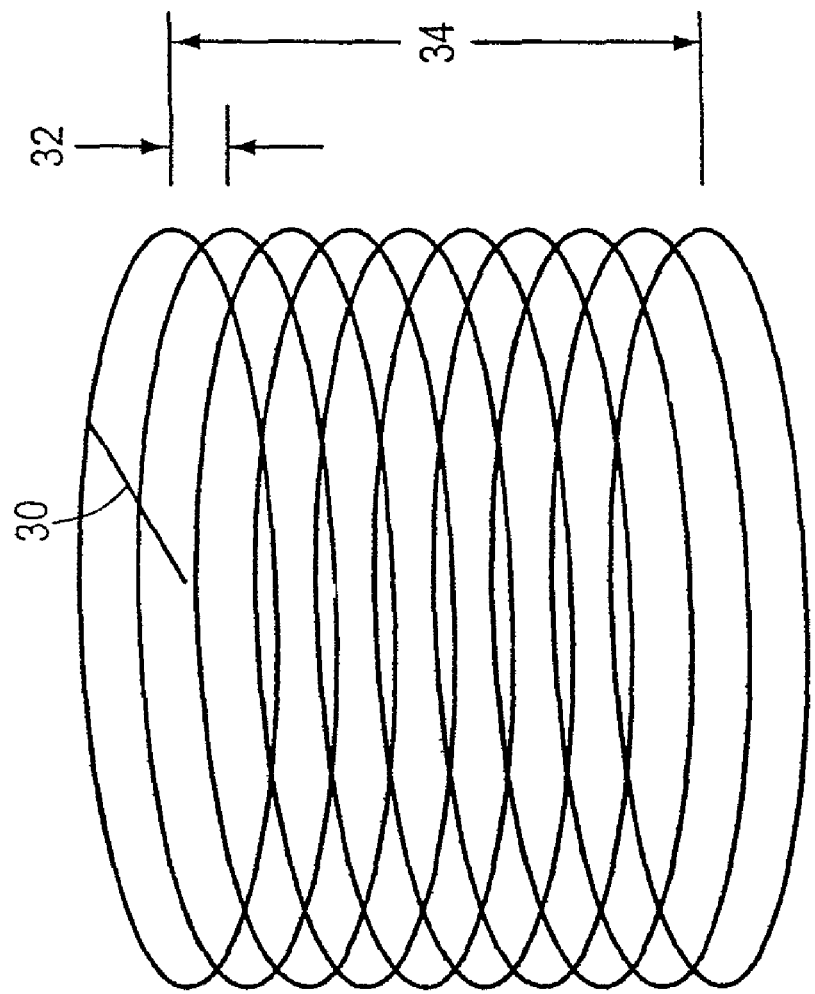
FIG. 3 is a schematic illustration of one example of an intra-sample positioning (dithering) profile showing height, height step, and radius.

The positioning system also can move the sample treatment vessel relative to the focal point during treatment to enhance the treatment or to treat a sample that is large relative to the focal zone. By sweeping the sample slowly in a circular or other motion during treatment, clumps of material around the periphery of the treatment vessel may be broken up advantageously. In addition, x-y dithering may prevent a "bubble shield" from forming and blocking cavitation in the sample treatment vessel. The x-y dithering may also enhance treatment of sample suspensions that have a high viscosity or become more viscous during treatment and do not mix well. The sample position may also be dithered vertically in the z-axis. This may be advantageous in a deep treatment vessel where the depth is substantially larger than the axial dimension of the focal zone, in order to treat the entire contents of the treatment vessel or to resuspend larger sample fragments which have sunk to the bottom of the vessel. Dithering in all three dimensions may also be employed, as depicted in FIG. 3

For a relatively flat sample, such as whole leaf tissue, a histological sample, or thin-section specimen, where the area of the sample is large relative to the cross-sectional area of the focal zone, the x-y positioning system can cause the focal zone to traverse the sample in order to treat the entire surface of the sample. This procedure may be combined with optical analysis or other sensors to determine the extent of the treatment to each portion of the sample that is brought into the focal zone.

In certain embodiments, the sample or array of samples can be moved relative to the transducer and the other parts of the apparatus. In alternative embodiments the transducer is moved while the sample holder remains fixed, relative to the other parts of the apparatus. As an alternative, movement along two of the axes, for example, x and y, can be assigned to the sample holder and movement along the third axis, z in this case, can be assigned to the transducer.

The three axis positioning system enables automated energy focus adjustment in the z-axis when used in conjunction with a sensor for measuring the ultrasound intensity. In one embodiment, a needle hydrophone can be mounted in a fixture on the sample positioning system. The hydrophone can be traversed in three dimensions through the focal region to record the acoustic intensity as a function of position in order to map out the focal zone. In another embodiment, a number of positions on a sheet of aluminum foil held in the sample holder can be treated in a sequence of z-axis settings. The foil can then be examined to determine the spot size of the damage at each position. The diameter of the spot corresponds generally to the diameter of the focal zone at that z-axis setting. Other, fully automated embodiments of a focusing system can also be constructed.

The three axis positioning system also allows the apparatus to be integrated into a larger laboratory automation scheme. A positioning system with an extended work envelope can transfer microplates or other sample vessels into and out of the apparatus. This allows the apparatus to interact automatically with upstream and downstream processes.

D. Sensors

Visual Monitoring of the Sample

Optical or video detection and analysis can be employed to optimize treatment of the sample. For example, in a suspension of biological tissue, the viscosity of the mixture can increase during treatment due to the diminution of the particles by the treatment and/or by the liberation of macromolecules into the solution. Video analysis of the sample during treatment allows an automated assessment of the mixing caused by the treatment protocol. The protocol may be modified during the treatment to promote greater mixing as a result of this assessment. The video data may be acquired and analyzed by the computer control system that is controlling the treatment process. Other optical measurements such as spectral excitation, absorption, fluorescence, emission, and spectral analysis also can be used to monitor treatment of the sample. A laser beam, for example, can be used for alignment and to indicate current sample position.

Monitoring of Temperature

Heating of individual wells can be determined by an infrared temperature-sensing probe, collimated so as to view only the well being treated with the ultrasonic energy. For example, an infrared thermal measuring device can be directed at the top unwetted side of the treatment vessel. This provides a non-contact means of analysis that is not readily achievable in conventional ultrasound treatment configurations. The thermal information can be recorded as a thermal record of the sample temperature profile during treatment.

Active temperature monitoring may be used as a feedback mechanism to modify the treatment protocol during the treatment process to keep the sample temperature within specified limits. For example, an infrared sensor directed at the sample treatment vessel may input temperature readings to the computer. The computer, in accordance with a controlling program, can produce output directed to the circuit enabling the ultrasonic transducer, which in turn can reduce the high power treatment intervals and increase the low power mixing intervals, for example, if the sample temperature is nearing a specified maximum temperature.

Monitoring of Cavitation

A variety of methods may be employed to detect cavitation. For example, acoustic emissions, optical scattering, high-speed photography, mechanical damage, and sonochemicals can be used. As described above for monitoring temperature, information from cavitation detection can be used by the system to produce an output that selectively controls exposure of a sample to sonic energy in response to the information. Each of these methods to monitor cavitation are described more fully below.

Acoustic emissions: Bubbles are effective scatterers of ultrasound. The pulsation mode of a bubble is referred to as monopole source, which is an effective acoustic source. For small, generally linear oscillations, the bubble simply scatters the incident acoustic pulse. However, as the response becomes more nonlinear, it also starts to emit signals at higher harmonics. When driven harder, the bubbles start to generate subharmonics as well. Eventually as the response becomes aperiodic or chaotic, the scattered field tends towards white noise. In the scenario where inertial collapses occur, short acoustic pressure pulses are emitted. An acoustic transducer can be configured to detect these emissions. There is a detectable correlation between the onset of the emissions and cell disruption.

Optical scattering: Bubbles also scatter light. When bubbles are present, light is scattered. Light can normally be introduced into the system using fiber optic light sources so that cavitation can be detected in real-time, and therefore can be controlled by electronic and computer systems.

High-speed photography: Bubbles can be photographed. This method typically requires high-speed cameras and high intensity lighting, because the bubbles respond on the time frame of the acoustics. It also requires good optical access to the sample under study. This method can give detailed and accurate data and may be a consideration when designing systems according to the invention. Stroboscopic systems, which take images far less frequently, can often give similar qualitative performance more cheaply and easily than high-speed photography.

Mechanical damage: Cavitation is known to create damage to mechanical systems. Pitting of metal foils is a particularly common effect, and detection method. There is a correlation between the cavitation needed to pit foils and to disrupt cells.

Sonochemicals: A number of chemicals are known to be produced in response to cavitation. The yield of these chemicals can be used as a measure of cavitational activity. A common technique is to monitor light generation from chemicals, such as luminol, that generate light when exposed to cavitation. Sonochemical yield usually can not be done during cell experiments but can be done independently under identical conditions, and thereby, provide a calibrated standard.

E. Temperature, Cavitation, and Pressure Management and Control.

Temperature Control

Certain applications require that the temperature of the sample being processed be managed and controlled during processing. For example, many biological samples should not be heated above 4° C. during treatment. Other applications require that the samples be maintained at a certain elevated temperature during treatment. The ultrasound treatment protocol influences the sample temperature in several ways: the sample absorbs acoustic energy and converts it to heat; the sample treatment vessel absorbs acoustic energy and converts it to heat which, in turn, can heat the sample; and acoustic streaming develops within the sample treatment vessel and the water bath, forcing convective heat transfer between the sample treatment vessel and the water bath. In the case of a relatively cool water bath, this cools the sample.

The acoustic waves or pulses can be used to regulate the temperature of the solutions in the treatment vessel. At low power, the acoustic energy produces a slow stirring without marked heating. Although energy is absorbed to induce the stirring, heat is lost rapidly through the sides of the treatment vessel, resulting in a negligible equilibrium temperature increase in the sample. At higher energies, more energy is absorbed, and the temperature rises. The degree of rise per unit energy input can be influenced and/or controlled by several characteristics, including the degree of heat absorption by the sample or the treatment vessel and the rate of heat transfer from the treatment vessel to the surroundings. Additionally, the treatment protocol may alternate a high-powered treatment interval, in which the desired effects are obtained, with a low power mixing interval, in which acoustic streaming and convection are achieved without significant heat generation. This convection may be used to promote efficient heat exchange or cooling.

The thermal information can also be used to modify or control the treatment to maintain the sample temperature rise below a maximum allowable value. The treatment can be interrupted to allow the sample to cool down. In certain embodiments, the output of the thermal measurement device or system is entered into the computer control system for recording, display on a control console, and/or control of exposure of the sample to sonic energy through a feedback loop, for example by altering the duty cycle.

Temperature rise during ultrasonic continuous wave exposure can be controlled, if required, by refrigeration of a liquid or other sample before, during, or after passage through a zone of sonic energy, if processing in a continuous, flow-through mode. In generally stationary discrete sample processing modes, a sample can be cooled by air, by contact with a liquid bath, or a combination of both air and liquid. The temperature is rapidly equilibrated within the vessel by the stirring action induced by the acoustic waves. As a result, and especially in small vessels or other small fluid samples, the rate of temperature increase and subsequent cooling can be very rapid. The rate of delivery of sonic energy to the material can also be controlled, although that can lengthen processing time.

Liquids within the sample can be provided at any temperature compatible with the process. The liquid may be frozen or partially frozen for processing. For example, when biological material is subjected to subzero temperatures below about −5° C., most, but not all, of the water is in the solid phase. However, in certain biological tissues, micro-domains of liquid water still remain for several reasons, such as natural "antifreeze" molecules or regions of higher salt concentration. Therefore, sample temperature may be varied during the procedure. A temperature is selected at which microdomains of liquid water are able to form shock wave induced cavitation due to bubble formation and collapse, resulting in shear stresses that impinge on surrounding tissues. Indeed, gradually altering the sample temperature can be desirable, as it provides focused domains of liquid water for collection of sonic energy for impingement on the surrounding material.

Treatment baths can be relatively simple, and can include a water bath or other fluid bath that is employed to conduct the acoustic waves from the transducer to the sample treatment vessel, where the liquid is temperature controlled. In certain embodiments, the entire bath is maintained at a specific temperature by means of an external heater or chiller, such as a Neslab RTE-210 chiller available from Neslab Instruments, Inc., located in Newington, N.H., and heat exchanger coils immersed in the bath. The sides and bottom of the tank containing the bath may have sufficient insulating properties to allow the bath to be maintained substantially uniformly at a specific temperature. Another embodiment, such as that depicted in FIG. 7, employs an inner tray or sample tank 76 made of an insulating material such as rigid polystyrene foam which is set within a larger water bath 84 in a transducer tank 82. The inner tray 76 has heat-exchanger tubes or other heating or cooling devices within it (not shown) to allow a fluid 78 such as ethylene glycol or propylene glycol in the inner tray 76 to be heated or cooled beyond what may be practical for the fluid 84 such as water in the outer bath in the transducer tank 82. The inner tray 76 has an acoustic window 88 in the bottom. The acoustic window 88 is made of a thin film material having low acoustic absorption and an acoustic impedance similar to water. This inner tray 76 is arranged so that the acoustic window 88 is aligned with a transducer 86 which is outside the tray 76, supported with a support 80 in the water 84. A sample 74 is located within a microtiter plate or other sample treatment vessel 72, within the tray 76 and is subjected to the thermal influence of the inner treatment bath 78. The treatment vessel 70 can be movable relative to the transducer 86 with a positioning system 70. Also, sonic energy focuses on the sample 74 through the acoustic window 88. This arrangement permits the use of separate fluids and substantially independent control of the temperature of the inner 76 and outer treatment baths 84. The smaller volume of the inner tray 76 facilitates the use of antifreeze mixtures, such as a mixture of propylene glycol and water, at temperatures below the freezing temperature of water. This, in turn, allows the samples 74 to be processed and treated at temperatures below the freezing temperature of water. This embodiment is beneficial for treatment applications requiring that the sample materials 74 be maintained at temperatures near or below the freezing point of water. It allows for the containment of treatment bath fluids 78, such as antifreeze solutions, that may not be compatible with the transducer 86 and other system components. It also allows the transducer 86 to be maintained at a different temperature than the samples 74. This embodiment may also be connected with any of the other components described in FIG. 1 and is suitable for use in a system with or without feedback loop control.

Sample temperature may be required to remain within a given temperature range during a treatment procedure. Temperature can be monitored remotely by, for example, an infra-red sensor. Temperature probes such as thermocouples may not be particularly well suited for all applications because the sound beam may interact with the thermocouple and generate an artificially high temperature in the vicinity of the probe. Temperature can be monitored by the same computer that controls acoustic waveform. The control responds to an error signal which is the difference between the measured actual temperature of the sample and the target temperature of the sample. The control algorithm can be as a hysteritic bang-bang controller, such as those in kitchen stoves, where, as an output of the control system, the acoustic energy is turned off when the actual temperature exceeds a first target temperature and turned on when the actual temperature falls below a second target temperature that is lower than the first target temperature. More complicated controllers can be implemented. For example, rather than simply turning the acoustic signal on and off, the acoustic signal could continuously be modulated proportionally to the error signal, for example, by varying the amplitude or the duty cycle, to provide finer temperature regulation.

In the application of a bang-bang control algorithm for a multiple sample format, once a maximum temperature value has been exceeded and the sonic energy is turned off for a particular sample, an alternative to waiting for the sample to cool below a selected temperature before turning the sonic energy on again, is to move on to the next sample. More particularly, some of the samples can be at least partially treated with sonic energy, in a sequence, and then, the system can return to the previously partially treated samples to take a sensor reading to determine if the samples have cooled below the selected temperature and to reinitiate treatment if they have. This procedure treats the samples in an efficient manner and reduces the total treatment time for treating multiple samples. Another alternative is to switch to a predefined "cooling" waveform which promotes convection without adding significant heat to a particular sample, rather than moving on to the next sample and returning to the first sample at a later time.

If uniformity of temperature throughout the sample is important, then control techniques can be used to ensure a uniform temperature distribution. An array of infra-red sensors can be used to determine the distribution of the temperature inside the sample. If areas of increased temperature relative to the rest of the sample appear, then the transducer can be switched from high power "treatment" mode to low power "mixing" mode. In the low power "mixing" mode, the sample is acoustically stirred until the sample is substantially uniform in temperature. Once temperature uniformity is achieved, the high power "treatment" mode is reinitiated: A control system can monitor temperature and responsively turn the various modes on or off. When controlled by a computer, the intervals during which these modes are used can be very short, for example fractions of a second, thereby not significantly prolonging treatment titnes. Stepping times between wells, or other sample containers, can also be less than a second with suitable design.

Cavitation Control

In some applications, it can be preferable to treat the sample with as much energy as possible without causing cavitation. This result can be achieved by suppressing cavitation. Cavitation can be suppressed by pressurizing the treatment vessel above ambient, often known as "overpressure," to the point at which no negative pressure develops during the rarefaction phase of the acoustic wave. This suppression of cavitation is beneficial in applications such as cell transformation where the desired effect is to open cellular membranes while maintaining viable cells. In other applications it may be desirable to enhance cavitation. In these applications, a "negative" overpressure or vacuum can be applied to the region of the focal zone.

The control of cavitation in the sample also can be important during acoustic treatment processes. In some scenarios, the presence of small amounts of cavitation may be desirable to enhance biochemical processes; however, when large numbers of cavitation bubbles exist they can scatter sound before it reaches the target, effectively shielding the sample.

Cavitation can be detected by a variety of methods, including acoustic and optical methods. An example of acoustic detection is a passive cavitation detector (PCD) which includes an external transducer that detects acoustic emissions from cavitation bubbles. The signal from the PCD can be filtered, for example using a peak detector followed by a low pass filter, and then input to a controlling computer as a measure of cavitation activity. The acoustic signal could be adjusted in ways similar to those described in the temperature control example to maintain cavitation activity at a desired level.

Overpressure: Increased ambient pressure is one technique for controlling cavitation. Overpressure tends to remove cavitation nuclei. Motes in the fluid are strongly affected by overpressure and so cavitation in free-fluid is often dramatically reduced, even by the addition of one atmosphere of overpressure. Nucleation sites on container walls tend to be more resistant to overpressure; however the cavitation tends to be restricted to these sites and any gas bubbles that float free into the free-fluid are quickly dissolved. Therefore cells in the bulk fluid are typically unaffected by cavitation sites restricted to the container walls. Overpressure may be applied to the treatment vessel, the array of treatment vessels, the treatment bath and tank, or to the entire apparatus to achieve a higher than atmospheric pressure in the region of the focal zone.

Degassing: Reducing the gas content of the fluid tends to reduce cavitation, again by reducing cavitation nuclei and making it harder to initiate cavitation. Another method of controlling cavitation or the effects of cavitation is to control the gasses that are dissolved in the sample fluid. For instance, cavitation causes less mechanical damage in fluid saturated with helium gas than in fluid saturated with argon gas.

Filtering: Cleaner fluids tend to be harder to cavitate.

Various fluids: Certain fluids are much harder to cavitate. Castor oil and mineral oil are nearly cavitation free. Two possible reasons are that the fluids are of a nature that they tend to fill in cracks, and that their viscosity also makes them more resistant to cavitation. The fluids, however, are not particularly compatible with cell preparations.

Waveform shape: The cavitation field responds to the acoustic driving pulse. It is possible to control the cavitation response, to some extent, by controlling the driving acoustic pressure. Cavitation may also be reduced or eliminated by reducing the number of cycles in each burst of acoustic energy. The cavitation bubbles grow over several cycles then collapse creating cavitation effects. By limiting the number of cycles in each burst, bubble growth and collapse can be substantially avoided.

F. Treatment or Reaction Vessel

Treatment vessels are sized and shaped as appropriate for the material to be treated. They can be any of a variety of shapes. For example, as shown in FIGS. 4A-4C, treatment vessels 502, 504, 506 can have vertical walls, can have a conical shape, or can have a curved shape, respectively. As shown in FIGS. 5A-5C, certain treatment vessel 502, 506, prior to treatment with sonic energy, have an upper member 530 and a lower member 550 which together form an interior region that contains the material 540 to be treated. In certain embodiments, the ultrasound transducer projects a focused ultrasound beam upwards. The ultrasound beam penetrates the lower member 550 of the treatment vessel 502, 506 to act upon the contents 540 of the treatment vessel 502, 506. The upper member 530 serves to contain the contents 540 of the vessel 502, 506.

The lower member 550 of the treatment vessel 502, 506 is configured to transmit the maximum amount of ultrasound energy to the contents 540 of the vessel 502, 506, minimize the absorption of ultrasound energy within the walls of the vessel 502, 506 and maximize heat transfer between the contents 540 of the treatment vessel 502, 506 and, for example, an external water bath. In certain embodiment of the pre-treatment assembly, the treatment vessel is thermoformed from a thin film in a hemispherical shape. The film should have an acoustic impedance similar to that of water and low acoustic absorption. One preferred material is low density polyethylene. Alternative materials include polypropylene, polystyrene, poly(ethylene teraphthalate) ("PET"), and other rigid and flexible polymers. The film may be a laminate to facilitate thermal bonding, for example using heat sealing. Thicker, more rigid materials may also be employed. Available multi-well plates in industry standard formats such as 96 well and 24 well formats may be employed with or without modification. Industry standard thick-wall, multi-well plates with thin film bottoms may also be employed. These can work particularly advantageously where the size of the focal zone of the ultrasound beam is smaller than a well. In this case, little energy is absorbed by the sides of the treatment vessel and, as a result, relatively little energy is converted to heat.

The upper member of the treatment vessel contains the contents in the vessel during treatment and can act also as an environmental seal. The upper member of the treatment vessel can be flat or domed to enclose the interior of the treatment vessel. The upper member of the treatment vessel may be made of a rigid or flexible material. Preferably, the material will have low acoustic absorption and good heat transfer properties. In certain embodiments of the pre-treatment assembly, the upper member of the treatment vessel is a thin film that can be bonded to the lower member, and the lower or upper member can be easily rupturable for post-treatment transfer of the treated material.

The upper and lower members of the treatment vessel may be joined together by thermal bonding, adhesive bonding, or external clamping. Such joining of the upper and lower members can serve to seal the contents of the vessel from contaminants in the external environment and, in an array of vessels, prevent cross-contamination between vessels. If the bond is to be achieved by thermal bonding, the upper and lower members of the treatment vessels may be made of film laminates having heat bondable outer layers and heat resistant inner layers.

The treatment vessel may be configured as a single unit, as a multiplicity of vessels in an array, or as a single unit with various compartments. The upper and lower members of the vessel or array of vessels can be used once or repeatedly. There also can be a separate frame or structure (not shown) that supports and/or stiffens the upper and lower members of the vessel(s). This frame or structure may be integral with the vessels or may be a separate member. An array of treatment vessels may be configured to match industry standard multi-well plates. In one embodiment, the treatment vessel is configured in an array that matches standard 96 well or 24 well multi-well plates. The frame or supporting structure holding the array of treatment vessels can have the same configuration and dimensions as standard multi-well plates.

As shown in FIGS. 6A and 6B, a treatment vessel 508 can include a funnel 592 to facilitate transfer of the contents 540 from the treatment vessel 508 to a separate vessel 598 after treatment. The funnel 592 can have a conical shape and include an opening at the narrow end. The funnel 592 can be rigid, relative to the upper 530 and lower members 550 of the treatment vessel 508. The large end of the funnel 592 is proximate the upper member 550 of the treatment vessel 508 and aligned with the treatment vessel 508. The volume of the funnel 592 can be marginally less than the volume of the treatment vessel 508.

One process of transferring the contents 540 of the treatment vessel 508 to another post-treatment vessel 598 includes the following steps. The upper member 530 of the treatment vessel 508 may be pierced with a sharp instrument or ruptured when a vacuum is applied. To facilitate rupture, the member 530 may be manufactured from a thin fragile material or made weak by etching a feature into the surface. Then, the treatment vessel 508 is inverted over the post-treatment vessel 598 in a vacuum fixture. A filter 594 may be placed between the treatment vessel 508 and the post-treatment vessel 598 to separate solids 596 from the liquid 542 that is removed from the treatment vessel 508. Alternatively, the filter 594 may be incorporated into the outlet of the funnel 592. This arrangement of treatment vessel 508 and funnel 592 may be configured as a single unit or as an array of units. This array may match an industry standard. The treatment vessel 508 should form a vacuum seal with a vacuum fixture (not shown) such that a pressure differential can form between the sample in the treatment vessel and the supplied vacuum. Once the vacuum is applied to the fixture, the pressure differential across the upper member 530 will cause the upper member 530 of the treatment vessel 508 to rupture and cause the lower member 550 to collapse into the funnel 592. The lower member 550 should have sufficient strength so that it does not rupture where it bridges the opening in the small end of the funnel 592. The pressure differential will cause the solid contents 596 of the treatment vessel to be squeezed between the flexible lower member 550 of the treatment vessel 508 and the relatively rigid funnel 592. This causes fluid 542 to be expelled from the solid materials 596 and collected in the post-treatment vessel 598.

In certain other embodiments, a treatment vessel can be an ampoule, vial, pouch, bag, or envelope. These and other treatment vessels can be formed from such materials as polyethylene, polypropylene, poly(ethylene teraphthalate) (PET), polystyrene, acetal, silicone, polyvinyl chloride (PVC), phenolic, glasses and other inorganic materials, metals such as aluminum and magnesium, and laminates such as polyethylene/aluminum and polyethylene/polyester. Also, certain embodiments of a treatment vessel can be made by vacuum forming, injection molding, casting, and other thermal and non-thermal processes. In embodiments where samples flow through the sonic energy, capillary tubes, etched channels, and conduits may be the sample holder during treatment as the sample flows through a structure. Additionally, free-falling drops, streams, non-moving free volumes, such as those in gravity less than one g, or a layer in a density gradient can be treated directly.

II. Materials for Treatment

A. Biological Materials

Many biological materials can be treated according to the invention. For example, such materials for treatment include, without limitation, growing plant tissue such as root tips, meristem, and callus, bone, yeast and other microorganisms with tough cell walls, bacterial cells and/or cultures on agar plates or in growth media, stem or blood cells, hybridomas and other cells from immortalized cell lines, and embryos. Additionally, other biological materials, such as serum and protein preparations, can be treated with the processes of the invention, including sterilization.

B. Binding Materials

Many binding reactions can be enhanced with treatments according to the invention. Binding reactions involve binding together two or more molecules, for example, two nucleic acid molecules, by hybridization or other non-covalent binding. Binding reactions are found, for example, in an assay to detect binding, such as a specific staining reaction, in a reaction such as the polymerase chain reaction Where one nucleotide molecule is a primer and the other is a substrate molecule to be replicated, or in a binding interaction involving an antibody and the molecule it binds, such as an immunoassay. Reactions also can involve binding of a substrate and a ligand. For example, a substrate such as an antibody or receptor can be immobilized on a support surface, for use in purification or separation techniques of epitopes, ligands, and other molecules.

C. Chemical and Mineral Materials

Organic and inorganic materials can be treated with controlled acoustic pulses according to the methods of the invention. The sonic pulses may be used to comminute a solid material, particularly under a feedback control regime, or in arrays of multiple samples. As with biological samples, individual organic and inorganic samples in an array can be treated in substantial isolation from the laboratory environment. Beside altering their physical integrity, materials can be dissolved in solvent fluids, such as liquids and gasses, or extracted with solvents. For example, dissolution of polymers in solvents can be very slow without stirring, but stirring multiple samples with current methods is difficult and raises the possibility of cross-contamination between samples. However, stirring of multiple samples without cross-contamination between samples can be accomplished with apparatus and methods of the invention.

III. Treatment Applications

A. Altering Cell Accessibility

Sonicators can disrupt cells using frequencies around 20 kHz. It is generally thought there are two ways in which ultrasound can affect cells, namely by heating and by cavitation, which is the interaction of the sound wave with small gas bubbles in the sample. Heating occurs primarily due to absorption of the sound energy by the medium or by the container. For dilute aqueous systems, it is absorption by the container that is a main source of the heating. Heating is not desirable in some treatment applications, as described herein. The heating associated with the compression and cooling associated with the rarefaction of a sound wave is relatively small, even for intense sound.

According to the invention, controlled sonic pulses in a medium are used to treat a sample containing biological material. The pulses can be specifically adapted to preferentially interact with supporting matrices in a biological material, such as plant cell walls or extracellular matrices such as bone or collagen, thereby lessening or removing a barrier function of such matrices and facilitating the insertion of extracellular components into a cell. In this application, the cell is minimally altered and cell viability is preserved. These pulses can be caused by shock waves or by sound waves. The waves can be created external to the sample, or directly in the sample, via applied mechanical devices. In experiments where thermal effects are negligible, there typically is no lysis, unless cavitation is present. Other modes of sonic energy can have different effects than disrupting a matrix and can be used either with pre-treatment, with disrupting sonic energy, or by themselves. For, example the conditions to disrupt a matrix can be different from those to permeabilize a cell membrane.

There are many possible mechanisms by which cavitation may affect cells and there is no consensus as to which mechanisms, if any, dominate. The principle mechanisms are thought to include shear, microjets, shock waves, sonochemistry, and other mechanisms, as discussed more fully below.

Shear: Significant shear forces are associated with the violent collapse of bubbles. Because cell membranes are sensitive to shear, it is thought that cavitation may permeabilize cell membranes. In some cases, the membrane is apparently permeable for only a short time, during which molecules may be passed into or out of the cell. In other cases the cell may be lysed.

Microjets: Bubbles undergoing a violent collapse, particularly near a boundary, such as a container wall, typically collapse asymmetrically and generate a liquid jet of fluid that passes through the bubble and into the boundary. The speed of this jet has been measured to be hundreds of meters a second and is of great destructive power. It may play a major role in the destruction of kidney stones by acoustic shock waves and may be a possible way of destroying blood clots.

Shock wave: Collapse of a bubble spherically can generate an intense shock wave. This pressure can be thousands of atmospheres in the neighborhood of the bubble. The compressive stress of the shock wave may be strong enough to cause cellular material to fail.

Sonochemistry: The pressure and temperatures in the bubble during an inertial collapse can be extraordinarily high. In extreme examples, the gas can be excited sufficiently to produce light, termed sonoluminescence. Although the volume is small and the time duration short, this phenomenon has been exploited to enhance chemical reaction rates. The production of free-radicals and other sonochemicals may also affect cells.

Other: Other factors also may be involved. Vessel walls may contribute cavitation nuclei. A plastic vessel with an aqueous fluid may result in a standing wave field due to internal reflections, as a result of impedance mismatches between the fluid and the vessel walls. Examples of sonolucent materials are thin latex and dialysis tubing. Tube rotation studies performed on continuous wave dosage with unfocused ultrasonics indicate that rotation has a significant effect on hemolysis. When cell contents were mechanically stirred during insonation, the cell lysis increased. These effects may be due to viscosity gradients set-up within the unfocused ultrasound field that block energy transmission.

Cellular lysis also can be aided by the addition of ultrasound contrast agents, such as air-based contrast agents or perfluorocarbon-based contrast agents. An example of an air-based contrast agent is a denatured albumin shell with air such as Albunex, available from Mallinckrodt, St. Louis, Mo., and an example of a perfluorocarbon-based contrast agent is a phospholipid coating with perfluoropropane gas such as MRX-130, available from ImaRx Pharmaceutical Corp., Tucson, Ariz.

Air bubbles can block or reflect energy transmission. Interfaces between air and water result in efficient reflection of an incident ultrasound field.

The treatment dose is a complex waveform. Sections, or components, of the waveforms can have different functions. For example, the waveform can have three components involved with sample mixing, sample lysis/disruption, and sample cooling.

In other current methods, sonolytic yield activity decreases with increasing cell concentrations in in vitro systems that are treated with continuous ultrasound waves. In contrast, methods according to the present invention disrupt tissue structures with a complex waveform of high intensity focused ultrasound, to avoid this problem.

Mixing can be an important, because it allows bubbles that may have been driven by radiation forces to the edges of the vessel chamber to be brought into contact with the cell or tissue membranes. This mixing promotes inertial, transient acoustic cavitation near the cell walls, resulting in cellular lysis.

The acoustic dosage received by a sample can be likened to a radiation dosage received by a sample. In each case, a cumulative effect of the absorbed energy dose is observed. A computer-controlled positioning system can control the cumulative energy dosage that each sample receives. For example, a software program in the computer can actively control the cumulative energy dosage by treating the sample until the system reaches a particular set-point, pausing energy application or otherwise allowing the sample to reequilibriate, and reinitiating energy application to allow a sample to receive a higher cumulative dose while maintaining semi-isothermal conditions, such as a 1 to 2 degree Centigrade temperature rise during exposure, than would otherwise be possible by continuous sonic energy application. This type of system enables high energy to be introduced into a sample while maintaining thermal control of the process.

B. Extracting

In a variation of the method to alter cellular accessibility described above, controlled pulses in a medium can be used to treat a sample containing biological material to extract a fraction or fractions of the biological material. The pulses are specifically adapted to preferentially interact with supporting matrices, such as plant cell walls or extracellular matrices such as bone or collagen, or materials having differences in rigidity or permeability in a biological material, thereby lessening or removing a barrier function of such matrices or materials. These pulses can be caused by shock waves or by sound waves. The waves can be created external to the sample, or directly in the sample, via applied mechanical means.

Using sound energy, as opposed to laser or other light energy to disrupt a biological object, can be useful. Sound is a direct fluctuation of pressure on the sample. Pressure is a physical quantity and the measure of uniform stress defined as the force per unit area. The stress acting on a material induces strain which changes dimensions of the material. The two main types of stress are a direct tensile or compressive stress and shear stress. In general, the more brittle the material, the greater the disruptive effect of an abrupt, local increase of otherwise uniform stress. Such a local stress can be created by some geometric change at a surface or within the body of the sample. For example, biological tissue frozen at −70° C. may be more prone to stress fracture than at 4° C. In addition, a sharper change in geometric or material properties tends to cause a greater stress concentration, which in turn can yield a greater disruption. Sound waves may be focused. In contrast, the energy transferred from a light-source such as a laser to a sample is electromagnetic radiation that induces non-ionizing molecular vibrations and breaks chemical bonds by ionizing. Mechanical stress on objects larger than molecules generally cannot be readily caused by electromagnetic waves, except via destructive local heating.

The supporting matrix of a biological sample can be disrupted without disrupting one or more selected internal structures of the cells contained within the matrix. Representative examples of such samples are: i) bone, in which a rigid matrix contains living cells of interest; ii) mammalian tissue samples, which contain living cells embedded in a matrix of elastic connective tissue and "glycocalyx" or intercellular matrix; and iii) plant tissues, such as leaves, which contain cells in a matrix of cellulose, often crosslinked with other materials, of moderate rigidity. Virtually all living cells are gelatinous in texture, and can be deformed to some extent without rupture or internal damage. Matrices, in contrast, are designed to support and protect cells, as well as to achieve other biological functions. In the three examples above, the matrices of bone and leaves are designed to provide rigidity to the structure, while the support of most collagenous matrices has a strongly elastic character. Thus, different protocols for example, amplitude, duration, number of pulses, and temperature of sample, may be used to disrupt different matrices by mechanical means without damaging the cellular material.

A bony matrix is both more rigid and denser than the cells it contains. Bone is vulnerable to shock waves, both because the calcified matrix will absorb the waves more efficiently than will the cells, and because the calcified matrix is weak under extensional strain, and thereby can fragment at stresses which will not damage the softer cells. Similar considerations apply to leaf matrix, although the contrast in density and modulus is less. In either case, a pulse, preferably a shock wave, is applied at an amplitude which is sufficient to fatigue the matrix components while remaining below the amplitude required to damage the cells. This intensity is determined readily for a particular type of sample by minimal routine experimentation. In such experiments, the amplitude of each pulse applied to the sample, singly or in a train of pulses, is varied to obtain the maximum rate of degradation of the matrix consistent with retention of the viability of the cells within the matrix. These parameters can be measured readily. For example, matrix degradation can be measured by variation in the compressive modulus of the sample, while cell integrity is measured by dye exclusion from cells extracted from the matrix, such as, for bone, demineralization and treatment with collagenase. In the case of a more elastic tissue, such as connective tissue, which is cross-linked but has a high extension to break, the pulses are selected to excite preferentially vibrational modes in the matrix in contrast to the cells. This can be done by selecting one or more frequencies of sound waves at which the relative absorptiveness of the matrix and the cells are maximally different. Such frequencies are determined readily by routine experimentation. A sequence of pulses may be required to differentially fatigue the matrix. The length of the pulses and the interval between them are adjusted so that the degree of heating of the sample does not cause loss of integrity of the cells, and particularly of the critical components which are to be isolated.

Three areas to optimize for extraction are treatment waveform, mixing waveform, and positioning or dithering. One method to determine the appropriate treatment and positioning parameters for a target sample for extraction purposes is described below.

First, a solid sample is placed in a volume of liquid in about a 1:1 ratio (weight/volume), in a treatment vessel. For example, 0.25 ml of methanol is added to 0.25 gm of leaf tissue in a 0.5 ml treatment vessel. A single sample is placed within the focal zone of the sonic apparatus. Without using the treatment protocol, the mixing waveform is adjusted to provide "stirring" of the sample at the lowest amplitude, fewest cycles/burst, and lowest duty cycle. After the mixing waveform protocol is defined, the disruption treatment waveform is adjusted by immobilizing the target sample in the focal zone such that there is no mixing and no sample movement, such as dithering. Using a sonic energy source such as a piezoelectric transducer, the sample is subjected to a minimum number of cycles per burst, for example, three. For extraction purposes, the amplitude is initially used with a nominal 500 mV setting. A portion of the sample is treated and inspected under a microscope for signs of membrane disruption. Such inspection can be done in conjunction with dyes that stain intracellular organelles. The number of cycles/burst is then increased until a particular desired tissue disruption level is achieved in the immobilized portion of tissue. With a fresh sample, and with a 1:1 ratio of tissue to liquid, the temperature of the sample is monitored during a million cycle total treatment with an infra-red sensor directed to the top of a thin polyethylene film covering the sample vessel. The duty cycle is adjusted to keep the temperature within predefined ranges, such as 4° C. within ±2° C.

Once these treatment parameters are discerned for a particular sample, a control unit can be programmed with these data in order to control treatment of other samples of the same or similar biological type. Alternatively, such information can preprogrammed in the control unit, and an apparatus user, through a user input interface, can designate the biological material type to be treated such that the controller then runs through the predetermined treatment cycle. Other information can be empirically determined for optimal treatment of a particular biological material in a manner similar to that described above. For example, parameters such as treatment waveforms, mixing waveforms, and sample positioning can be discerned. These parameters can vary depending upon the particular biological material, the particular liquid that surrounds the sample, and/or the particular treatment vessel used during treatment.

C. Introducing a Molecule into or Removing a Molecule from a Cell

Once a sample having a matrix has been sufficiently weakened or attenuated, but not to the point where a substantial number of cells contained within the matrix are killed or lysed, an exposed target cell or cells become amenable to insertion of exogenous molecules by techniques such as transfection or transformation. With some matrices, it may be convenient to isolate the cells from the matrices and then to transfect the cells. In other cases, it will be preferable, particularly in an automated system, to perform the transfection directly on the treated tissue sample, using solutions and conditions adapted from known techniques. Alternatively, in situations where a cell to be treated is not situated within a matrix, the cell can be directly treated according to the process below without having to pre-treat the matrix. While the treatment below is described mainly for transfection, methods and apparatus according to the invention are equally applicable to a transformation process or other processes to introduce an exogenous material into a permeabilized cell membrane.

In general, cool temperatures, less than 25° C., preferably less than 15° C., more preferably 4° C. or below, tend to minimize the degradative effects of enzymes in the sample and thereby tend to preserve the integrity of biological components to be isolated. However, cells, especially mammalian cells, may maintain their viability better at higher temperatures, such as 30 to 37° C. These temperatures also allow enzymes to be added to aid in the selective destruction of the matrix.

Alternatively, the sample temperature may be below 0° C. Except under special conditions, this will freeze the sample, or maintain it in a frozen state. Freezing can be advantageous if it enhances the disruption of the matrix while allowing the cell to remain relatively intact. For example, ice crystals formed on freezing can be selectively larger outside of cells. Since such crystals may tend to absorb acoustical energy better than water, destruction of the matrix may be enhanced. While decreasing cell viability and integrity, such a procedure could enhance the ease of transfection with exogenous material after thawing of the sample.

The waveforms used to alter the permeability of a cell are refined depending on the particular application. Typically, the shock wave is characterized by a rapid shock front with a positive peak pressure, for example about 100 MPa, and a negative peak pressure, for example about negative 10 MPa. This waveform is of a few microsecond duration, on the order of about 5 microseconds. If the negative peak is greater than about 1 MPa, cavitation bubbles may form. Cavitation bubble formation is also dependent upon the surrounding medium. For example, glycerol is a cavitation inhibitive medium; whereas, liquid water is a cavitation promotive medium. The collapse of cavitation bubbles forms "microjets" and turbulence that impinge on the surrounding material.

Sound waves, namely acoustic waves at intensities below the shock threshold, provide an alternative means of disrupting the matrix to allow access to the plasma membranes of the cells to allow transformation. Such sound waves can be generated by any known process. As biological material is subjected to subzero temperatures, for example about negative 5° C., most but not all of the water is in the solid phase. However, in certain biological tissues micro-domains of liquid water still remain for several reasons, such as natural "antifreeze" molecules or regions of higher salt concentration. Therefore, as a sample temperature is varied during the treatment with sound or shock waves, microdomains of liquid water are able to form shock waves and induce cavitation bubble formation and collapse, with the resultant shear stresses that impinge on surrounding tissues. Indeed, gradual alteration of the sample temperature can be desirable, as it provides focused domains of liquid water for impingement on the surrounding material. The waves can be applied to the samples either directly, as piezoelectric pulses, or via an intervening medium. This medium may be water, buffer, stabilizing medium for the target material to be isolated, or extraction medium for the target. An intervening medium also can be a solid, formed of a material which is intrinsically solid, or of a frozen solution. Waves also can be applied through a container, such as a microliter plate.

The techniques useful for disrupting matrix structure can be adapted, and the improved technique can be used, to facilitate the incorporation of exogenous material into cells. The exogenous material may be DNA, RNA, other nucleic acid constructs, nucleic acid monomers, plasmids, vectors, viruses, saccharides, polysaccharides, amino acids, amino acid chains, enzymes, polymers, organic molecules, inorganic molecules, proteins, cofactors, and/or visualization reagents such as fluorescent probes. In this application, shock waves or sonic waves are used to loosen the matrix, essentially as described above. However, the intensity of application of acoustic energy is kept sufficiently short, or below a critical energy threshold, so that cell integrity is completely maintained, as verified by a method such as dye exclusion.

At that point, or, optionally, previously, a solution or suspension containing the material to be incorporated into the cells is added to the sample. In one embodiment, the exogenous material is incorporated into the cells in a conventional manner, as is known in the art for cells with exposed plasma membranes. In another embodiment, acoustic energy is used to transiently permeabilize a plasma membrane to facilitate introduction of exogenous materials into the cells. The exogenous material may be present in the sample during the weakening of the matrix by acoustic energy. Even when the cells remain intact, as determined by dye exclusion or other viability measurements, the process of weakening the cell matrix by acoustic energy transiently destabilizes the plasma membranes, increasing the uptake of exogenous macromolecules and structures. If a further increase in the rate of incorporation is needed, then the intensity or time of application of acoustic energy is slightly increased until the cell membrane becomes transiently permeable. For example, a gentle pulse or wave is applied to the mixture, with a predetermined amplitude. This amplitude can be determined readily in separate experiments on samples of the same type to transiently make a plasma membrane of a cell type porous, in a similar empirical manner to the steps described above for determining an appropriate treatment to disrupt a matrix. During the transient porous state, exogenous materials diffuse into the cell and the materials are trapped there once the sonic or shock pulse is removed.

A major advantage of these methods for transfection, or other incorporation of exogenous material into living cells, is that the methods are readily amenable to scale-up, to automation, and to marked reduction in sample size and reagent volume. The wells of microplates can be used for sonic treatment, transfection, and post-transfection demonstration of successful incorporation of the added material. For example, extracellular non-incorporated reagent, for example a fluorescent material, can be inactivated by a material that does not pass the cell membrane, such as an enzyme, or certain hydrophilic or amphiphilic small-molecule reagents. Then the presence or absence of the required material can be determined directly in the sample, for example by spectroscopy. Thus, the methods are adaptable to large scale automation, in large part because they do not require the isolation of the cells from their matrix.

The permeabilized cells can be transformed or transfected, using techniques known to those skilled in the art, for example, electroporation, vacuum transfection, or using viral vectors, agrobacterium, liposomes or other delivery vehicles, plasmids, or naked nucleic acids. The buffer conditions may be altered during the process. For example, the initial permeabilization may occur with chemicals to selectively alter the external cell wall, while during the nuclear wall permeabilization step, other chemicals or biochemicals may be added to prompt selective uptake.

Additionally, with the process of permeabilization and with the mixing profile, other techniques of gene transfer may be augmented. Examples include, calcium phosphate coprecipitation, electroporation, and receptor-dependent processes.

D. Mixing, Stirring, and Heating

In fluid samples, including powdered and granular media and gasses, sample mixing is conventionally performed by vortexing or stirring, or other methods such as inversion of a sample containing an air space, and shaking. Vortexing is essentially achieved by mechanical motion of the entire vessel while stirring involves mechanical contact of a driven device with a fluid. Stirring is accomplished with a variety of devices, for example with propellers, impellers, paddles, and magnetic stir bars. One problem with these methods is that it is difficult to increase their scale in order to handle dozens or hundreds of sample vessels at once. Another problem with these methods is the difficulty of mixing multiple samples while keeping the each sample substantially free from contamination. As described in more detail below with respect to FIGS. 8-17, methods according to the invention can use sonic energy to mix a sample while avoiding problems with contamination. More particularly, factors, such as focusing the sonic energy, as well as otherwise controlling an acoustic waveform of the sonic energy to be directed at one or more nucleation sites, and selectively locating nucleation sites can be used to selectively mix a sample, for example, through acoustic streaming and/or microstreaming.

A fluid sample can be mixed controllably using the system described herein. No direct contact between the material to be mixed and the sonic energy source is required. However, in some embodiments, contact is preferable. When the material to be mixed is in a treatment vessel, such as a microplate, the treatment vessel itself is not necessarily touched by the source and is typically coupled to the source by a fluid bath. In other embodiments, the acoustic source is a microsource located within a microdevice chamber.

In certain embodiments, a treatment process for sample mixing in a treatment vessel can be summarized as follows. First, a sample is treated with sonic energy at a relatively high first treatment power in order to heat the sample by absorption of acoustic energy. Second, the sample is mixed at a second sonic energy power, which may be the same or lower than the first treatment power, to cool the sample back to its original temperature by forcing convection through material in the treatment vessel, which can be in contact with a fixed-temperature bath or reservoir.

In some embodiments, a source of focused ultrasonic waves is used. The source is mounted in a water bath or equivalent, which can provide temperature control. The microplate, with samples in the wells, is positioned so that the focus of the beam is within the well. The plate is positioned so that the bottoms of the wells are in contact with or immersed in the water or other fluid in the bath. Then, a burst of ultrasonic energy is applied to the well. This burst will cause stirring in the well, by formation of a convection cell. The stirring is easily visualized by adding particulate material to the wells, or by adding a dye in a denser or lighter solution.

It is possible to select a sound field which will stir all of the wells of a plate at one time. In one embodiment, a substantially uniform field is projected to the plate by a source, which preferentially excites the bottoms of the wells. This excitation in turns drives convective flow in each of the wells. In other embodiments, nucleation features are located in the plate proximate to each of the wells, or even inside the wells, to enable mixing to occur at lower energy levels.

In any embodiment, it can be useful to move the sample treatment vessel, such as by "dithering" the plate or well being treated relative to the source. Dithering, as used in optics and in laser printing, is a rapid side to side two or three dimensional movement of the energy source and/or the target. Dithering, or other types of motion, can even out variations in source intensity due to variations in the emitted sonic energy or the location of the sample with respect to the source. Dithering can also prevent particulates from accumulating at the wall of the well. Fluid control features, such as mixing, are discussed below in further detail with respect to FIGS. 8-17.

E. Enhancing Reactions and Separations

In certain embodiments, temperature, mixing, or both can be controlled with ultrasonic energy to enhance a chemical reaction. For example, the association rate between a ligand present in a sample to be treated and an exogenously supplied binding partner can be accelerated. In another example, an assay is performed where temperature is maintained and mixing is increased to improve association of two or more molecules compared to ambient conditions. It is possible to combine the various aspects of the process described herein by first subjecting a mixture to heat and mixing in order to separate a ligand or analyte in the mixture from endogenous binding partners in the mixture. The temperature, mixing, or both, are changed from the initial condition to enhance ligand complex formation with an exogenously supplied binding partner relative to ligand/endogenous binding partner complex formation at ambient temperature and mixing. Generally, the second temperature and/or mixing conditions are intermediate between ambient conditions and the conditions used in the first separating step above. At the second temperature and mixing condition, the separated ligand is reacted with the exogenously supplied binding partner.

Polymerase Chain Reaction ("PCR") Thermal Cycling

One of the bottlenecks of the PCR technique is cooling time. The heating cycle is rapid; however, cooling is limited by convection. Even in biochip formats, in which DNA or another target molecule is immobilized in an array on a microdevice, there is no "active" cooling process. However, certain embodiments of the invention can be used to overcome this bottleneck.

In certain embodiments, a treatment process can be used to both heat and cool the sample rapidly with little overshoot from a baseline temperature at which the primer and target to be amplified anneal. The process can be summarized as follows. A sample is treated with relatively high power sonic energy such that the sample absorbs sonic energy and is heated. Then, the sample is mixed at low power to cool the sample by forcing convection, which may be accomplished in conjunction with a cool water bath. In some embodiments of the apparatus, the system is a "dry top" system, that is, a system in which a microplate, typically with its top temporarily sealed with plastic film, floats on or is partially immersed in a controlled-temperature bath. In this arrangement, the PCR reaction may be monitored in real-time for temperature, using, for example, an infra-red detection probe, and for reaction products by examining the incorporation of fluorescent dye tagged nucleic acid probes into the PCR product. This "dry top" system permits real-time analysis and control of the process. Information from the temperature sensor can be used in a feedback loop to control the duty cycle of the acoustic input, such as the number of bursts/second, or otherwise control the amount of heating. Also, fluorescence from an intercalated probe can provide a computer with information on which wells have reached a certain point in the reaction, such as when a particular level of fluorescence is sensed, allowing, for example, the computer to control application of sonic energy or sample location such that certain wells are skipped in the processing cycle until other wells have attained the same point in the reaction or that certain wells are not processed further.

F. Purification, Separation, and Reaction Control

Focused sonic fields can be used to enhance separations. As noted elsewhere, sonic foci can be used to diminish or eliminate wall effects in fluid flow, which is an important element of many separation processes, such as chromatography including gas chromatography, size exclusion chromatography, ion exchange chromatography, and other known forms, including filed-flow fractionation. The ability to remotely modulate and/or reduce or eliminate the velocity and concentration gradients of a flowing stream is applicable in a wide variety of situations.

Sonic fields also can be used to minimize concentration polarization in membrane processes, including particle classification, filtration of fine particles and colloids, ultrafiltration, reverse osmosis, and similar processes. Concentration polarization is the result of the tendency of filtered material to be present at high concentration in a layer on the filter. This layer has a low fluid concentration and, thus, diminishes the rate of filtration as the filtered solution becomes more concentrated, or as the layer thickens. This layer can be stirred remotely by focused sonic energy of low to moderate intensity. Flow rate, thus, can be enhanced without significant cost in energy or membrane life.

Such sonic energy fields can be used to enhance reaction rates in a viscous medium, by providing remote stirring on a micro scale with minimal heating and/or sample damage. For example, some assays rely on the absorption of analytes by reagents, such as antibodies, which are bound to macroscopic particles. In a viscous fluid to be analyzed, such as sputum or homogenized stool, the ability to stir such a sample remotely, aseptically, and essentially isothermally can significantly decrease the time required to obtain equilibrium of the analyte with the reagents on the particle.

Likewise, any bimolecular (second-order) reaction where the reactants are not mixed at a molecular scale, each homogenously dissolved in the same phase, potentially can be accelerated by sonic stirring. At scales larger than a few nanometers, convection or stirring can potentially minimize local concentration gradients and thereby increase the rate of reaction. This effect can be important when both reactants are macromolecules, such as an antibody and a large target for the antibody, such as a cell, since their diffusion rates are relatively slow and desorption rates may not be significant.

These advantages may be realized inexpensively on multiple samples in an array, such as a microtiter plate. The use of remote sonic mixing provides a substantially instantaneous start time to a reaction when the sample and analytical reagents are of different densities, because in small vessels, such as the wells of a 96 or 384 well plate, little mixing will occur when a normal-density sample (about 1 g/cc) is layered over a higher-density reagent mixture. Remote sonic mixing can start the reaction at a defined time and control its rate, when required. The stepping and dithering functions allow multiple readings of the progress of the reaction to be made. The mode of detecting reaction conditions can be varied between samples if necessary. In fact, observations by multiple monitoring techniques, such as the use of differing optical techniques, can be used on the same sample at each pass through one or more detection regions.

G. Further Uses for Remotely Actuated and Controlled Solution Mixing with Sonic Energy Control of sonic energy emission, sonic energy characteristics, and/or location of a target relative to sonic energy also can be used to pump and control the flow rate of liquids, especially in capillaries; enhance chemical reactions, such as enhancing second-order reaction rates; increase effective Reynolds number in fluid flow; and control the dispensing of semi-solid substances.

By focusing sonic energy and positioning it near a wall of a vessel, a wall of a tube, or another discontinuity in a fluid path, many local differences in the distribution of materials within a sample and/or spatially-derived reaction barriers, particularly in reactive and flowing systems, can be reduced to the minimum delays required for microscopic diffusion.

Put differently, enhanced mixing can be obtained in situations where imperfect mixing is common. The range of these situations is illustrated below.

Control of Flow Rates of Fluids

Miniaturization of analytical methods, such as analysis on a chip, require concomitantly miniature capillary-sized dimensions for fluid flow paths. Sonic excitation provides a convenient, simple, and sterile manner to accelerate flow in capillaries. During excitation, the fluid is locally turbulent, and so flows more readily. By selective or timed local sonic excitation, optionally controlled with a feedback loop, the rate of flow through complex microfluidic paths can be remotely manipulated in a controlled manner. As described below with respect to FIGS. 6 and 7, methods of the invention can not only be used to increase flow, but can also be used to inhibit flow.

Increase of Effective Reynolds Number in Fluid Flow

At low Reynolds numbers, the velocity profile of laminar fluid flow in a pipe or other conduit is approximately parabolic. Fluid at the center of the pipe is flowing significantly faster than fluid near the wall. Therefore, conversion of fluid carried in the pipe from one fluid to another is quite slow, and, in principle, infinitely slow.

This effect effectively vanishes at higher Reynolds numbers because turbulents mix the fluid at the center with fluid at the periphery very rapidly, so that composition differences are rapidly eliminated. However, there are significant disadvantages to operating a fluid conduit under turbulent conditions, including high backpressure and correspondingly high energy expenditure.

If sonic energy is focussed in, on, or near the wall of the pipe, near the fluid/wall boundary, then local turbulence can be obtained without a high rate of bulk fluid flow. Excitation of the near-wall fluid in a continuous, scanned, or burst mode can lead to rapid homogenization of the fluid composition just downstream of the excited zone. This will sharpen the front between any two fluids passing through a pipe in succession. Additionally, using the further methods described in FIGS. 8-17; cavitation features can be located on or in the wall of a pipe to facilitate homogenization of the fluid flow, with the use of unfocussed acoustic energy.

This effect is useful in several areas, including chromatography; fluid flow in analytical devices, such as clinical chemistry analyzers; and conversion of the fluid in a pipeline from one grade or type to another. Since most of the effect occurs in a narrow zone, only a narrow zone of the conduit typically needs to be sonically excited. For example, in some applications, the focal zone of the sonic energy can be the region closest to a valve or other device which initiates the switch of composition. In any of these applications, feedback control can be based on local temperature rise in the fluid at a point near to or downstream of the excitation region.

Enhancement of Second-Order Reaction Rates

Microsonication can be used to speed up, or to homogenize, the rate of chemical reactions in a viscous medium. The flow of individual molecules, and of heat, is generally slower in a more viscous medium. For example, it is more difficult to mix molasses with water than to mix vinegar with water. Similarly, in an aqueous solution, it becomes increasingly difficult to maintain the rate at which soluble monomers undergo a polymerization reaction, forming a soluble polymer, as the molecular weight of the polymer increases with each added monomer, because the viscosity of the solution increases.

Mixing of molasses and water with a stirrer is simple, but not easily sterile, and a polymer can be degraded by shear caused by stirring with a stirrer. Focussed sonication can readily mix pre-sterilized liquids in a remote manner without contamination. Focused sonic energy also can mix polymerizing materials without application of macroscopic shear, and so can minimize shear degradation of the formed polymer. Similarly, a polymerase chain reaction can be accelerated by brief pulses of sonic energy, or by longer pulses which also provide the desired temperature increases, to prevent the retardation of the reaction due to local depletion of the nucleotide triphosphate monomers. As described below with respect to FIGS. 8-16, similar results can be achieved with unfocussed sonic energy by selectively locating nucleation features to enable cavitation at lower energies.

Controlled Dispensing of Semi-Solid Substances

Highly viscous liquids, including materials which effectively act as solids or near-solids, can flow at an increased rate when sonically excited by a remote or local sonic source. This excitation may be under feedback control. This effect can be caused by local reduction of impedance to flow by walls of a conduit, as described above, and by local heating from sonic energy input. As a simple example, the effective viscosity of an ink jet ink, and thus the rate of its delivery, can be controlled by focused, localized sonic energy delivery. Analogous uses are possible wherever the viscosity of a fluid, including a semi-solid or a solid capable of melting, is significant. Likewise, flow of particulate materials in a fluid where the particles are insoluble in the fluid can be selectively stimulated to occur, or be accelerated, with focussed, controlled sonic waveforms.

VI. Further Apparatus and Methods for Employing Nucleation Features to Control Fluid Movement As described briefly above, the acoustic source 230 and controller 410 may be fabricated integrally with a microdevice containing a liquid to be mixed or caused to flow. Alternatively, the controller 410 may be fabricated as a separate remotely located component and communicatively coupled (for example, via an electrical or optical interface) to the source 230. In a further illustrative embodiment, the acoustic source 230 may also be fabricated separately and located remotely from the microdevice. In such an embodiment, the acoustic source 230 couples to the microdevice for example, by way of a solid, liquid, gel, vapor or gas couplant.

In one embodiment, the source 230 is fabricated to be located inside a microchamber of a microdevice, and is in direct contact with the fluid to be controlled.

According to the illustrative embodiment, the acoustic field energy 240 is sufficiently intense to at least form a bubble in a target zone 800 (which may correlate with the focal zone of the source if the source is focused). In another embodiment, the acoustic field 240 is sufficiently intense to alternate between bubble formation and bubble decay or collapse in the target zone 800. At still higher energies the acoustic field 240 causes bubble formation, streaming, and collapse at a location different from the nucleation site; this is preferred for some types of microfluidic applications, such as mixing in a fluid device.

As described briefly above, the methodology of the invention includes two important aspects. In a first aspect, the invention directs the acoustic field 240 at through, for example, blocking, focussing, and/or reflection, at nucleation features to control fluid movement. In a second aspect, the invention provides nucleation features at selected locations and then interacts either focussed or unfocussed acoustic energy with the selectively located nucleation features to control fluid flow.

Figure 7:
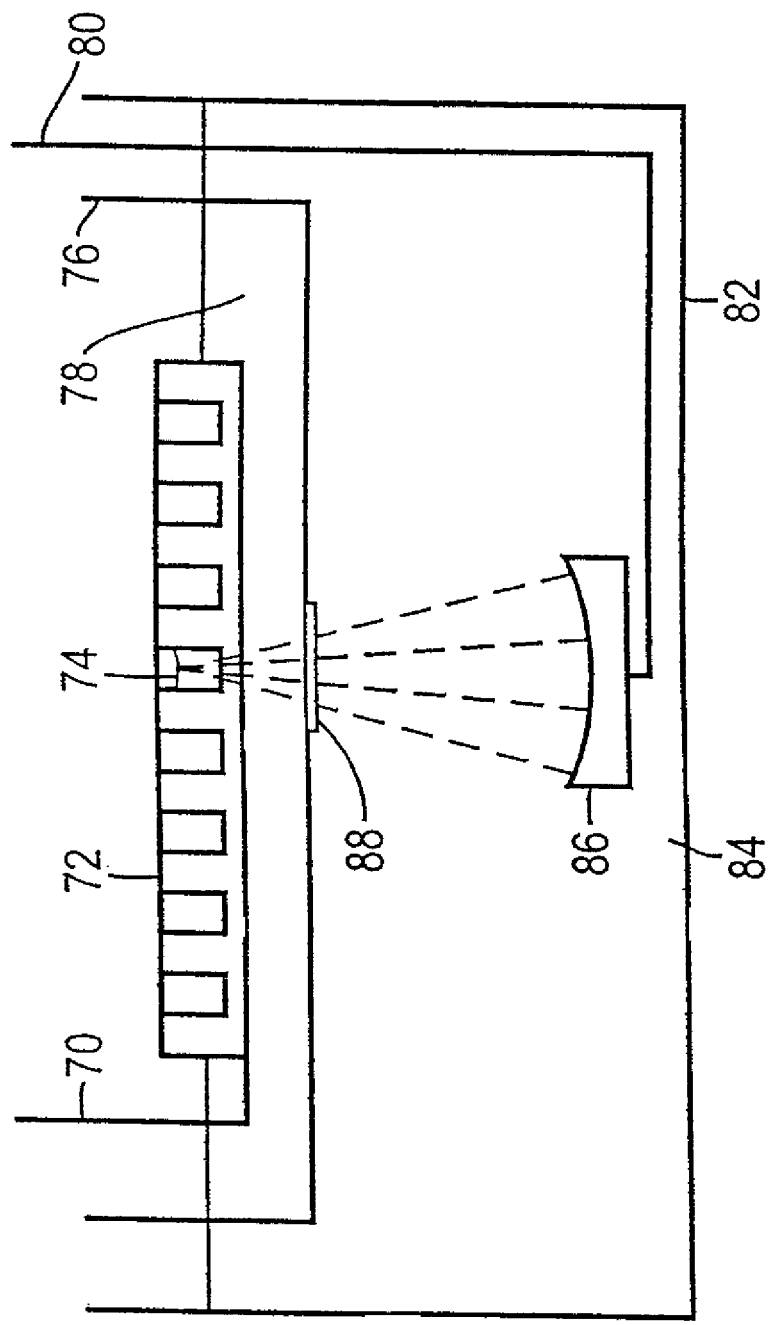
FIG. 7 is a schematic illustration of an embodiment of the invention with a microtiter plate containing samples, such that one of the wells of the microtiter plate is positioned at the focus point of sonic energy.
Figure 8:
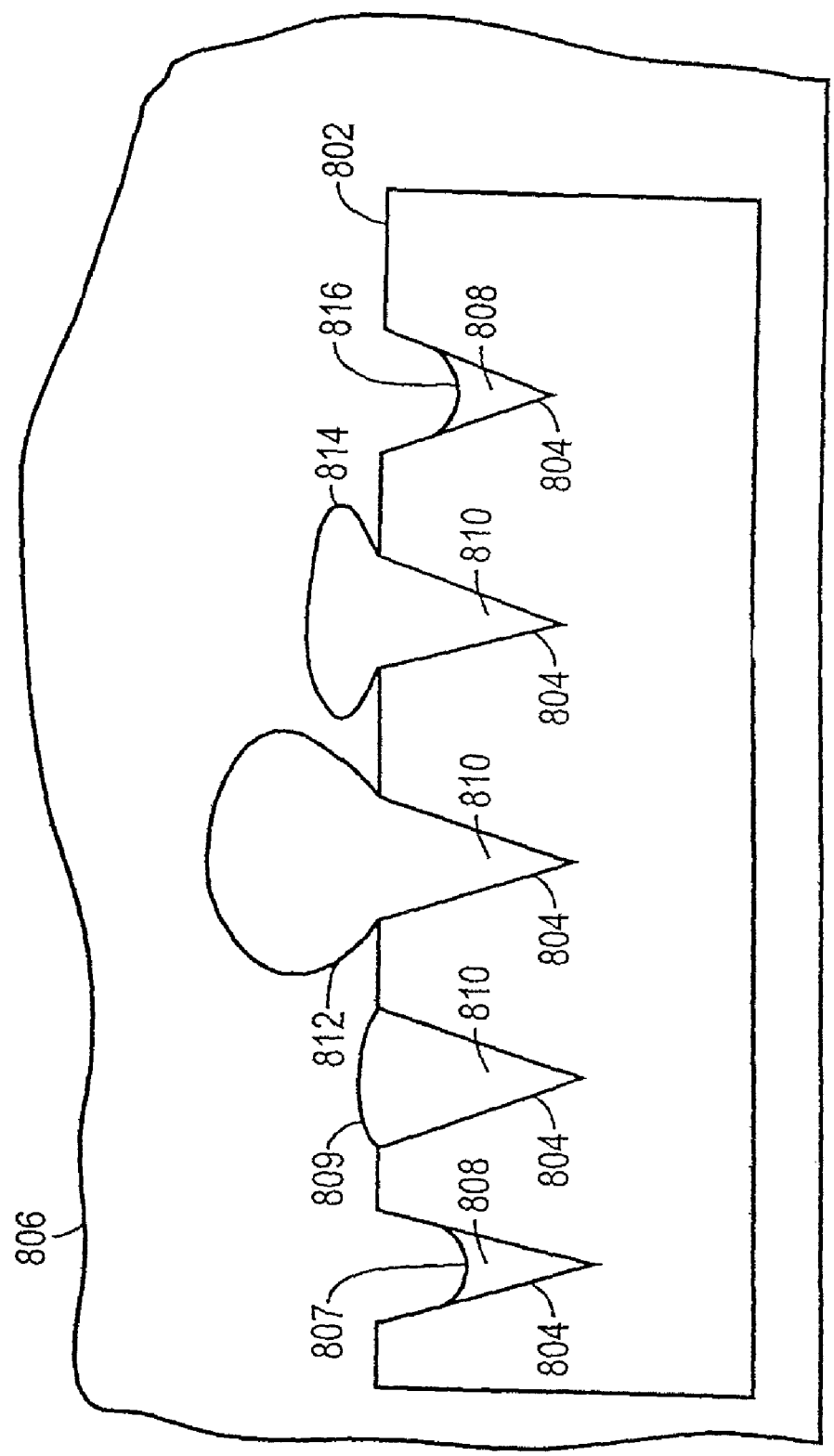
FIG. 8 is a conceptual diagram detailing the life cycle of a cavitation bubble formation and collapse, according to an illustrative embodiment of the invention.

FIG. 8 is a conceptual diagram 800 depicting an illustrative life cycle of a bubble formed on a surface 802 having a crevice or surface defect 804, which acts as a nucleation feature, according to an illustrative embodiment of the invention. When acoustic energy is directed toward the feature 804, cavitation occurs in a controlled, beneficial manner. Typically, the acoustic energy 240 required for cavitation is lower with cavitation promoters, such as the nucleation feature 804, than without promoters. Illustratively, and as shown at 807, in response to the surface 802 being immersed in a solution, such as an aqueous solution 506, using, for example, a mechanism such as is depicted in FIG. 7, a gas or vacuum pocket 808 forms and creates a liquid-gas (vapor) interface in the feature 804. As shown at 809, in response to the pocket 808 being excited by the acoustic energy 240, the pocket 808 grows to form a bubble 810 and locally displaces the fluid 806. In response to repeated cycles of negative and positive pressures from the acoustic field 240 and to increasing the energy of the field 240 above a threshold energy level, cavitation occurs. By alternatively providing and removing the acoustic field 240, the bubble 810 can be made to alternatingly increase (812) and decrease (814) in diameter. The alternating rarefaction (812) and compression (814) process causes localized flow in the fluid 806 proximate to the feature 804, and thus creates a localized micromixing action. Depending on characteristics (e.g., frequency duty cycle amplitude, etc., discussed in detail above) of the acoustic field 240, the bubble 810 can collapse either slowly or abruptly. As shown at 816, in response to discontinuing the acoustic field 240, the bubble 810 dissipates back to the pocket 808, and thus ceases the micromixing action. According to the illustrative embodiment, nucleation sites can be selective located anywhere that aids fluid control. It should also be noted that exposure to the acoustic field 240 may also cause heating of the device 802 and the fluid 806, and that, as described above, the effects of the field 240 can be changed by varying characteristics of the acoustic field 240. Also, the acoustic field 240 may or may not be particularly directed at the feature 807. Also, the feature 807 may be selectively located or may naturally occur as a result of the fabrication of the surface 202.

The acoustic field 240 may be a traveling wave field or a standing-wave field. The frequency and other parameters of the acoustic field 240 may be varied to achieve and control the desired effects and minimize undesired effects. As described with respect to FIGS. 1-7, the field 240 may be moved in a regular pattern relative to the microdevice containing the fluid to be mixed to achieve rapid results over the entire volume of the microdevice, or may be moved in a random or pseudo-random pattern to treat the microdevice in a stochastic manner. The frequency of the acoustic field 240 may be varied over time. For instance, in a standing wave field, the frequency may be swept upward during a tone burst to move the interference pattern closer to the axis and thus sweep material to the center. Or, a series of tone bursts at increasing frequencies may be applied to achieve the same effect. In another example, a high frequency, such as 1.1 MHz, may be applied to generate bubbles in the device and a lower frequency may then be applied to cause them to collapse.

For example, if in a particular apparatus, a cavitation promoting feature is excited by 1.1 MHz acoustic energy produced by a 100 mV excitation of the transducer, then a pulse of 10 cycles will generate a bubble, producing waves in the solution tending to mix it locally. If the energy 240 is then turned off for 10 cycles, the bubble will collapse. Alternatively, the bubble may oscillate at an energy less than that required to initiate a bubble, such as 25 mV. (Note: these voltages are for a particular apparatus and are only being used illustratively.) Which mode of bubble removal is best will depend on the particular apparatus and purpose, and can be determined experimentally if required.

A microdevice, containing fluid to be mixed may or may not be near or at the focus of a focused acoustic field 240. If the microdevice is in or near the focal plane of a focused acoustic field 240, the intensity gradient in the plane of the microdevice will be at a maximum. If the microdevice is moved into the near field or the far field of the acoustic field 240, the intensity gradient in the plane of the microdevice will be lowered. The microdevice may be moved along the axis of the field 240 during or between treatments to effect mixing within the microdevice.

Illustrative experiments have employed both focused and unfocussed acoustic fields 240 at a certain frequency (about 1.1 MHz) oriented perpendicular to the plane of the microdevice. However, similar effects may be obtained with an unfocused field 240 whose direction of propagation is tilted relative to the plane of the microdevice or at a different or time-varying frequency. In addition, two or more acoustic fields 240 may be caused to interact or interfere in the microdevice to cause mixing.

Figure 10:
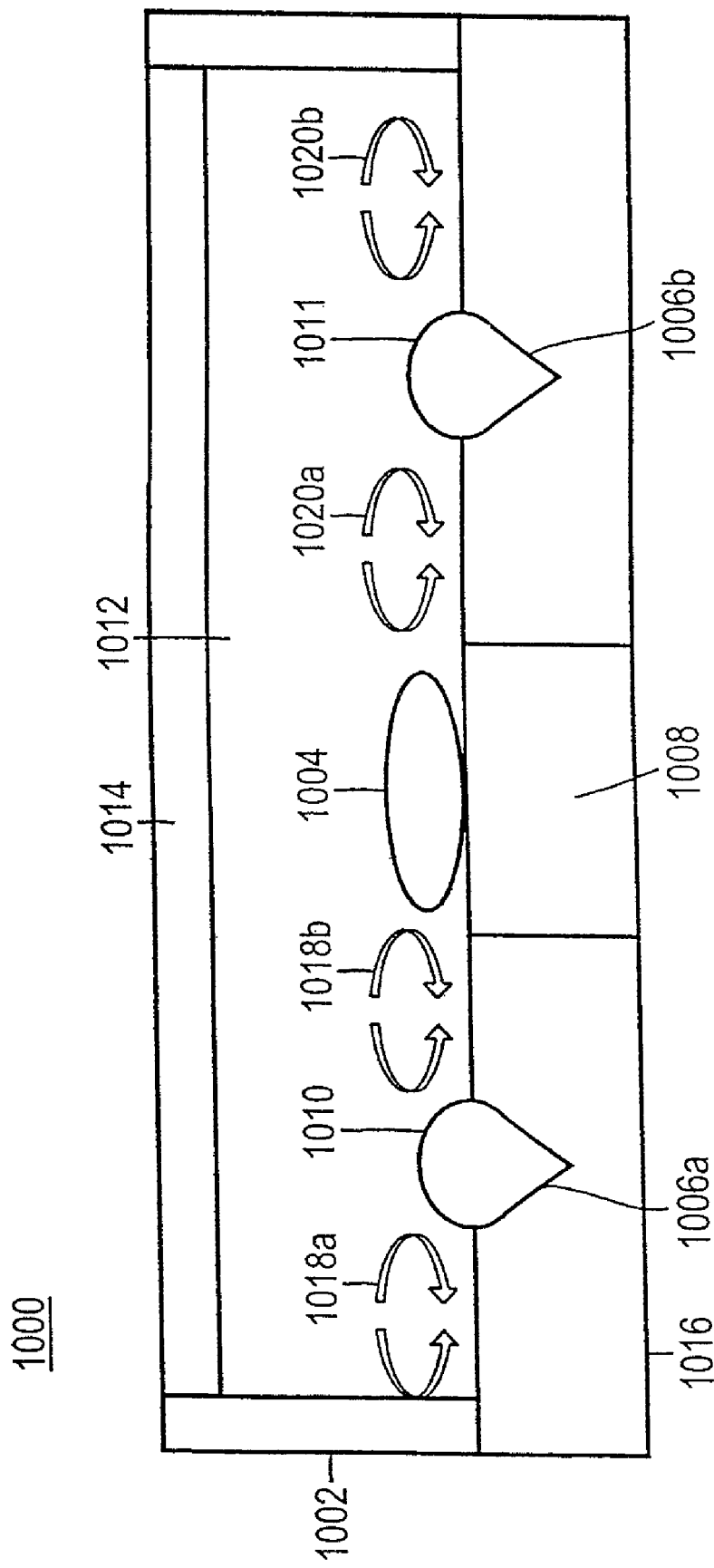
FIG. 10 is conceptual diagram depicting an acoustic microstreaming-based mixing device according to an illustrative embodiment of the invention.
Figure 11:
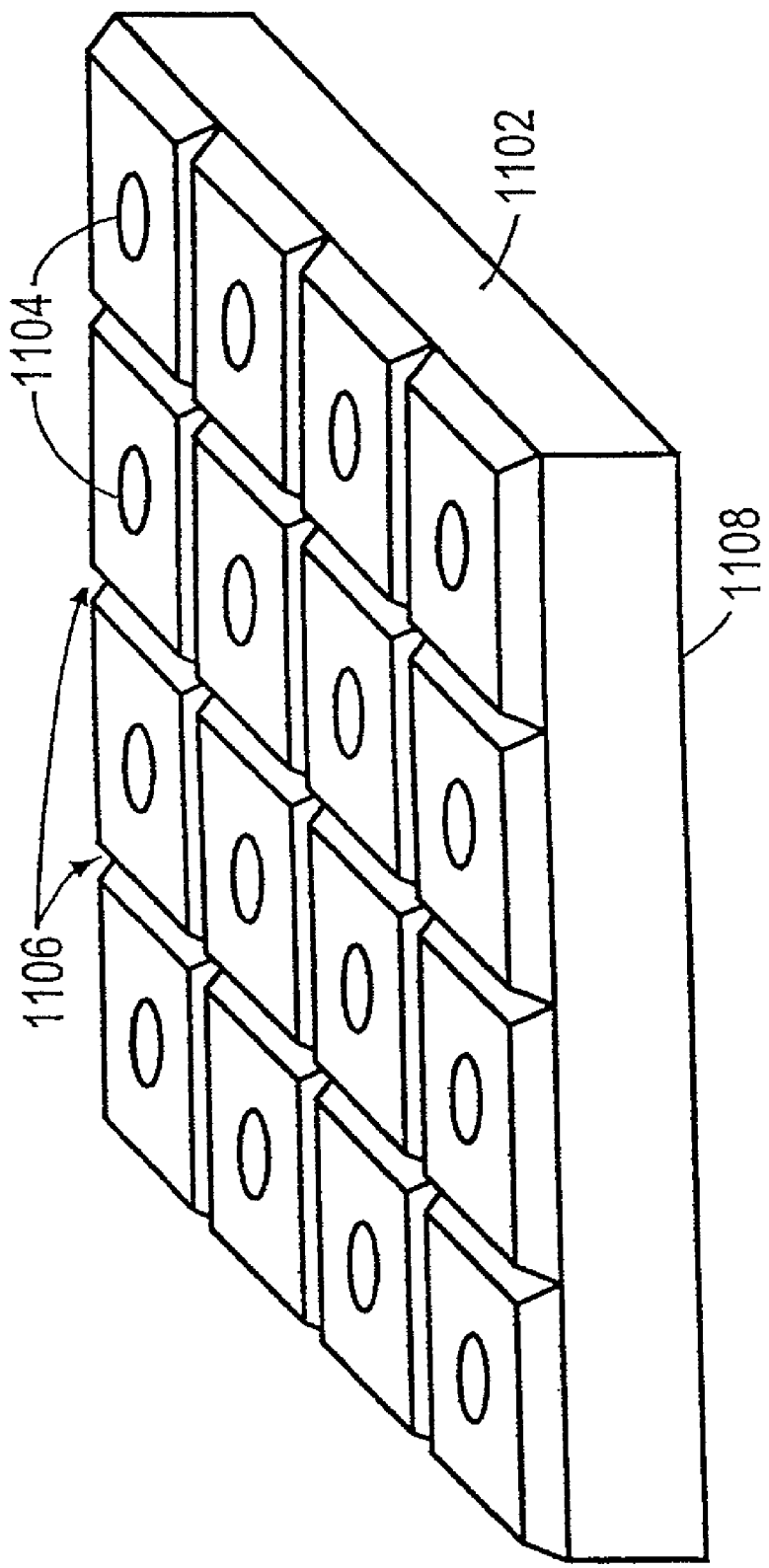
FIG. 11 is a conceptual diagram of an exemplary configuration of a cavitation promoter array according to an illustrative embodiment of the invention.

Referring briefly to FIGS. 10 and 11, in active site arrays, such as the DNA arrays depicted in FIG. 11 and discussed below, the hybridization chamber, such as that depicted at 1004 in FIG. 10, is typically a planar device. The apparatus of the invention may be arranged such that the acoustic field 240 can irradiate the device from either the base (bottom) 1016 side or the cover (top) 1014 side. Alternatively, the acoustic source 230 may be integrally fabricated in an internal wall of the chamber 1004. The features, such as 1006a and 1006b, that promote mixing may be located on either inside surface of the microdevice 1002 such that they are on either the near side or the far side relative to the acoustic field 240. As stated above, the axis of the acoustic field 240 may be perpendicular to the microdevice, parallel to the plane of the microdevice, or at an angle relative to the plane of the microdevice. Also, the acoustic field 240 may or may not be particularly directed at the nucleation features 1006a and 1006b.

Moving the microdevice 1002 relative to the acoustic field 240 during or between treatments can offer several advantages. Dithering (small variations in position around a center point) in the X-Y plane during treatment changes the intensity gradient in the plane of the microdevice 1002 and causes flow patterns to change direction and intensity. This causes more uniform mixing over larger areas. This may also cause better mixing in the corners of a square or rectangular hybridization chamber. Motion in the z (axial) direction causes changes in the interference pattern in a standing wave field, and may be used to break up aggregations of particles that may have formed.

In the illustrative embodiment, the cavitation promoting features may be a single feature, such as a pit, or a multitude of features such as a field of pits or a hatch pattern of lines or grooves. In the case of a single feature or a few features spaced such that only one is active at a time, the device may be moved relative to the acoustic field 240 such that the flow pattern generated by the feature will vary with time. Specifically, the cavitation promoting feature may be dithered around the focal zone of a focused acoustic field 240 such that the flow pattern rotates around the feature. This is analogous to watering a field with a processing sprinkler head: the flow is directed in a single direction at any one point in time, but the flow direction is varied over time to water a large area uniformly.

As mentioned above, turning on the acoustic field 240 causes mixing. Turning it off causes mixing to stop. The on and off intervals maybe controlled to maximize mixing while allowing enough quiescent time or residence time or contact time for binding reactions or other chemical reactions to take place before the reactants are separated by another mixing event. The temperature of the microdevice may be cycled up and down in coordination with the mixing intervals to influence the occurrence of reactions or the rate of reactions within the microdevice.

The cavitation threshold is the acoustic intensity at which cavitation begins at a particular region in a fluid. The cavitation threshold is influenced by several factors including isotropic pressure, dissolved gas content and fluid composition as well as the presence or absence of nucleation features. The acoustic field 240 may be operated above the cavitation threshold to cause beneficial cavitation effects in a microdevice or may be operated below the cavitation threshold to obtain other effects not related to cavitation, such as heating.

As discussed above, cavitation can be detected by means of a passive cavitation detection transducer and the appropriate electronics 700 or any of several other well known mechanisms. This detection mechanism may generate an error signal for use in a feedback control mechanism to modulate the acoustic field 240. The term "passive" implies that the detected signal is generated by cavitation. An "active" cavitation detection system interrogates the region of interest with an external energy source (e.g., a laser light source) that is modulated by cavitation bubbles in the device. In a preferred embodiment, a passive cavitation receiver transducer is positioned confocally with a source transducer of the acoustic field, such as the source transducers of FIG. 6, or the source 230 of FIG. 1. The receiver transducer should have a frequency pass band higher than, and not substantially overlapping, the pass band of the source transducer. Cavitation signals of interest are generally higher than the source 230 frequency. Other embodiments include having overlapping pass bands combined with suitable filters or signal processing to suppress the source frequency from the receiver transducer signal. Another embodiment may involve using the source transducer itself as a receiver for cavitation detection. There are several methods of passive and active cavitation detection that are described in the literature. Any or all of these may be suitable for detecting cavitation in conjunction with the present invention.

In another illustrative embodiment, cavitation promoting nucleation features and texture details are on the exterior of a sample chamber to affect the acoustic field within the chamber to promote bubble formation and streaming in the areas to be mixed in the interior.

According to the illustrative embodiments, it is recognized that particles in a solution can lower nucleation thresholds similarly to "features" or "textures" on the walls of a chamber or passage. Hence, if the particles constitute a solid phase resin having reticulated surfaces, such as are used to bind DNA and other biomolecules for biochemical processes, not only will treatment with a moving acoustic field as described above result in increased mixing and enhancement of diffusion limited reactions, but fluid circulation within the particles themselves may be enhanced by pulsating gas bodies on or within the particles. Similarly, the size, distribution of the particles, and the surface features of the particles, as well as their surface wetability, may be optimized for mixing in a particular acoustic field based on the frequency, intensity or other characteristics of the acoustic field 240.

Figure 9:
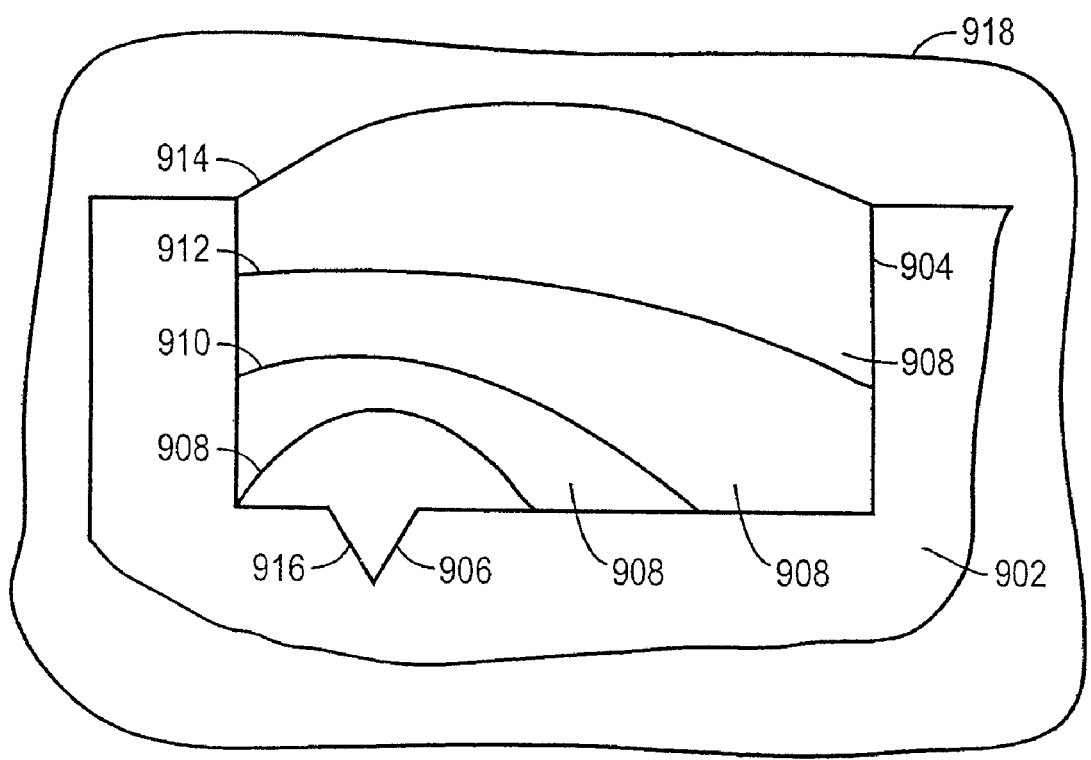
FIG. 9 is a conceptual diagram showing the stages of nucleation and growth of a gas body in a microcavity in a substrate, according to an illustrative embodiment of the invention.

FIG. 9 is a conceptual diagram 900 depicting the stages of nucleation in a microcavity according to an illustrative embodiment of the invention. As shown, the substrate 902 includes a microcavity 904. A naturally occurring or intentionally created crevice 906 is located within the microcavity 904. In response to being brought in contact with a liquid 908, the crevice 906 nucleates a small bubble 908. As shown at 910, 912 and 914, the bubble 908 grows in diameter with each pressure cycle from the acoustic source 230 through rectified diffusion until it substantially fills the microcavity 904. The gas/liquid interface 914 of the fully formed bubble 908 displaces the liquid fluid immediately adjacent to the interface 914, imparting localized fluid movement. This process may be repeated as necessary to create localized fluid movement.

With further reference to FIG. 9, there is a relationship between frequency of the acoustic field 240 and the diameter of the resonant bubble 914 in a free aqueous fluid; namely, frequency in Hertz multiplied by resonant the bubble radius is approximately equal to three meters/second. For example, if a transducer having a frequency of about 1.1 MHz is focused, a resonant bubble of about radius of 2.7 microns forms. Similarly, if a transducer having a frequency of about 11 MHz is focussed, a bubble having a radius of about 0.27 micron forms. The relationship becomes more complicated when the bubble is in or influenced by a microcavity or concave feature on a surface. Nevertheless, this dimension is appropriate for microfluidic and micro-electro-mechanical-system (MEMS) type devices. It is an property of the invention that it is possible to utilize a 1.1 MHz focused transducer to control cavitation in a miniaturized device to regions having micron scale dimensions as the focal zone of this transducer is relatively large at about 2×6 mm.

In a further illustrative embodiment, the mixing apparatus of the invention can be employed to micromix fluid surrounding an active detection or reaction site, such as a DNA spot in an array of DNA spots. FIG. 10 is a conceptual diagram 1000 depicting operation of an acoustic microstreaming-based mixing apparatus according to an illustrative embodiment of the invention. FIG. 10 shows a cross-section of a microfluidic device 1002 with an active detector site 1004, such as a spot containing DNA probes or an electrode. The device 1002 also includes nucleation promoting features 1006a and 1006b. Optionally, the site 1004 may be placed on an independent zone 1008 that is acoustically masked from the active acoustic field 240. The oscillation of the gas body or bubble 1010 in a fluid 1012 contained within a microchamber formed by the two structures 1014 and 1016 provides a local micromixing action around the feature 1006a indicated by the arrows 1018a and 1018b; and the oscillation of the bubble 1011 provides a local micromixing action around the feature 1006b indicated by the arrows 1020a and 1020b. Thus, the invention can be employed to micro mix portions of the fluid 1012, without disturbing the active site 1004. Skilled artisans will appreciate that the acoustic source 230 and/or the controller 410 may be integrated with or remotely coupled to the device 1002. By way of example, the source 230 may be located either inside the chamber formed by the elements 1014 and 1016, or integrally formed to an external wall of one of the elements 1014 and 1016. Alternatively, the acoustic source 230 can be located remotely as shown in FIG. 1.

FIG. 11 is a conceptual block diagram 1100 illustrating use of the mixing apparatus to locally mix fluid in a microdevice containing an array of active sites. More particularly, FIG. 11 depicts a fabricated device 1102 including a plurality of active detector sites 1104, with each active site 1104 surrounded by a plurality of selectively placed nucleation features 1106. Although not shown, skilled artisans will appreciate that in practice, the microarray 1102 employs a cover, such as the element 1014 in FIG. 10, to form a microchamber containing the array of active sites 1104 and nucleation features 1106. According to the invention, in response to exciting the nucleation features 1006 with the acoustic field 240, micromixing of the liquid occurs proximate to each active site 1104, without dislodging the active components contained in each site 1104. Although FIG. 11 depicts a specific arrangement of nucleation features 1106 around each active site 1104, skilled artisans will appreciate that the nucleation features 1106 may be located anywhere within the microchamber of device 1102 relative to the detector sites 1104, and that such location can be selected to effect fluid flow within the chamber. For example, if high fluid velocities or pulsating bubbles cause damage to the active sites 1104 in a particular device 1102, the nucleation features 1106 can be located a certain minimum distance from the detector sites 1104. Alternatively, the active sites 1104 can be located away from the nucleation features 1106. The relative positioning of the nucleation features 1106 and the active sites 1104 can be optimized to enhance flow of the chamber fluid past the active sites 1104 without scrubbing or otherwise damaging the active sites 1104.

In a further embodiment, nucleation features may be located in the active sites 1104 to effectuate mixing. Also, as described above, the acoustic source 230 may be located as depicted in FIGS. 1 and 7 relative to the microarray 1102. Alternatively, the acoustic source 230 may be integrally formed to the top (cover not shown) or bottom 1108 external surface of the array 1102, or contained within the array microchamber.

Thus, the invention may be utilized to accelerate synthesis and binding reactions at the active sites 1104. The result is a controlled, micromixing apparatus capable of scaling the magnitude of mixing to the application required. Further, if the acoustic energy beam is both focussed and scanned the sequential activation of bubbles, such as those occurring at the nucleation features 1106, can be employed to produce a net directional flow in the surrounding fluid.

With the acoustic source 230 and/or the controller 410 being able to be fabricated integrally with or separately from the microarray 1102 or other microdevice, the invention can provide a compact testing device. One particular application is in the formation of a DNA testing cassette. In one embodiment, the mixing apparatus is incorporated into a cassette holding a hybridization slide having a cover with fluid ports at either end. Connections are provided to fluidic reservoirs to wash with different solutions. The mixing apparatus can be oriented vertically to enable gravity-based fluid flow to be accelerated with the sonic energy mixing. The sonic energy field established can be used to provide energy to disrupt surface tensions to allow fluid flow across the array or other immobilized surfaces. Alternatively, the mixing apparatus can be oriented horizontally with hydrostatic pressure differentials across the reaction chamber to drive the fluid transfer. The surface tension of a low profile system (such as 100 micrometer gap height) may be altered with the sonic energy field to allow faster and more uniform slide processing.

One important aspect of the invention that enables the mixing apparatus to achieve the above discussed effects is the creation and selective placement of nucleation features, such as the feature 804 and the microcavity 904. Such features reliably induce (nucleate) bubble formation and enable cavitation acoustic energies lower than that required to cause cavitation on relatively smooth surfaces or in solution. Such nucleation features may be placed to control where cavitation occurs. These nucleation features can be in the form of discrete point-like features, including but not limited to pits, crevices, craters, frustums, pins, posts spikes, spicules, bumps or linear features, including but not limited to scratches, grooves, ridges, or the like. The nucleation features can be produced by diverse manufacturing methods including but not limited to scratching, etching, grinding, engraving, milling, drilling, sand blasting, ion-beam processing, molding, pressing, hot stamping, microlithography, micromachining, microfabrication or the like. In addition to geometric features, localized variations in material properties such as acoustic impedance, density, modulus of elasticity, hydrophobicity, wetability, surface energy, distribution of impurities or contaminants on or in a surface, and the like can also preferentially nucleate cavitation. These material variations may be formed by manufacturing processes including but not limited to ion implantation, plating, chemical modification, or the like. Nucleation features can also be created by placement or formation of electrodes.

Geometric or material features may also be located on the outside of a device to promote cavitation on the inside of the microdevice by interacting with the acoustic field to cause intensity variations in the acoustic field coupled into the microdevice.

When the density of features is high, as for example in the holes of a microporous membrane, or a nonspecific etching or grinding leading to a frosted effect, then the multitude of features may be called a "texture". The textures may be either ordered as in an array of features, as discussed above with respect to FIG. 11, or include randomly distributed features. The extent of textured areas may be controlled so as to promote cavitation in specific regions of a microdevice, such as discussed above with respect to the region surrounding each active site, 1104 of FIG. 11. As discussed in further detail below, the creation of features and textures enables the generation, of zones of mixing and pumping which can be selectively activated by acoustic energy. As discussed above, the selective placement of the cavitation features enables local micromixing of a fluid at selective locations while using an unfocused acoustic source. Thus, enabling an acoustic source to be mounted directly to microdevice.

Bubbles may also be generated by other means, such as chemical reaction or by electrochemical processes. For example, bubble generation sites in the microdevice may have or contain an immobilized chemical species that will react with a species in the fluid either when brought into contact or in response to a change in condition such as a change in pH. Another means of generating gas bubbles is by electrolysis at an electrode. Applying an appropriate electrical signal to an electrode in contact with an appropriate fluid in a microdevice will cause gas bubbles to form. Other electrochemical means may generate other gas species useful for the method of this invention. Electrochemical means of gas generation in the fluid of the microdevice can be controlled by modulating the electrical signal applied to the electrode. Gas bubbles may be generated in regions in a device by arrays of chemically or electrochemically active features or by making an entire region chemically or electrochemically active. The bubbles that are generated chemically or electrochemically may caused to grow by further gas production by chemical or electrochemical reaction or in response to an acoustic field. The bubbles may then release and stream in response to an applied acoustic field. The streaming bubbles cause fluid flow through viscous and momentum effects.

The size of the features or extent of a textured area may be smaller, even much smaller, than the focal zone of the acoustic field 240, if it is focused, or the extent of an unfocused field. This enables control of cavitation to a much smaller scale than a wavelength of the acoustic field 240.

According to one embodiment, the nucleation features are located to create rotational flow features that resemble the eddies that occur in turbulent flow. In another embodiment, the acoustic source 230 is direct at naturally occurring nucleation features to create rotational flow. Such an approach adds vorticity to what would otherwise be totally irrotational flow. In one embodiment, eddies are created near the walls or margins of conduits or cavities, which are the regions that are the most difficult to mix with alternative technologies. These eddies greatly enhance fluid exchange and mass transfer within the conduits or cavities of a small fluid microdevice. The distribution of eddy sizes and loci within a microdevice can be tailored to resemble those of a turbulent flow field. The distribution of sizes and loci can be optimized for particular microdevices and applications such as flushing a microchamber or mixing reactants during a heterogeneous hybridization reaction.

Figure 12A:
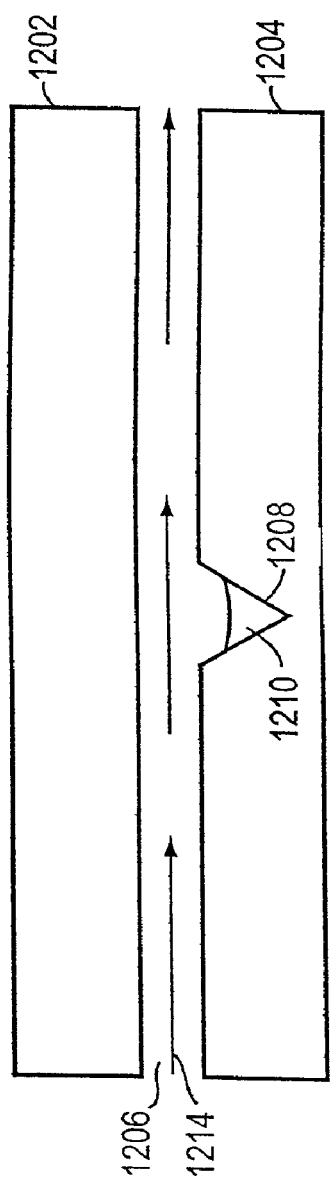
FIGS. 12A and 12B are conceptual diagrams depicting micro flow valve according to an illustrative embodiment of the invention.
Figure 12B:
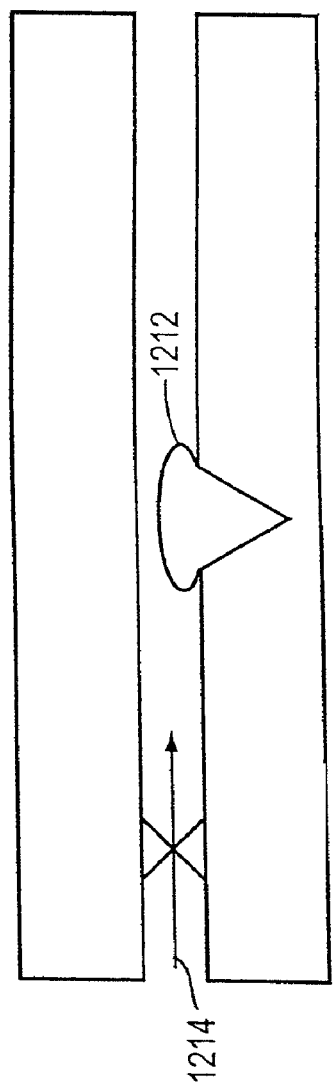

FIGS. 12A and 12B depict the use of the apparatus to provide flow control in a microconduit. More particularly, in FIG. 11A, the elements 1202 and 1204 are located to form an exemplary microconduit 1206. According to an illustrative embodiment of the invention, the element 1204 includes a nucleation feature 1208. The nucleation feature 1208 may be naturally occurring, such as being the result of fabrication, or particularly created. In response to the nucleation feature 1208 being submerged in a fluid, a gas pocket 1210 forms in the feature 1208. As shown in FIG. 12B, when the nucleation feature 1208 aligns with the acoustic source 230 and the acoustic field 240 applies pressure, the pocket 1210 forms into a bubble 1212. The bubble 1212 effectively stops fluid flow, indicated by the arrow 1214. Upon cessation of the applied acoustic field 230, the bubble 1212 dissipates enabling fluid once again to flow through the conduit 1206. The bubble 1212 functions essentially as a microflow control valve for conduit 1214. As discussed above, the acoustic field may be unfocused or particularly directed at the nucleation feature 1212.

In the case of flowing fluid in laminar flow conditions, the fluid near the walls of a conduit, such as the conduit 1214, or a chamber, is not mixed into the core of the flow, in the center of the conduit or cavity. If the fluid in the conduit or chamber is to be replaced by another fluid, as in a flushing application, adding vorticity with acoustic mixing can dramatically reduce the time and fluid volume required to achieve a required dilution.

In the case of a device with no flow, such as a reaction chamber during incubation, acoustic mixing can effect mass transfer that would only occur otherwise as a result of diffusion. The invention is especially useful in the case of reactions involving large biomolecules, where diffusion rates are extremely low. These reactions are rate limited by the diffusion of the reactants. Heterogeneous reactions involving a reactant that is bound to the surface of the reaction chamber, can be greatly accelerated using the methodology of the invention.

Figure 13:
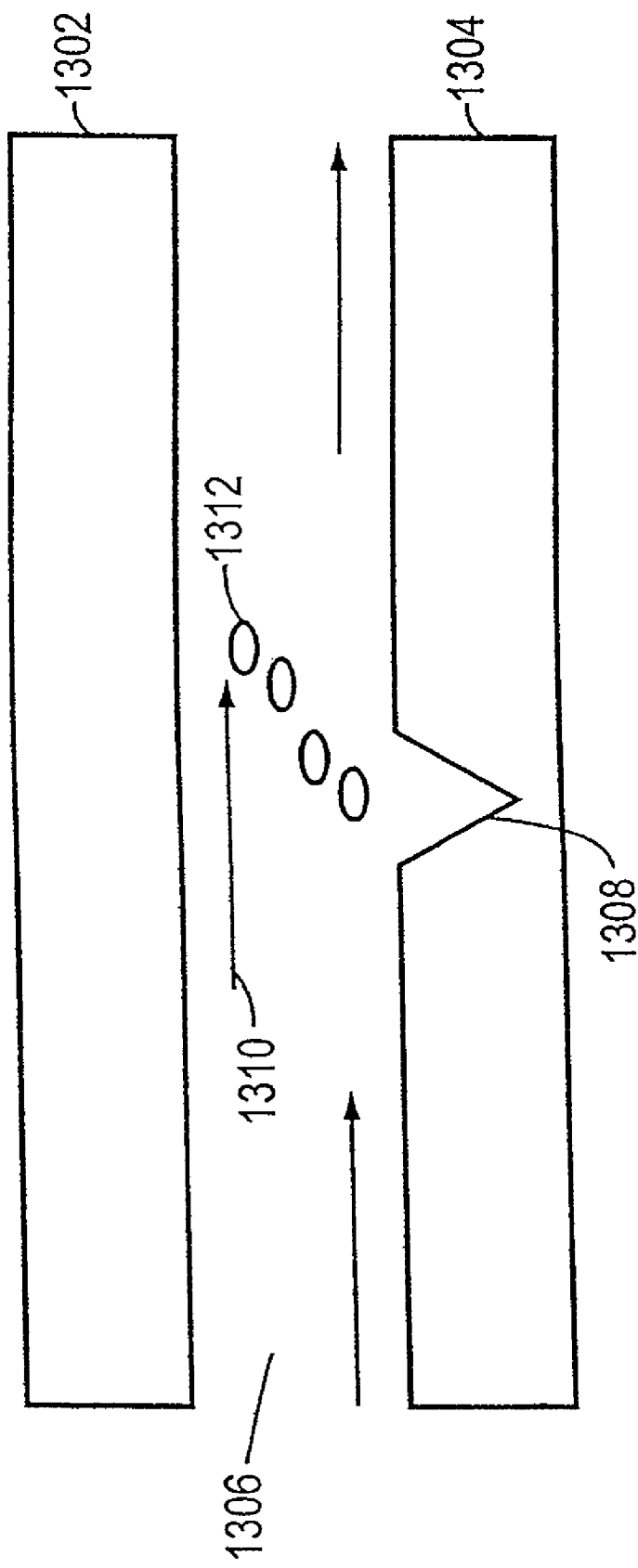
FIG. 13 is a conceptual diagram depicting the directional acceleration of fluid flow according to an illustrative embodiment of the invention.

FIG. 13 is a conceptual diagram 1300 depicting the use of the acoustic mixing apparatus to cause fluid flow in a microdevice according to an illustrative embodiment of the invention. In a similar fashion to the device of FIG. 12, the elements 1302 and 1304 are located to create a microconduit 1306 though which fluid can flow (indicated by the arrows 1310). The element 1304 includes a nucleation feature 1308 for promoting nucleation. Once again, the nucleation features 1308 can be naturally occurring or particularly created and placed. In the presence of an appropriate acoustic field 240, feature 1308 will generate and release cavitation bubbles. The released bubbles will stream in response to acoustic field intensity gradients. Viscous and inertial effects will cause fluid motion in the same direction. The direction and rate of flow is controlled by the intensity and local intensity gradient of the acoustic field 240. Acoustic field gradients may result from focusing the acoustic source 230 or be established by the deployment of absorptive or reflective materials, either between the acoustic source 230 and the fluid volume, or on the far side of the fluid volume relative to the acoustic source 230, so as to influence either incident or reflected acoustic radiation. Thus, the embodiment of FIG. 13 provides controlled, directional pumping of bulk fluid.

FIGS. 14A-14D are conceptual diagrams depicting an alternative embodiment of the invention for providing fluid pumping. FIGS. 14A-14D depict progressive states of a microdevice 1402. The microdevice 1402 includes a series of acoustic transducers 1404a-1404c, a chamber 1406 containing fluid having the moieties 1408, and textures 1410 formed in a surface 1412. As in the previous illustrations, the nucleation features 1410 can be naturally occurring during fabrication or particularly formed and positioned. Additionally, the acoustic transducers 1404a-1404c can be integrally fabricated with the microdevice 1402 or can be remotely located. Also, the acoustic transducers 1404a-1404c can be separate, individual transducers, or alternatively, a single remotely located source can be directed at any one or all of the regions 1416a-1416c of the microdevice 1402.

Figure 14A:
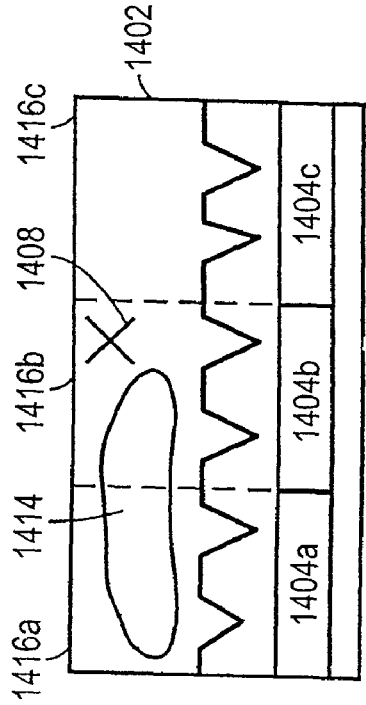
FIGS. 14A-14D are conceptual diagrams depicting mass transfer across a field of nucleation sites according to an illustrative embodiment of the invention.
Figure 14B:
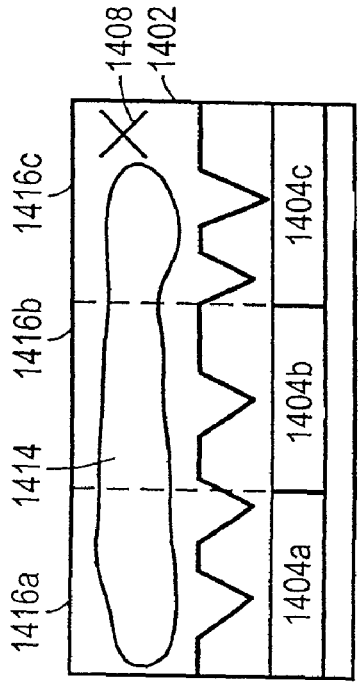
Figure 14C:
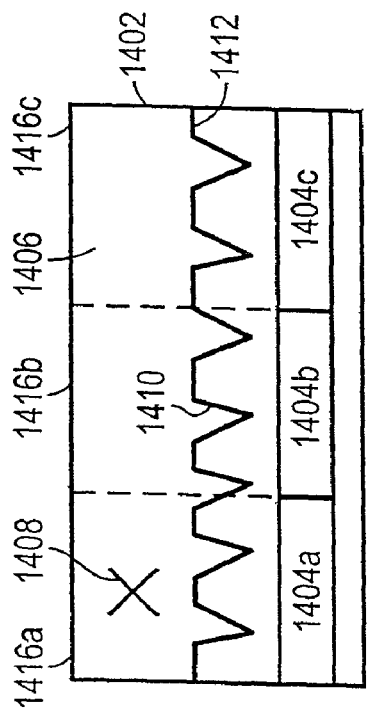
Figure 14D:
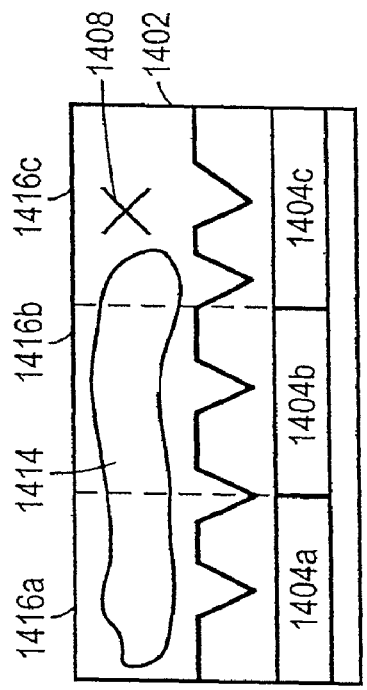

To simplify the illustration, the controller 410 is not shown, but may be included in the device 1402 or may be communicatively coupled to the acoustic transducers 1404a-1404c. As shown in FIG. 14B, by activating the acoustic transducer 1404a to form bubble(s) 1414 according to the methods described above, the moieties 1408 can be moved from zone 1416a to 1416b. As shown in FIG. 14C, by activating the transducers 1404a and 1404b, in sequence, the bubble 1414 can be formed to flow the moieties 1408 into zone 1416c. Similarly, by activating the transducers 1404a, 1404b and 1404c in sequence, the bubble 1414 can be formed to flow the moieties 1408 to the far edge of zone 1416c.

Skilled artisans will appreciate that the moieties 1408 may be processed or analyzed differently in each of the zones 1416a-1416c. For example, a biological tissue sample, such as the sample 1408, may be inserted into a device, such as the device 1402 in a particular zone, such as the zone 1416a. The tissue 1408 can be introduced to a disruptive acoustic energy field from the transducer 1404a and the disrupted tissue 1408 is then ready for reagent addition. The reagent addition may occur in zone 1416b, which has acoustic mixing conditions (e.g., to accelerate enzyme reactions). The reaction products may then be transferred to zone 1416c and the binding (e.g., hybridization) events may be improved with acoustic energy. One integrated device 1402 may have multiple zones for different processes, so that all of the above processing can occur on a single device. As mentioned above, the microdevice 1402 may, for example, be inserted into an external acoustic field, or processing can be accomplished by on-board acoustic field generation. This is especially appropriate for very small sample masses, for example, in the microgram to picogram range.

Figure 15:
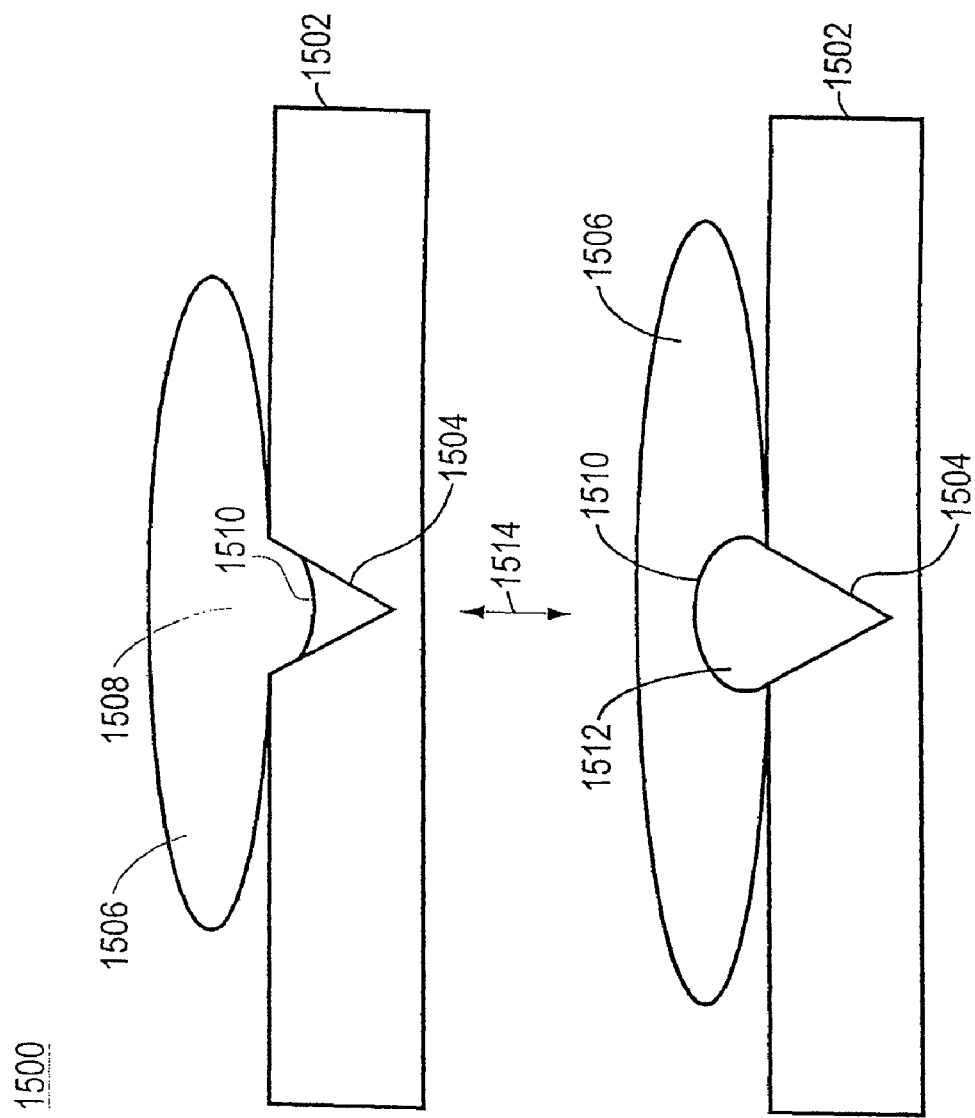
FIG. 15 is a conceptual diagram depicting mixing of fluid on a microscope slide, according to an illustrative embodiment of the invention.

Although the above described illustrative embodiments contemplate a chamber, such as depicted in FIG. 10 at 1012, for enclosing a liquid, the illustrative acoustic mixing apparatus can also be employed for localized mixing in a small volume of liquid on a surface of in a well as shown in FIG. 7, without a fully enclosed chamber such as depicted in FIG. 10. By way of example, FIG. 15 is a conceptual diagram 1500 depicting the use of the invention for mixing a solution on a microscope slide. More specifically, the diagram 1500 shows a microscope slide 1502 having a nucleation site 1504. The liquid to be mixed 1506 is placed on the slide 1502. As a result, a small gas/vapor body 1508 forms with a gas/fluid interface 1510. Upon application of the acoustic field 240, the body 1508 expands to become the bubble 1512. As described above with respect to FIG. 8, the cyclic nature of the acoustic field 240 causes the bubble 1512 to cavitate. Alternatively applying and removing the acoustic filed 230 causes the bubble 912 to oscillate, thus providing a cyclic displacement of fluid adjacent to the interface 1510, and a local micromixing action in the fluid 1506 on the slide 1502.

One advantages of the mixing technology of the invention is that by locating or making use of cavitation features close to the edges or margins of the chamber of conduit, with the invention the highest fluid flow velocities are achieved at those locations. Other methods which provide bulk fluid flow cause the highest velocities to occur near the center of the chamber or conduit where they are less useful for applications such as flushing or reacting solution phase molecules with those bound to a surface. Another advantage of the methodology of the invention is that mixing can be achieved in a rigid microdevice. Other technologies require that the chamber or conduit to be mixed have a flexible member (such as a plastic film contacting a liquid fluid or an aqueous/organic liquid fluid interface) that can be deflected by external means to cause bulk fluid motion within the device. No such flexible member is required with the invention. A further advantage of the invention is that nucleation sites or textures can be built into a microdevice such that mixing or fluid flow occurs only in desired locations. This is useful for controlling the extent and location of high velocity flows that may have a detrimental effect on sensitive areas within the device.

Another advantage of the invention is that it can operate either as an integrated component of a microdevice or as a separately fabricated, but acoustically coupled add-on. In a further embodiment of the invention, the localized bubble formation and collapse created by the interaction of the acoustic field 240 with nucleation features can be employed to clean electrodes in a microdevice. One of the difficulties of performing electrophoresis in a miniaturized format is the scaling effects of miniaturization. Another difficulty is the presence of bubbles. Bubble-effects can block internal lumen, thereby rendering a sample/chip invalid. Another limitation is the intrinsic properties of the electrophoresis process; namely, the generation of bubbles from the electrolysis of water at noble metal electrodes. This bubble formation may have detrimental effects in miniaturized formats by blocking fluid flow, and by affecting the efficiency of the electrophoresis by limiting the current. Cleaning the electrodes can minimize some of these difficulties. The invention may also be used to sweep across the electrophoresis zone to mechanically agitate the molecules to be separated.

Figure 16A:
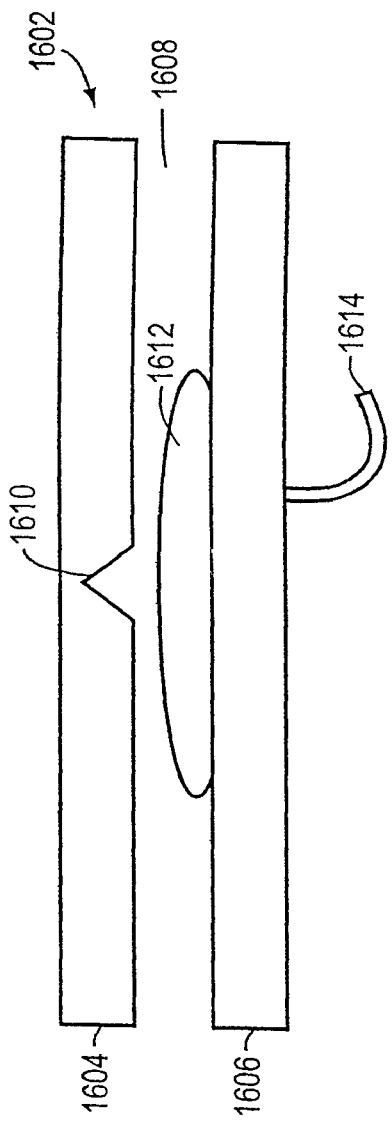
FIG. 16 is a conceptual diagram depicting electrode cleaning according to an illustrative embodiment of the invention.
Figure 16B:
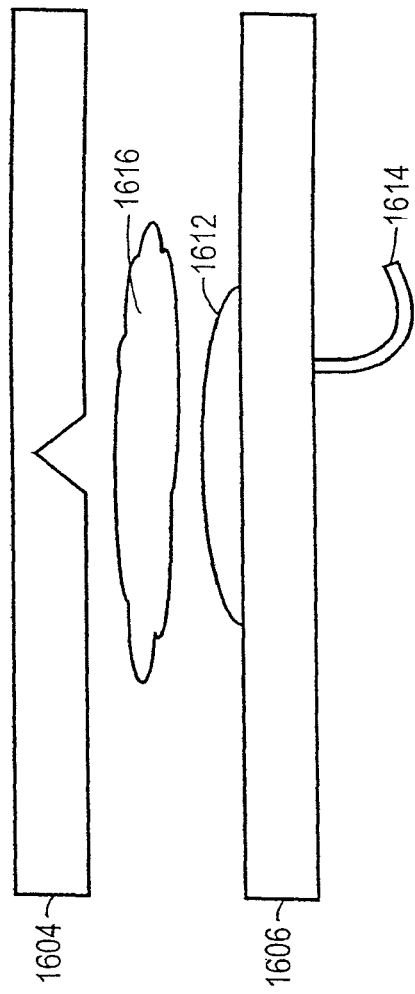

FIGS. 16A and 16B are conceptual block diagrams depicting a micro-electrode cleaning device according to an illustrative embodiment of the invention. The microdevice 1602 is composed of two elements 1004 and 1006 arranged to form a chamber or conduit 1608. The element 1604 includes a nucleation promoting feature 1610. An electrode 1612 is mounted on the element 1606 and includes an electrically conductive lead 1614. The chamber 1608 contains a liquid fluid. By causing a bubble 1616 to form and collapse using the methods described above, the mixing apparatus of the invention can be employed to clean the electrode 1012.

Figure 17:
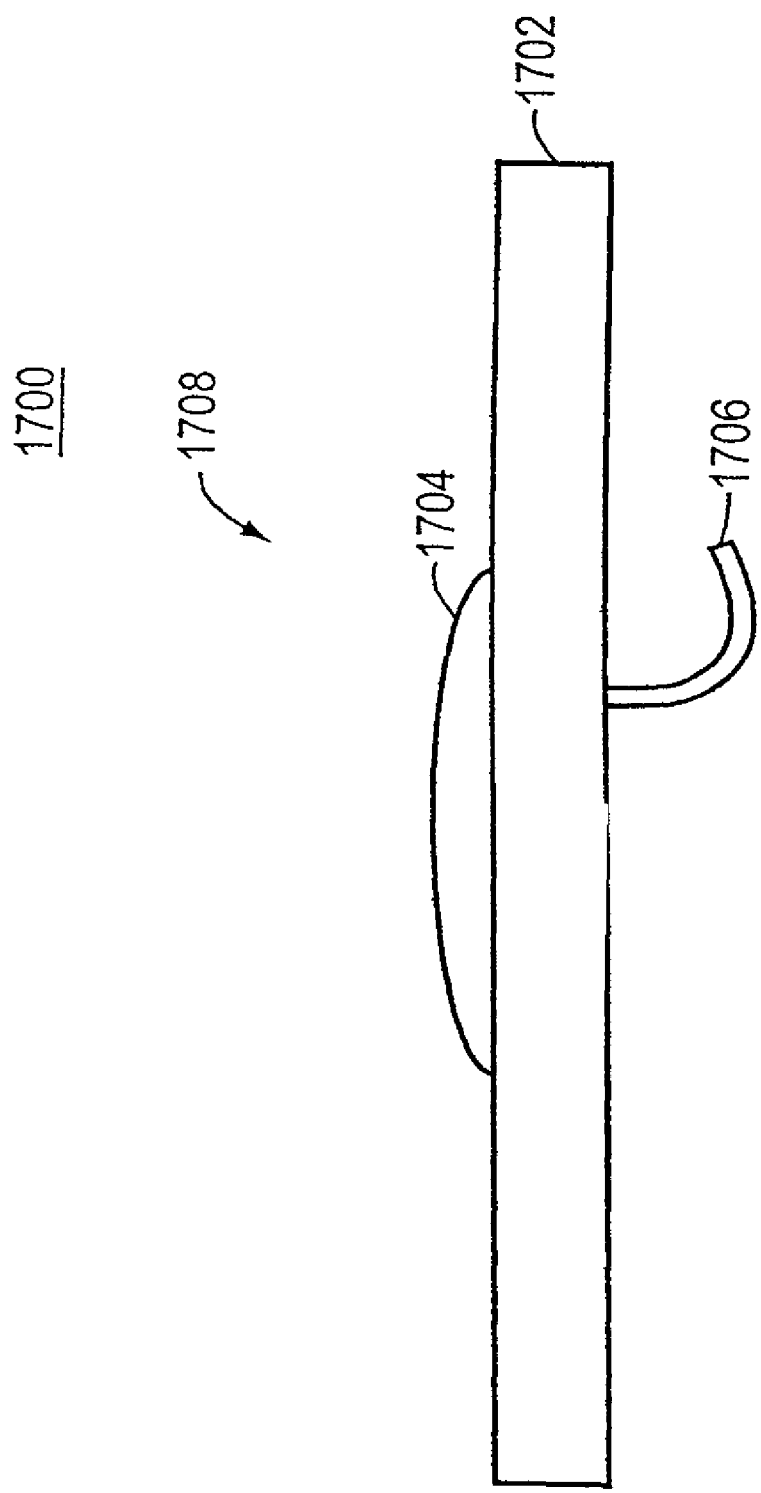
FIG. 17 is a conceptual diagram depicting an electrode nucleation feature according to an illustrative embodiment of the invention.

FIG. 17 depicts another embodiment in which bubble nucleation is facilitated by electrolysis at an electrode. An electrical current is applied via a connection 1706 to an electrode 1704 mounted on a substrate 1702 and in contact with a fluid medium 1708 such that hydrogen (or other gas) bubble(s) is generated. Growth of the bubble may be either by continued generation of gas by electrolysis or by subsequent interaction with the acoustic field 240. In the presence of an appropriate acoustic field 230, the bubble(s) will grow, release from the nucleation site and stream in response to gradients in the acoustic field. The size of the electrolysis bubbles and the frequency of their occurrence can be controlled by the electrical signal to the electrode 1704. Many bubbles may be generated on an electrode 1704 or many individual electrodes 1704 or conductive sites may be employed. Nucleation may be controlled by means of electrical signals applied to the sites rather than by an acoustical source. This method may be used to cause controlled nucleation of cavitation events at specific locations or in specific regions at specific times without the microdevice being movable relative to the acoustic source 230. For example, a device may have an integrated non-focused acoustic source 230. Bubble streaming and fluid flow can be activated in specific regions of the microdevice as required by controlled activation of electrodes 1704 in the regions. Acoustic field gradients may be pre-established by the deployment of absorptive or reflective materials, either between the acoustic source 230 and the fluid volume 1708, or on the far side of the fluid volume 1708, relative to the acoustic source 230, so as to influence either incident or reflected acoustic radiation.

Figure 18:
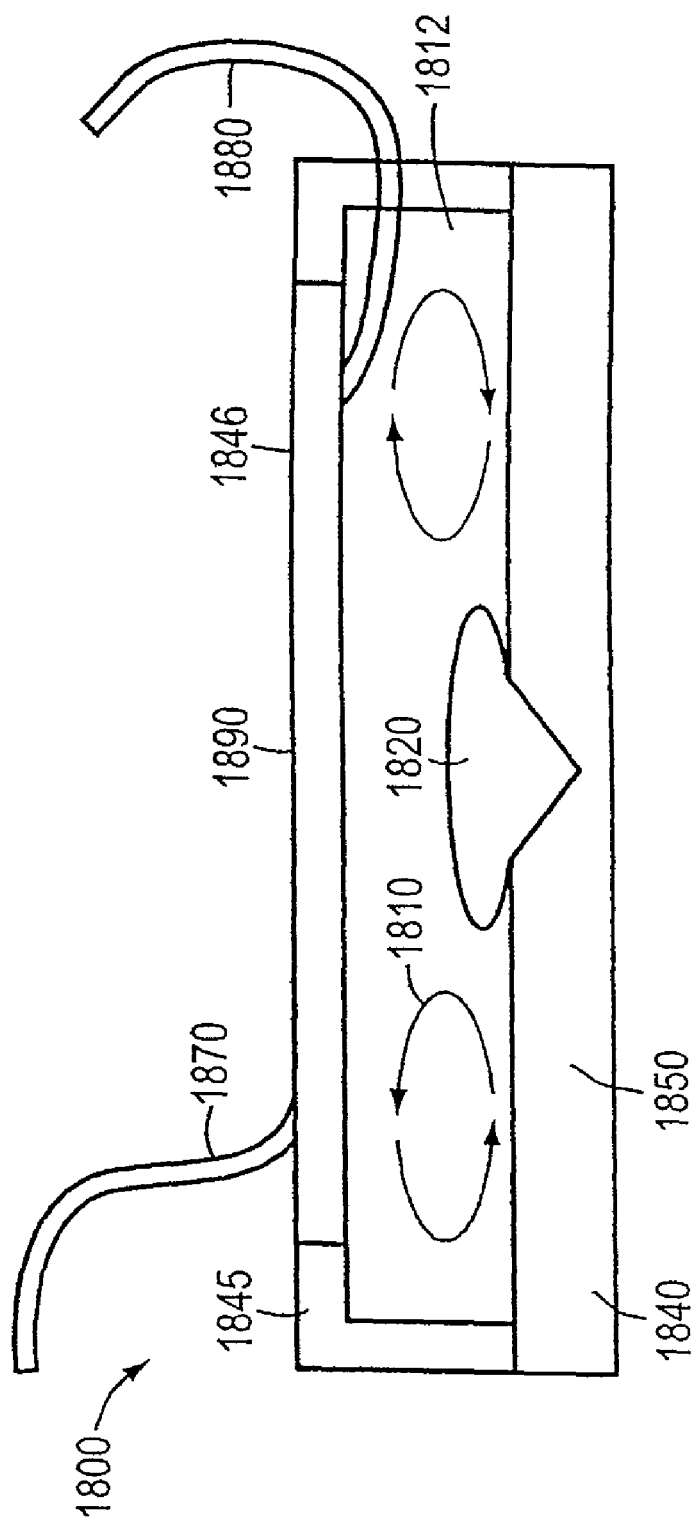
FIG. 18 is a conceptual diagram of a MEM constructed according to an illustrative embodiment of the invention.

FIG. 18 is a conceptual diagram depicting an acoustic based mixing apparatus that incorporates the acoustic source into a microfluidic device according to an illustrative embodiment of the invention. FIG. 18 shows a cross-section of a microfluidic device 1800 with an acoustic source 1890 which is connected to an electronic controller (not shown) by connections 1870 and 1880. The device 1800 also includes nucleation promoting features 1850 which may be located in the microdevice opposite the acoustic source as shown or on the surface of the source itself As shown in the figure, the acoustic energy drives oscillation of a gas body or bubble 1810 in a fluid 1812 contained within a microchamber or microconduit formed by the two structures 1840 and 1845 provides a local micromixing action around the features 1850 indicated by the arrows 1820. The acoustic source can also cause fluid motion by streaming of bubbles as shown in FIG. 13.

The acoustic source 1890 can form an entire internal surface of the microdevice, can form a portion of an internal surface of the microdevice or can be attached to an internal surface of the device. The acoustic source 1890 can be integrally fabricated with the microdevice or may be separable from the microdevice so as to be reusable. A thin film or membrane 1846 may separate the integrated acoustic source 1890 from the fluid 1812. The membrane 1846 may be tailored to facilitate or block the transmission of the acoustic energy from the acoustic source 1890 into the fluid 1812 in selected areas.

The acoustic source 1890 may be any material or structure that emits acoustic energy such as but not limited to piezoelectric elements, magnetorestrictive elements, capacitive micromachined ultrasonic transducer (cMUT) elements and the like. The acoustic source may be fabricated in situ as part of the microdevice by any manufacturing process such as but not limited to additive and subtractive processes performed in micro-electro mechanical systems (MEMS) fabrication or may be fabricated as a separate device and integrated into the microdevice in a subsequent manufacturing operation.

The acoustic waves generated by the source 230 can be any of a large variety of acoustic wavetrains characterized by being able to generate cavitation bubbles at nucleation sites of structural or material features at a power density below that needed to generate bubbles in non-featured regions. An acoustic source can be unfocussed, or can have a line (one-dimensional focus), or can be focussed in two dimensions to a spot. In line and spot focus, there is also focus in the third dimension, which is usually controlled by the focus in the other dimensions.

Each of these focal modes is useful in particular embodiments of the invention. Spot focus is particularly useful for focussing on particular wells or spots in an array, such as the array 1102 of active sites 1104 of FIG. 11. Line focus can be used effectively to sweep an acoustic field across an array, thereby either simultaneously treating wells or spots, such as the detector sites 1104, by the row, or driving fluid through an array in a particular direction. Non-focus (planar) waves are particularly effective for causing stirring or heating in the entire array (e.g., FIG. 11), plate (e.g., FIG. 15), or other object of treatment. In some protocols, one of these modes is sufficient. In other applications, two or more may be needed. In multiple protocol applications, it may be most cost-effective to provide independent sources of plane, line and spot focus.

In another illustrative embodiment, the mixing apparatus has two sonic energy transducers/sources focused on two walls of a fluid containment vessel/microdevice. The reagent chamber, such as the chamber 1012 of FIG. 10, volume is narrow to contain the fluid when the transducers are not activated. When one or more of the transducers is activated the fluid is pumped out of the reagent chamber. The transducers may be oriented such that planar standing waves form. In addition, the transducers may be synchronized such that the deflection of the walls results in a maximum narrowing of the lumen or a maximal expansion of the lumen.

In another illustrative embodiment, the mixing apparatus employs an unfocused acoustic energy source. For example, the field of textures may be very close to or a part of the transducer, such as a MEMS fabricated transducer with on-board nucleation site(s).

In another illustrative embodiment, the energy input rate from the acoustic source is used to modulate the temperature of the fluid. This benefits hybridization-based processes, and potentially other binding processes. Since the acoustic energy is able to provide mixing of the fluidic solutions surrounding solid-phase, immobilized binding partners, mismatches may be minimized. Adjusting the temperature during the process can also improve binding characteristics.

In a further illustrative embodiment, the mixing apparatus is used to mix a fluid in a miniaturized chamber. One embodiment consists of a thick physical layer, a fluidic zone containing sample to be analyzed, and a thin physical layer. Materials that are appropriate for the physical layers include glass, polymers, and plastics. The focused acoustic energy is directed to cavitate in the free fluid with the resultant shock wave impinging on the exterior of the device. The impedance mismatches between the layers result in resonance of one of the layers. This compression-rarefaction vibration process induces mixing within the chamber. In a sense, the acoustic impedance mismatch drives an oscillating diaphragm.

In another illustrative embodiment, the mixing apparatus is used to degas solutions. This may be useful for controlling dissolved-gasses in a sample or reagent that is being loaded or has been loaded in a device. In this application, the sample is loaded into a region of the microdevice that is in the focal point of the converged acoustic beam. Insonifying the region will prompt dissolved gas to be released prior to the sample entering the microfluidics.

In another illustrative embodiment, the mixing apparatus of the invention is employed to facilitate or cause the aggregation and manipulation of small particles in small devices such as hybridization chambers that are used with DNA chips. In this embodiment, the mixing apparatus includes a source 230 for generating a focused acoustic field 240 that is arranged perpendicular to the plane of a hybridization chamber with a coupling medium (e.g., water) interposed. The focal zone of the acoustic field 230 is positioned near or at the plane of the hybridization chamber. The chamber can be moved relative to the acoustic field in the lateral or axial direction during or between treatments. The mixing apparatus is configured such that the transducer faces upward in a water bath and the hybridization chamber is positioned horizontally at or near the surface of the water bath. The air interface at the top side of the hybridization chamber forms an acoustically reflective surface that creates a standing-wave acoustic field within the microdevice. The reflector may also be a metal plate or any other material that effectively reflects sound. At the scale of these devices, an ultrasound transducer operating at 1.1 MHz produces a focal zone having an appropriate size and a gaussian intensity profile in the focal plane. Other frequencies may be used and other intensity profiles may be appropriate, such as a monotonic intensity gradient produced by an unfocused transducer operating at an oblique angle to the plane of the hybridization chamber or fluidic device.

In illustrative experiments directed to mixing in a hybridization chamber, particles in suspensions such as milk or ink have been observed aggregating in patterns around the focal zone in the chamber. This happens in low intensity fields, typically under about 100 mV (applied to amplifier). If the chamber is moved after the particles are aggregated, the pattern will change rapidly to find the energy minimal in the newly formed standing-wave field.

In another embodiment, the invention employs mixed frequencies to affect an acoustic field. For example, a brief tone burst at a high intensity at a high frequency to form acoustic bubbles may be followed by a tone burst at a lower frequency to retain the bubble(s) bolus and also soften the bubble collapse. In addition, varying the frequency will also vary the focal zone location which may be beneficial for certain applications.

In another embodiment of the invention, the acoustic 230 source has a cylindrical segment focused inward, such as a 45 degree arc of a cylinder to result in a line focal zone, e.g., about 1.5 mm wide×about 4 mm long×about 50 mm deep. If a microwell plate was swept across the focal zone line, an entire plate of small sample volumes such as the 1,536 wells of 1 microliter, may be rapidly treated.

A further application of the invention relates to histochemistry. Histochemistry is the staining of tissue, particularly tissue sections and biopsies, for detection of diseases and other pathological states. It typically involves the sequential addition of numerous reagents to small samples for particular times, followed by washing out of the reagent and addition of a second reagent. In addition to staining, tissues may be dried, embedded, demineralized, and otherwise processed. Modem methods may involve specific labeling with protein or nucleic-acid based reagents.

The ability of the devices of the invention to provide gentle local stirring means that diffusional mixing in the liquid is no longer a limiting factor in the rate of processing. In some procedures, this could significantly decrease processing time. Moreover, the techniques of the invention allow remote control of fluid flow, which could simplify and help automate the techniques.

Principles of the invention can be further understood through the following illustrative experimental examples.

Example One

Cavitation Promoting Sites

A glass slide was scratched with a diamond scribe. The slide was placed in a slide holder and installed scratch-down in the apparatus of FIG. 1, modified by the addition of a 5 MHz cavitation detection transducer placed confocally with the main 1.1 MHz acoustic power transducer 230. This instrument was used for all the following examples except where noted. A process was configured to sweep the slide through the focal point of the convergent acoustic beam of the power transducer. The glass slide was insonified with a treatment waveform generated by a 100 mV, 1% duty cycle, 1000 cycles per burst signal applied to a 55 dB RF amplifier and input to the power transducer. Both the input signal to the RF amplifier and the output signal from the cavitation detection transducer were applied to channels 1 and 2 of a Tektronix TDS 30334 digitizing oscilloscope. The signal from the cavitation detection transducer was processed in real time to create a FFT frequency spectrum which was displayed on the oscilloscope screen along with the time-domain signals There was no signal above the noise floor from the cavitation detection transducer as the undamaged surface of the glass slide moved through the focal zone. As the scratch crossed through the focal zone, a significant steady signal from the cavitation detection transducer was recorded by the oscilloscope. This resulted from cavitation in the vicinity of the scratch on the glass slide. Repeating this experiment with an input amplitude of 150 mV caused sporadic large amplitude signals to be generated by the cavitation detection transducer whether or not the scratch was in the focal zone.

Example 1 illustrates that the output signal from the cavitation detection transducer can be processed and one or more characteristics of the signal can be employed in a feedback control mechanism to control the intensity and nature (stable vs. transient) of the cavitation. Example 1 also illustrates that stable and transient cavitation exhibit significantly distinct acoustic signatures that can be distinguished and differentiated by electronic or computer processing, and that surface features or textures promote cavitation.

Example Two

Mixing with Particles in a Acoustic Field

We conducted a number of experiments with dyes and water in a chamber on a microscope slide. The chamber was 12 mm in diameter and 0.5 mm high. We applied dye and water in the chamber and placed it in a sample holder, such as those described above with respect to FIGS. 1-7. We adjusted the water level in the tank such that the top of the slide was not covered by water. This creates a standing-wave sound field when insonified from below. We insonified the chamber with a wide range of treatments. These treatment caused noticeable but not dramatic mixing. We then added glass microspheres of the type used to thicken epoxy to the chamber. In the standing-wave acoustic field, the microspheres translated and aggregated at the acoustic nodes. By dithering the chamber in two dimensions in the acoustic field, the particles were forced to translate within the chamber and thus, mix the fluid in the chamber. We noticed a significant increase in mixing efficiency with the addition of the particles. This example illustrates that by adding particles to the fluid in a chamber and by dithering the chamber relative to a standing-wave sound field, mixing is enhanced.

Example Three

Selectively Blocking an Acoustic Field

If a microdevice or region to be treated is smaller than the focal region of a convergent acoustic beam, or if it is necessary to protect portions of the microdevice from the sound field, acoustic blocking materials may be placed to shadow selected areas from the acoustic source. To illustrate this and its application to MEMS devices, an acoustic blocking material (Tyvek) was applied to the outside of a chamber containing a piece of foil. The result was that cavitation damage preferentially occurs on the unblocked portion of the foil.

Example Four

Cavitating Inside of a Chamber without Cavitating on the Outside of the Device

An aluminum foil strip was placed in a Grace Bio-Labs #PC20 chamber filled with water and clamped to a microscope slide. The chamber was then placed, cover side down, in a bath of degassed distilled water in the apparatus of FIG. 1. The surface of the glass slide was positioned perpendicular to the focal axis and at a distance of 2.4 mm from the focal plane towards the transducer. The chamber was insonified with a waveform of 300 mV, 10% duty cycle and 1,000 cycles per burst. Cavitation damage (pitting) occurred on the foil within the focal zone of the acoustic field. No damage was observed on the outside of the chamber. This illustrates the ability to control cavitation by means of materials, geometry and wavetrain parameters to cause cavitation to occur at a specific location within a device.

Example Five

Improved Hybridization from Mixing During Incubation of a DNA Microarray

A chamber was constructed using a standard microscope slide for a base, a 1 mm thick by 25 mm square glass cover and laminated spacers along two edges. The spacers each included a 10 micron thick Osmonics Poretics membrane (5 micron pore size) and a 37 micron polyester shim with the edges aligned inside the chamber, resulting in a 47 micron gap between the slide and the cover. The chamber was clamped With small steel binder clips over each of the two spacers. The other two edges were left open. Acoustic energy was applied to the edge of the membrane/shim laminate by means of the apparatus of FIG. 1. A focused ultrasonic transducer (Sonic Concepts #H101) operating at a frequency of 1.1 MHz. and directed upward along an axis perpendicular to the plane of the glass slide. The slide was positioned horizontally at the surface of a water bath, coincident with the focal zone of the transducer. The slide was held fixed in the vertical direction but movable in all horizontal directions. The position of the slide is typically dithered in the horizontal plane during treatment to minimize the effects of misalignment of the slide relative to the transducer and to expose as many nucleation sites as possible along the edge of the membrane to the focal zone of the acoustic field.

Mixing Ink Particles in an Open Chamber (Cover Slip).

White ink was refined by serial centrifugation to obtain sub-micron $TiO_2$ particles. These were resuspended in 1×SSC. The ink particle solution was applied to one edge of the chamber and allowed to wick into the gap and fill the chamber. Several acoustic waveforms were tested. The following waveforms of Table 1 were found to cause the fluid to jet from the edge into the center of the chamber, as determined by visual observation.

TABLE 1

| Voltage (mV)* | Duty cycle (%) | Cycles per burst |
|---|---|---|
| 70/40 | 100 | 10/5000 |
| 30 | 100 (cw) | 2000 |
| 70 | 10 | 10 |
| 70/30 | 50 | 10/2500 |

*The voltage is the input voltage to a 55 dB RF amplifier. The output of the amplifier was applied to the transducer through an impedance matching network.

The effective mixing distance from the edge of the chamber was forced to correlate with the acoustic power applied to the slide. Higher power waveforms caused ink particles to move from one side of the chamber to the other, a distance of approximately 22 mm.

Accelerating DNA Hybridization in an Open Chamber (Cover Slip).

The chamber described above was applied to a glass slide on the surface of which was spotted a DNA array of gene probes. A target solution of cDNA in a hybridization buffer was applied to the chamber and incubated for 2 hours at 65° C. while being treated with an acoustic field to promote mixing in the chamber. A similar array was subjected to the same conditions without the acoustic treatment. The treatment consisted of exposure to an acoustic waveform of 70 mV, 10% duty cycle and 10 cycles per burst for approximately 5 minutes at 30 minute intervals. After treatment the two slides were post-processed together.

The two slides were scanned with a GSI Lumonics scanner. The images produced show that the treated slide had substantially more fluorescent signal than the slide that was not acoustically treated.

Example Six

Non-Contact Mixing in a Microliter Drop

A one microliter drop of milk and India ink was applied to the dry surface of a glass slide at the water/air interface and in the focal zone of a 1.1 MHz focused transducer. When 0.5 microliter of milk was added to 0.5 microliter of India ink, the solutions slowly mixed, but when an acoustic wavetrain was applied to the drop, the two solutions rapidly mixed in less than 2 seconds. The energy applied from the transducer to the drop had a peak positive pressure of approximately 3 MPa at 1% duty cycle with 1,000 cycles per burst.

The experiment was repeated using a glass slide which had been scratched with a diamond scribe to create a crevice approximately 25 microns in width. The crevice or pit acted as a nucleation site for bubble formation. When the drop of fluid was located over the crevice, the acoustic intensity required to mix the fluids was reduced and the site of nucleation was predicted. This illustrates the use of geometric features to control the location of cavitation and reduce the acoustic intensity required for cavitation and mixing.

Example Seven

Complex Wavetrain Mixing—Hammerhead Wavetrain

An experiment was performed using a complex wavetrain to control bubble formation and collapse. A wavetrain was designed to have a short burst to nucleate and form a bubble or bubble cloud, followed by a lower amplitude period to allow the bubble(s) to slowly collapse, and followed by a period of no acoustic signal. The following conditions worked well to both provide visual mixing in a dye filled chamber system and mix without disruption of immobilized DNA on polyLysine coated glass slides (i.e., following fluorescent dye staining), using the apparatus of FIG. 1. At 1.1 MHz frequency, 10 cycles of 70 mV (amplifier input), followed by 2,500 cycles of 30 mV, and followed by 2,500 cycles of 0.1 mV. This wavetrain was repeated and dithered across a field of scratches in a glass microscope cover slide with 0.5 mm spaces. The dithering parameters were a 2 rpm rotational velocity and a 2 mm radius with a 0 second dwell time. This wavetrain was scanned across the textured field. The use of submicron particles of dye allowed visualization of controlled mixing. The observation was a smoother and less sporadic mixing than that observed without the step-down from the high intensity cycles.

Experiments 8-14 were performed to understand the effect of different textures on mixing. The effect of texturing the top vs. the bottom surface in the field and the effect of material of the textured surface were also determined. These experiments were performed using the apparatus of FIG. 1. The experiments were performed using a Grace Bio-labs Coverwell PC20 20 microliter hybridization chamber clamped to a standard glass microscope slide. This chamber is 13 mm in diameter and forms a gap of about 125 micrometer when clamped to a flat surface. We tested this configuration with the following conditions: Treatment: 10% duty cycle, 10 mV amplitude, 1,000 cycles per burstZ-offset equal to −9 to −3 mm from the focal plane Example Eight A chamber with no features (or textures) containing water and milk was insonified. Milk solids formed into a white spot at the center of the focal zone, surrounded by a clear ring. Milk solids were aggregated and segregated at the center of the focal zone. Dithering caused the white spot to smear out and remix.

The experiment was repeated with a single scratch feature inside the cover well. The passive cavitation system connected to the oscilloscope showed a frequency spectrum containing 1.1 MHz peak and harmonics. When the dither function passed the focal zone through the scratch, a broadband rise in the noise floor is produced corresponding to the pass band of the receiving transducer (centered at 5 MHz). At the same time, the milk was mixed rapidly and thoroughly into the water. It appeared that the broadband cavitation signal correlated well with mixing in the chamber. The scratch was reoriented 90 degrees to rule out reflections as source of signal. The result was the same.

Example Nine

A hatch pattern was scratched into a glass slide with a diamond scribe and assembled as above. The result was that the milk solids did not form a spot. This seemed to be because either the scratches broke up the standing-wave field or the milk was being mixed faster than it could segregate.

Example Ten

The previous experiment was repeated with ink added to the chamber to visualize mixing. A 1 microliter drop of black ink (fountain pen ink)was added to the inside surface of the hybridization chamber and one or two drops of whole milk were placed on the glass-slide. When the two were brought into contact and clamped, the excess milk and some of the ink squeezed out, leaving the chamber filled with milk and a distinct smear of ink.

The same parts as above (hatch pattern scratched into slide, unmodified cover well) were used to repeat the experiment with ink added. Results: A chamber with no scratches in the glass mixed slowly. The main mechanism seemed to be the dither function dragging an aggregate of milk solids around the chamber. The chamber with the scratches in the glass slide mixed very rapidly; the chamber was mostly mixed within the first 5 seconds. It was completely mixed after 5 seconds of no dither and 5 seconds of dither. As a control, An identical configuration with milk and ink was assembled and put aside. After 2 hours, diffusion was evident but the ink and milk were essentially unmixed.

Example Eleven

Several variations of the features on the glass slide were tested: Heavy scratches vs. light scratches in hatch pattern, Parallel scratches, Pitted surface, Single pit in surface at the focal point. All of these features caused mixing to some degree, compared to an unmodified slide. The mixing took the form of 1, 2 or 3 large eddies or vortices which formed lobes around the focal point, with the shape of clover leaves. Occasionally, the number of lobes would change as if transitioning from one stable configuration to another.

Example Twelve

The following features were tested on the inside surface of the chamber: smooth scratches created by knife in a hatch pattern, rough scratches created by a burr in an electric tool. These cases were examined with the cover well facing down, towards the transducer. In both cases, there was no effect at 100 mV but good effect at 150 mV. For an unmodified cover well, there was no mixing effect at 150 mV. When the device was turned over, with the glass slide facing the transducer, there was no effect until the voltage was increased to 200 mV. Then, there was a moderate effect.

Example Thirteen

A "floating" cover slip was tested and compared to a gasketed chamber. This configuration seems to be more popular in the field of DNA microarray research. A standard glass slide was cut down to 2" long for use as a cover slip. A hatch pattern was scratched into the slide with a scratch interval of about 1 mm. The slide was used as a cover slip because regular cover slips are too thin to scratch a pattern into. (A pattern could be etched into a standard cover slip, however). A slide was set up in the slide holder and positioned in a Covaris E1 system with a −4 mm z offset. A 1 microliter drop of white ink (Rotring #597118) was put onto the slide and the cover slip was applied, hatch side down. Distilled water was wicked in to fill the gap between the slides. This caused a streak of ink between the slides. A process was configured using 40 mV CW as the treatment. This caused excellent mixing in the chamber, especially when dithering was turned on.

Example Fourteen

It is possible to have cavitation promoting nucleation sites and texture details on the exterior of sample chamber to promote the bubble-formation and resultant collapse over the areas to be mixed on the interior. The previous experiment was repeated with the cover slip turned upside down. This also was effective at mixing, although not as good as with the scratches on the inside. An identical cover slip without scratches was tested. This did not mix. Particles aggregated in a bulls eye pattern at the focus. This may be beneficial for arrays that are noncovalently attached to an interior surface.

Example Fifteen

Field Mixing with Membrane Bonded to Cover Slip

An Osmonics polycarbonate membrane with 5 micrometer pores was bonded to a 1 mm thick glass cover slip. The gap between the slide and the cover slip was set at 50 micrometers with plastic shims. White dye particles in water were introduced into the gap. When the device was insonified with an acoustic waveform of 50 mV amplitude, 10% day cycle and 10 cycles per burst, good fluid flow was observed in the plane of the device.

Example Sixteen

Edge Mixing

An array field may be constructed such that there are zones for nucleation and bubble collapse that act as pumps to stream fluid across the array. If the energy is high the resulting bubble collapse may disrupt bound binding partners. This may be a benefit to indicate in post-mixing scanning of the array that efficient mixing occurred. In addition, the inclusion of various areas to indicate other aspects of the efficiency of the mixing may also be incorporated into the array. For example, areas that should have uniform amounts of dye may be dispersed across the array to indicate both mixing occurrence and efficiency.

An experiment was conducted to test edge mixing. An Osmonics membrane was sandwiched with plastic shim material with a glass microscope slide cover slip. The construction was (from the acoustic source) DNA array microscope slide, 0.0375 mm plastic film, 0.010 mm membrane (Osmonics Poretics PCTE, 5 micron pore size) and the cover slip (a 25 mm×40 mm borosilicate glass microscope slide). When the acoustic focal zone was applied to the fluid/membrane-shim interface the membrane acted as a source of nucleation such that the energy required to initiate bubble formation was lowered. For example, 10 cycles of 70 mV followed by 5,000 cycles of 40 mV readily mixed a fluid solution. The fluid flow was in the plane of the array and perpendicular to and originating from the membrane edges. The flow was steady and was approximately 1 mm per second. The flow pattern was from a point of approximately 1 mm and flowed over 10 mm perpendicular to the wall where the flow fanned out slightly to 3 mm. Adjusting the incoming voltages adjusted the velocity.

Example Seventeen

Shelf or Ledge Mixing

In a hybrid configuration, a ledge or shelf of exposed membrane material can be constructed at the edge of an array. This mixes in a mode similar to the above described field mixing but is positioned at the edge of the array. It has the advantage of creating a small gap in the mixing area (which requires less energy to activate) while allowing a larger gap over the array. A 5 micron pore size Osmonics membrane was bonded to a shim such that a portion of the face of the membrane was exposed within the device. When treated with a "pulse-step" waveform having 10 cycles at 70 mV, 5000 cycles at 40 mV and no dead time, moderate mixing was observed within the chamber.

Example Eighteen

Acoustic-Based Temperature Cycling

The temperature of a hybridization chamber may also be modulated by the rate at which the acoustic wavetrain enters the sample. A glass microscope slide with a hybridization chamber was oriented horizontally a few millimeters above a water bath with an IR temperature sensor above the glass slide to monitor the temperature variation during the mixing dose. With a waveform of 10% duty cycle, 150 mV input to the amplifier, and a 100 cycles per burst the temperature went from 25° C. to 60° C. within 30 seconds. Thereafter, the temperature maintained a steady-state equilibrium condition. By modulating the acoustic wavetrain (e.g., duty cycle), the temperature was raised or lowered. Controlling the temperature acoustically may be useful for accelerating stringency processes for hybridizations. A small region of a device may be heated without heating other regions. A target solution may be heated to denature it at the perimeter of an array without melting the hybridized molecules.

Example Nineteen

Improved Signal from Mixing During Hybridization of a DNA Microarray, Closed Chamber Mixing Ink Particles in a Closed Chamber.

A chamber was constructed as follows: A laminate consisting of pressure sensitive silicone transfer adhesive applied to the top and bottom of an Osmonics Poretics polyester membrane having a 5 micron pore size and a 10 micron thickness, resulting in a total thickness of 60 microns was die-cut to form a chamber 21 mm square. The cut edge of the membrane was exposed. A cover layer of cyclic-olefin (Zeon Chemicals Zeonex 1600), 188 microns thick was punched to form two fill ports and applied to the membrane laminate to form a chamber. This chamber was bonded to a standard glass microscope slide. The volume of the chamber was approximately 40 microliters.

Ink was refined and prepared as above. The chamber was filled with a mixture of the ink particles in 1× SSC. The ports were sealed with seal tabs (Grace Bio-Labs). The chamber was placed cover-side down at the surface of the water bath in the sonic treatment system of FIG. 1. Acoustic energy was focused along the edges of the chamber such that the cut edge of the membrane was in the focal zone of the acoustic field. A treatment waveform of 100 mV, 10 cycles per burst and 10% duty cycle was applied to the ultrasound transducer through a 55 dB RF amplifier to create an acoustic field focused on the slide. The slide was robotically dithered in the horizontal plane during treatment so that focal zone moved in a circular pattern relative to the edge of the array to accommodate locational inaccuracies and to maximize the exposure of the edge of the membrane to the acoustic field.

The acoustic field applied to the edge of the laminate within the chamber resulted in circulating rotational flow of the fluid in "lobes" or eddies near the focal zone, as determined by visual observation. This flow pattern was similar to that of a "doublet" as is known in the field of fluid dynamics. As the focal zone was robotically moved around the edge of the chamber (while dithering), a border of mixed fluid occurred within the chamber. The treatment waveform described above resulted in border zone of mixed fluid having a width of approximately 5 mm. The visually indicated border shows the region of primary circulation. Inside this border, the ink particles became organized into patterns formed by acoustic standing waves in the chamber and resisted moving with any fluid flow that may have occurred.

Accelerating DNA Hybridization in a Closed Chamber.

A chamber similar to that described above was constructed and applied to a glass slide onto which was spotted a DNA probe array. The chamber was filled with a target solution containing cDNA molecules in a hybridization buffer. The slide was placed cover-side down at the surface of the water bath in the sonic treatment system of FIG. 1 and treated with a treatment waveform of 100 mV, 10 cycles per burst and a 10% duty cycle for a period of 5 minutes at intervals of 30 minutes at an incubation temperature of 65° C. A similar slide: was prepared and subjected to the same conditions without the acoustic treatment. After the treatment period was completed the slides were post-processed and scanned.

The slide receiving treatment showed substantially more fluorescent signal than the untreated slide. There was no evidence that any of the spotted DNA probes had been removed or damaged by the treatment. There was no evidence of non-specific binding or cross-hybridization.

Example Twenty

Improved Signal From Mixing During Hybridization of a DNA Microarray, Nucleation Strip Applied Within a Closed Chamber A strip of the laminate described in example 19, above, was bonded into an otherwise standard chamber having dimensions of 12 mm×15 mm and a thickness of 150 microns. The strip had a width of approximately 1 mm and a length of 8 mm. The chamber was then applied to a glass slide onto which an array of two distinct DNA oligonucleotide probes had been spotted. A similar chamber without the strip of laminate was also placed on the same slide.

A target solution of oligonucleotides complimentary to those spotted on the slide in a hybridization buffer was placed in both chambers. The slide was placed upside down in the sonic treatment system of FIG. 1 at the surface of the water bath at a temperature of 37° C. The chamber with the strip of laminate was aligned with the focal zone of the ultrasound transducer and treated for 15 minutes with a waveform of 10 cycles of 125 mV, 10 cycles of 50 mV and an overall duty cycle of 10%. The slide was then post-processed and scanned with a slide scanner (Affymetrix #428).

The array in the treated chamber showed a substantially more uniform distribution of fluorescent signal across the array than the chamber that was not treated, by visual observation of the scanned image. The overall signal was higher too.

Example Twenty-One

Mixing in a Chamber Using Unfocused Ultrasound

A chamber having an internal size of 22 mm square by 60 microns high was placed on a slide that was spotted with a reference grid of fluorescent spots and an array of two distinct oligonucleotide probes. The chamber was filled with 30 microliters of a target solution in which the target oligonucleotide molecules were complimentary to the spotted probes. The slide and chamber were placed in a K&E Model 61-3128 ultrasonic pen cleaner filled with degassed water at room temperature. The K&E pen cleaner was operated a voltage approximately 60% of line voltage (with a variac) which corresponds to a minimum value that reliably causes mixing as determined by visual and auditory means. After 15 minutes of treatment, the chamber was removed and the slide was post-processed and imaged.

The image showed that uniform mixing of the target solution occurred but that cavitation damage (ablation) occurred to the spotted probes and fluorescent grid spots. The grid spots are quite durable and this is the only condition that was observed to mechanically damage them throughout testing with this type of slides.

Example Twenty-Two

Mixing Nucleation Patch Inserted into Chamber

A "nucleation patch" was bonded to a glass slide inside a standard hybridization chamber (Grace Bio-Labs #HBW1932) The nucleation patch was in the configuration of a bandage in which a patch of membrane (Osmonics Poretics 10 micron pore size, 20 micron thick) was held down by a laminate of 25 microns of pressure sensitive adhesive and a 37 micron plastic film. The dimensions of the membrane were 2 mm square and the overall dimensions were 2 mm×6 mm.

The chamber was filled with refined white ink particles in 1×SSC and placed chamber side down in the sonic treatment system of FIG. 1. The slide was insonified with a 100 mV, 10 cycles per burst, 10% duty cycle wavetrain. When the focus was positioned over the center of the nucleation patch, a very strong flow (per visual observation) was established from one side of the patch to the other, between the membrane and the glass slide. This "nucleation patch" could be inserted into virtually any hybridization chamber. Further, because the flow is between the membrane and the slide, the flow will be independent of the inside height of the chamber. A variation would be to bond the patch to the cover instead of the slide. Another variation would be to leave the top film off so that the top of the patch bonds to the cover, preventing flow over the top of the patch. This would force the flow to follow a longer path and mix a larger area.

Example Twenty-Three

Beneficial Effect of Nucleating Membrane Incorporated into Chamber

Two chambers were constructed having an internal size of 9 mm×12 mm×150 microns high. One chamber had Osmonics Poretics 5 micron pore size, 10 micron thick polyester membrane incorporated into the laminate. The other chamber had plain polyester film, 12 microns thick instead of the membrane. The chambers were laminated onto glass slides and filled with 30 microliters of solution containing submicron white TiO2 particles in 1×SSC.

The slides were treated in the system of FIG. 1. A series of treatments was applied to the edge of each chamber. The treatments had a voltage of 40 mV to 120 mV, increasing in increments of 10 mV. The duty cycle was 10% and there were 10 cycles in each burst. The presence of cavitation was noted and the extent of the mixing from the edge was recorded for each voltage in each chamber. The series was repeated twice for each chamber. The extent of mixing was measured with digital calipers after 15 seconds of treatment at each voltage.

The extent of mixing from the edge of the chamber in millimeters (mm) is shown in the following Table 2:

TABLE 2

| Voltage (mV) | Chamber without membrane | | Chamber with membrane | |
|---|---|---|---|---|
| | 1st run | 2nd run | 1st run | 2nd run |
| 40 | 1.4 | no mixing | 2.5 | 1.3 |
| 50 | 2.1 | no mixing | 2.7 | 2.1 |
| 60 | 1.4 | 1.6 | 3.1 | 2.3 |
| 70 | 1.9 | 2.0 | 4.1 | 2.0 |
| 80 | 2.1 | 2.0 | 4.3 | 2.0 |
| 90 | 2.1 | 2.0 | 5.0 | 4.0 |
| 100 | 3.4 (sporadic) | 4.3 | 5.5 | 4.3 |
| 110 | 4.8 (sporadic) | 2.5 | 9.1 | 4.5 |
| 120 | 4.8 (sporadic) | 3.5 (sporadic) | 10.3 | 9.9 |

Mixing occurred in both chambers to some extent in response to the acoustic field. The chamber with the membrane showed much more extensive mixing, especially at higher voltages.

Example Twenty-Four

Conduit Example

A chamber was constructed as follows: A laminate consisting of pressure sensitive silicone transfer adhesive applied to the top and bottom of an Osmonics Poretics polyester membrane having a 5 micron pore size and a 10 micron thickness, resulting in a total thickness of 60 microns was die-cut to form a chamber 21 mm square. The cut edge of the membrane was exposed. A cover layer of cyclic-olefin (Zeon Chemicals Zeonex 1600), 188 microns thick was punched to form two fill ports and applied to the membrane laminate to form a chamber.

The chamber was modified as follows. A strip of the silicone/membrane/silicone laminate measuring 1.5 mm by 6 mm was attached to the inside of the cover layer parallel to one of the edges so that a conduit 6 mm long was formed. The conduit had a height of 60 microns and a width of approximately 1 mm. Both ends of the conduit were in free communication with the chamber. The chamber was bonded then to a standard glass microscope slide. The volume of the chamber was approximately 35 microliters.

The chamber was filled with a mixture of refined ink particles in 1×SSC and positioned in a Covaris E1 system. An acoustic waveform of 80 mV amplitude, 10% duty cycle and 10 cycles per burst was applied to the chamber. The chamber was positioned such that the focal zone was centered on one end of the conduit Substantial convective flow was established in the conduit and in the chamber near the conduit. Flow rates were estimated to be several millimeters per second by visual observation.

Having described the invention, it is accordingly intended that all matter contained in the above description be interpreted as illustrative rather than in a limiting sense. It is also intended that the following claims cover all of the generic and specific features of the invention as described herein, and all statements of the scope of the invention which, as a matter of language, might be said to fall therebetween.

What is claimed is:

1. A method of imparting motion to a fluid, said method comprising:
   providing a focused acoustic field having a frequency range of between about 100 kHz and about 100 MHz and having a focal zone having a width of less than about 2 centimeters, the focused acoustic field originating from an acoustic source spaced from and exterior to a vessel;

holding a liquid medium in a medium container, the liquid medium for transmitting acoustic energy from the acoustic source to the vessel, and the vessel having a nucleation feature;

holding one or more samples in the vessel and holding the vessel in a vessel holder, the vessel holder adapted to position the vessel in the medium container at a location at least partially in the focal zone of the acoustic source; and selectively positioning the nucleation feature adapted to interact with said focused acoustic field to impart motion to fluid in the vessel.

2. The method of claim 1, wherein the step of selectively positioning further comprises placing the nucleation feature into the vessel.

3. The method of claim 2, wherein the step of placing the nucleation feature into the vessel comprises inserting the nucleation feature into the vessel prior to fluid being contained in the vessel.

4. The method of claim 2, wherein the step of placing the nucleation feature into the vessel comprises inserting the nucleation feature into the vessel after the vessel is partially filled with fluid.

5. The method of claim 2, wherein the step of placing the nucleation feature into the vessel comprises affixing the nucleation feature inside the vessel.

6. The method of claim 2, wherein the step of placing the nucleation feature into the vessel comprises placing a microsphere into the vessel.

7. The method of claim 2, further comprising placing an element that carries the nucleation feature in the vessel.

8. The method of claim 7, wherein the element carrying the nucleation feature includes a membrane or a microsphere.

9. The method of claim 1, wherein providing a focused acoustic field having a focal zone having a width of less than about 2 centimeters comprises providing a focused acoustic field having a focal zone having a width of less than about 1 centimeter.

10. The method of claim 1, further comprising sealing the one or more samples in the vessel.

11. The method of claim 1, further comprising providing a plurality of focal zones, each focal zone having a width of less than about 2 centimeters.

12. The method of claim 1, further comprising positioning the vessel to selectively expose the one or more samples to the focused acoustic field.

13. The method of claim 1, wherein the nucleation feature comprises a characteristic size ranging between about 5 microns and about 10 microns.

14. The method of claim 1, wherein the nucleation feature comprises a size and a geometry so as to promote formation of gas cavities within a fluid, the gas cavities having a volume between about 1 pL and about 3 mL.

15. The method of claim 1, wherein the nucleation feature includes at least one of a pit, crevice, scratch, groove and ridge in a first surface.

16. The method of claim 1, further comprising providing a focused acoustic field having a line focal zone.

17. The method of claim 1, wherein the width includes a diameter of the focal zone.

18. The method of claim 1, wherein the acoustic source is spaced from and exterior to a plurality of vessels.

19. The method of claim 1, wherein selectively positioning the nucleation feature comprises operating a positioning system to move the nucleation feature relative to the focused acoustic field.

20. The method of claim 1, wherein selectively positioning the nucleation feature comprises maintaining the vessel to be at a stationary position relative to the focused acoustic field.

21. The method of claim 1, wherein selectively positioning the nucleation feature comprises selectively placing the nucleation feature at a location of the vessel so as to impart motion to fluid in the vessel at the location upon interacting with said focused acoustic field.

22. The method of claim 1, wherein selectively positioning the nucleation feature comprises placing the nucleation feature at a desired location in the vessel.

* * * * *